United States Patent [19]

Pechanek et al.

[11] Patent Number: 6,041,398
[45] Date of Patent: *Mar. 21, 2000

[54] MASSIVELY PARALLEL MULTIPLE-FOLDED CLUSTERED PROCESSOR MESH ARRAY

[75] Inventors: Gerald George Pechanek, Endwell; Stamatis Vassiliadis, Vestal; Jose Guadalupe Delgado-Frias, Endwell, all of N.Y.

[73] Assignee: International Business Machines Corporation, Armonk, N.Y.

[ * ] Notice: This patent is subject to a terminal disclaimer.

[21] Appl. No.: 07/904,916

[22] Filed: Jun. 26, 1992

[51] Int. Cl.$^7$ .................................................. G06F 15/80

[52] U.S. Cl. ............................................. 712/11; 345/505

[58] Field of Search ............................... 395/27, 800, 21, 395/375; 364/DIG. 1, 513; 712/10–22, 202, 215; 708/100, 200; 710/100, 104; 711/229; 709/221; 713/100; 382/181; 706/15; 345/505

[56] References Cited

U.S. PATENT DOCUMENTS

| 4,796,199 | 1/1989 | Hammerstrom et al. | 706/34 |
|---|---|---|---|
| 5,043,913 | 8/1991 | Furutani | 706/15 |
| 5,117,387 | 5/1992 | Nemirovsky et al. | 395/406 |
| 5,134,690 | 7/1992 | Samatham | 710/131 |

OTHER PUBLICATIONS

El–Amawy et al.; "Parallel VLSI Algorithm for Stable Inversion of Dense Matrices;" IEE Proceedings; Nov. 1989; p: 575–80.

Li et al.; "A Equilateral–Triangular Systolic Architecture;" IEEE; 1984; p: 539–43.

Kung et al., "A Triangular Array Processor for Kalman Filtering", 4th European Signal Processing Conference, Sep. 5–8 1988, p: 347–50.

Borkar et al., "iWarp: An Integrated Solution to High–Speed Parallel Computing", *IEEE Superconducting '88*, Nov. 14–18, 1988, p: 330–39.

Funderlic et al.; "Torus Data Flow for Parallel Computation of Missized Matrix Problems," U.S. Dept. of Commerce Nat. Tech. Info. Service, Feb. 1985, p: 1–27.

Ward et al.; "The Application and Development of Wavefront Array Processors for Advanced Front–End Signal Processing Systems", 1st Int. Workshop on Systolic Arrays; 1987; p: 295–301.

Borkar et al., "iWarp: An Integrated Solution to High–Speed Parallel Computing", IEEE, 1988, p: 330–39.

Ikeda et al., "A Digital Signal Processor for Digital Audio Use", IEEE Transactions on Consumer Electronics, 1988, p: 671–76.

IEEE, 1988, "Mapping Signal Processing Algorithms To Fixed Architectures" V2.10, pp. 2037–2040, by Stewart.

*Primary Examiner*—John A. Follansbee
*Attorney, Agent, or Firm*—Lynn L. Augspurger; Morgan & Finnegan

[57] ABSTRACT

A massively parallel diagonal-fold mesh array processor provides a triangular diagonally folded mesh computer with the same functionality as a square mesh computer but with half the number of connection wires. The diagonal-fold mesh array processor is modified in this invention to provide a more general purpose processor node and to enhance the connectivity between the processing nodes while still providing the image processing and finite difference capabilities of the original structure. By repeatedly folding the triangular diagonal-fold array structure, processing elements are placed together which, with additional connections, allows the improvement in connectivity. This enhancement would be difficult to achieve in a standard mesh organization. The resultant folded structure maintains the functionality of the original mesh while expanding its capabilities. A bitonic sort example is presented which demonstrates the utility of the enhanced connectivity. The multiple folded array concept is applied to a six neighborhood hexagonal array demonstrating the general nature of the concept.

7 Claims, 56 Drawing Sheets

2M WRAPAROUND CONNECTIONS ASSUMED

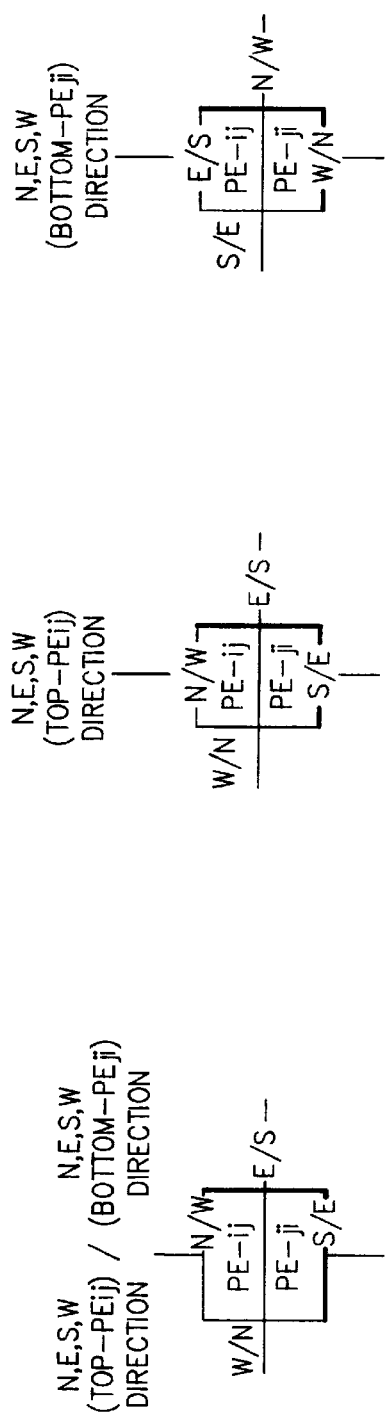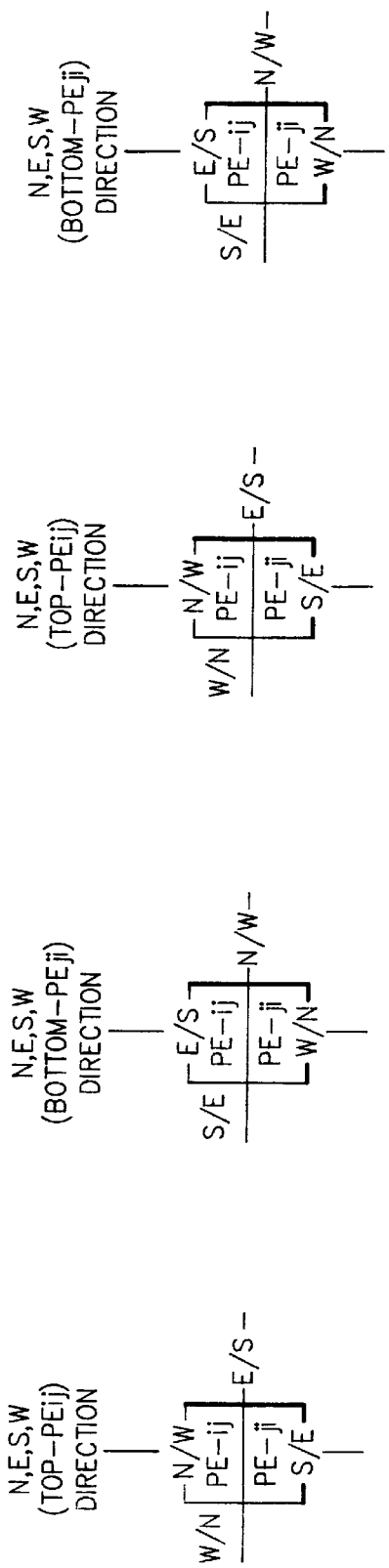

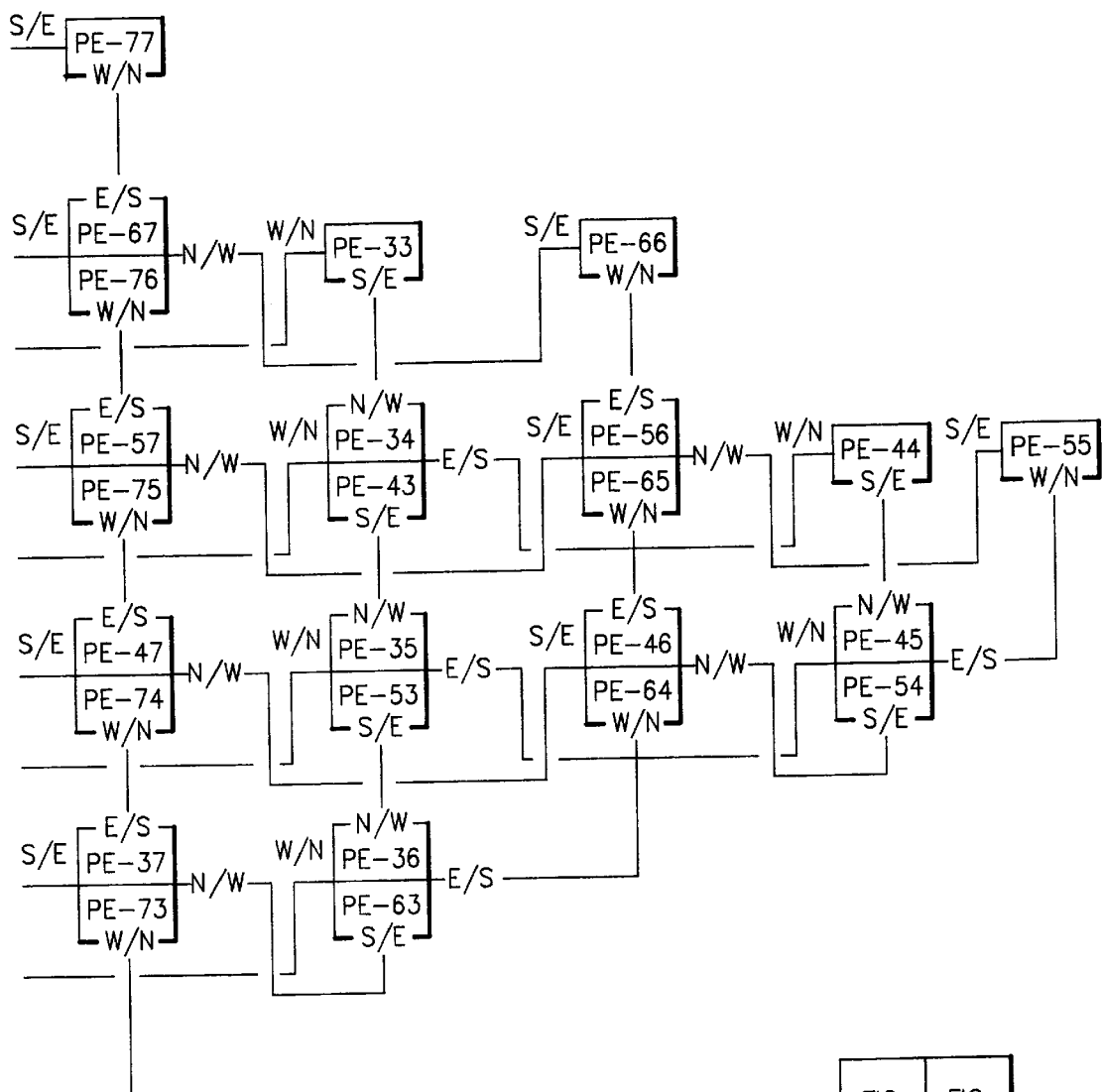
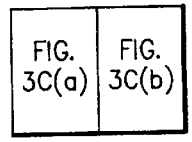
FIG.3C(b)
FIG.3C

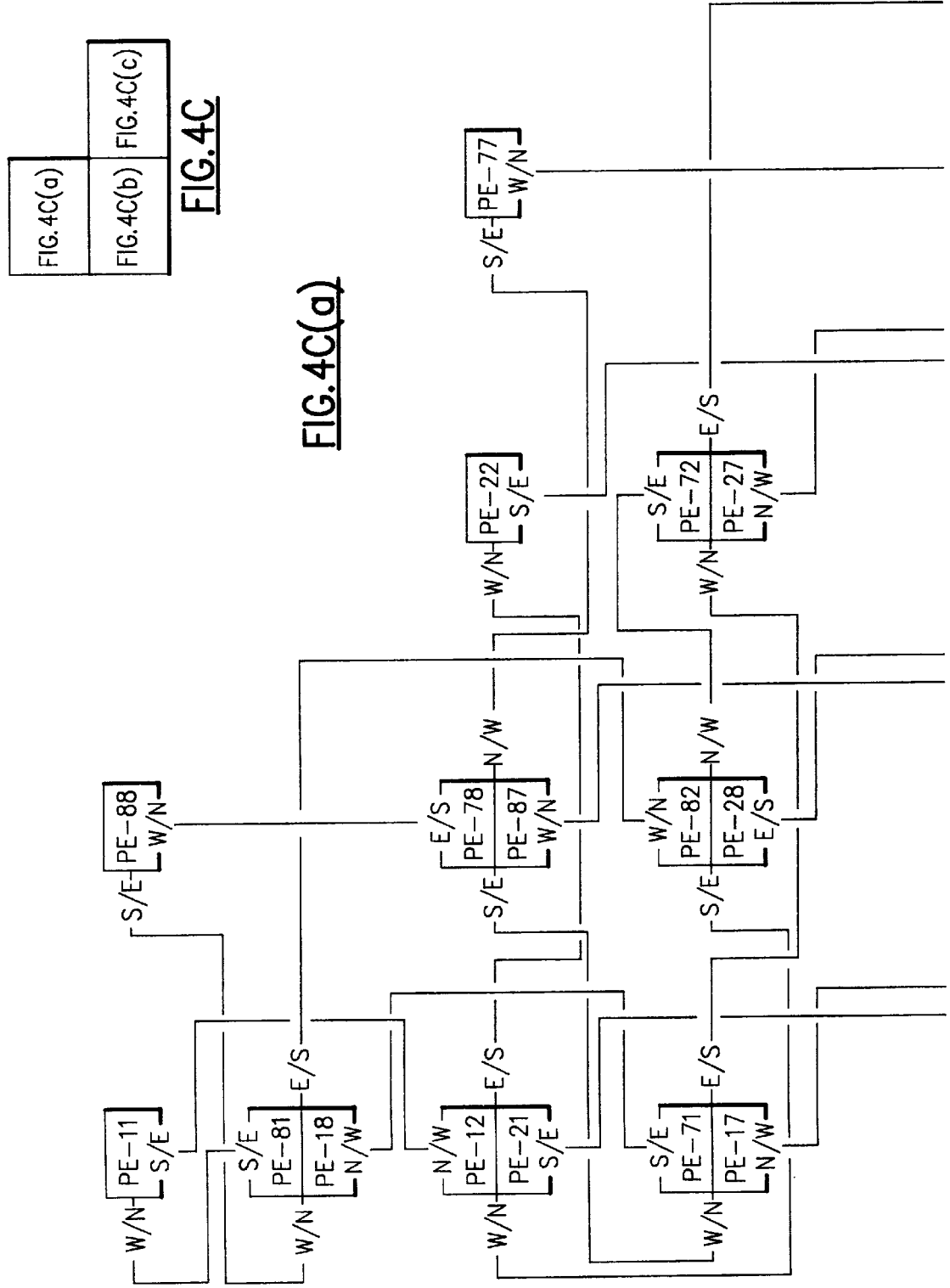

TRANS N
RCV S

TRANS S
RCV N

TRANS E
RCV W

TRANS N
RCV S

TRANS S
RCV N

TRANS E
RCV W

TRANS W
RCV E

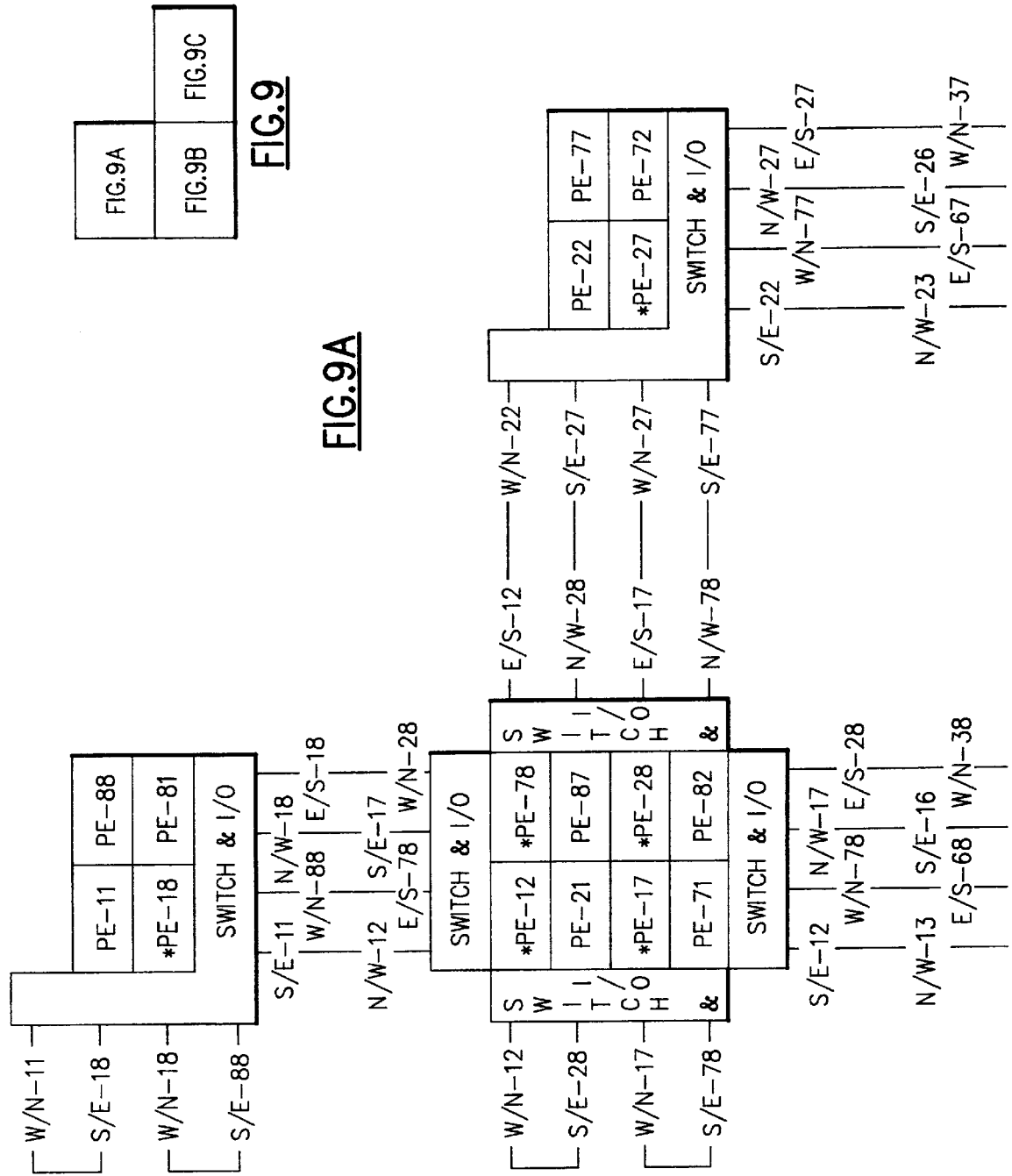

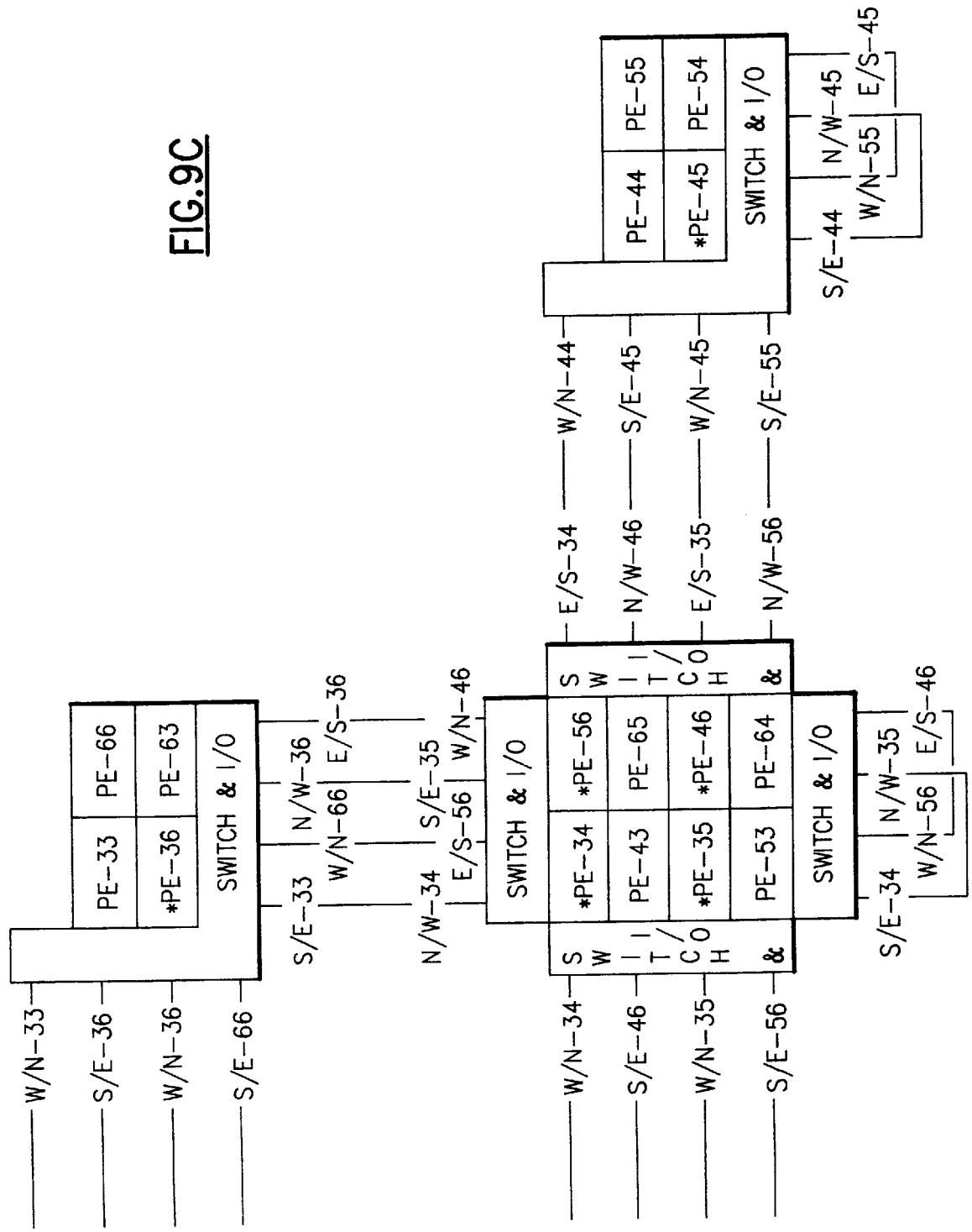

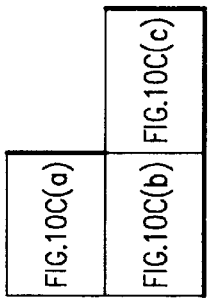
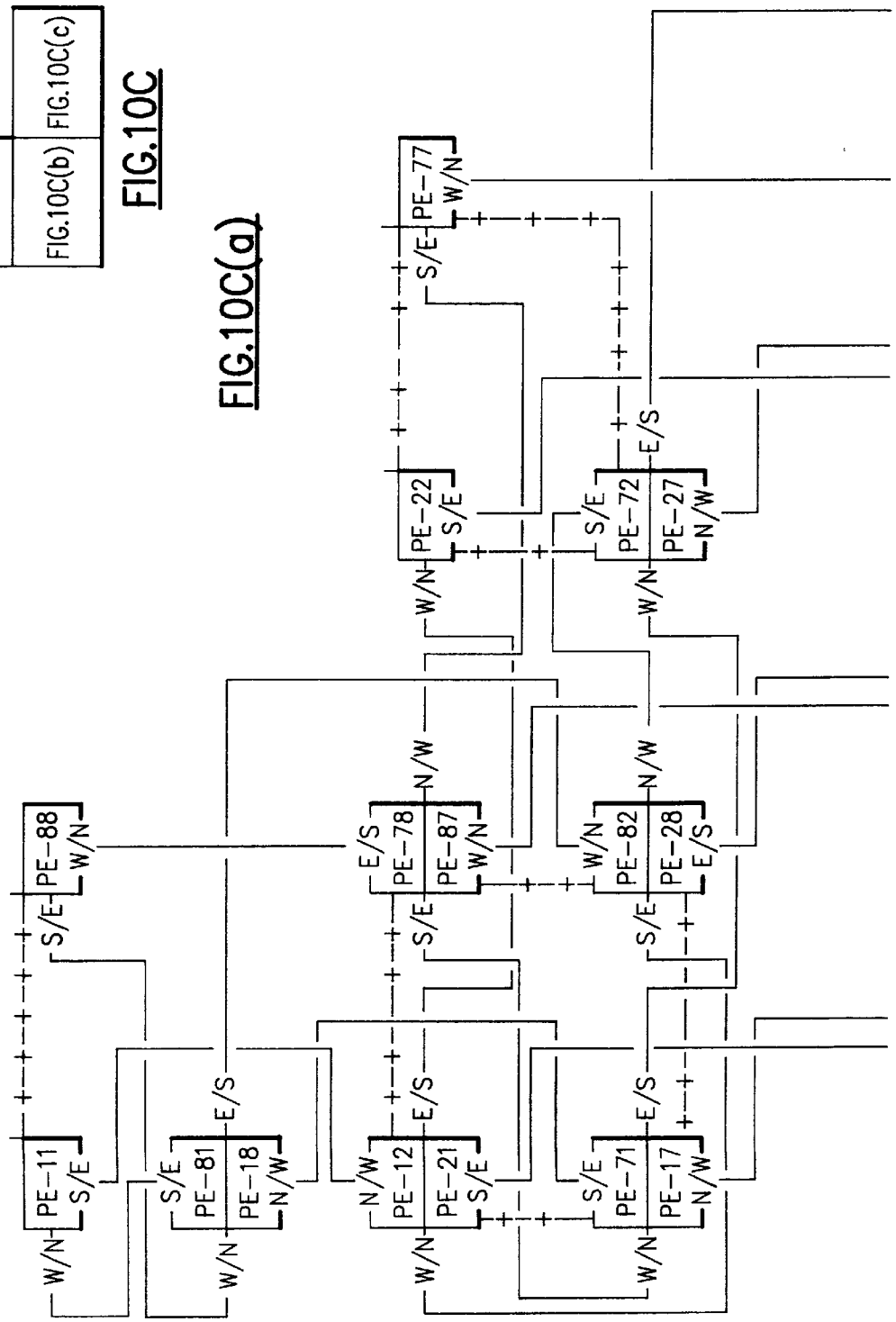

2M WRAPAROUND CONNECTIONS ASSUMED

ENHANCED 4 PROCESSOR DIAGONAL CLUSTER SYMMETRIC PE

ENHANCED 4 PROCESSOR DIAGONAL CLUSTER SINGLE PE

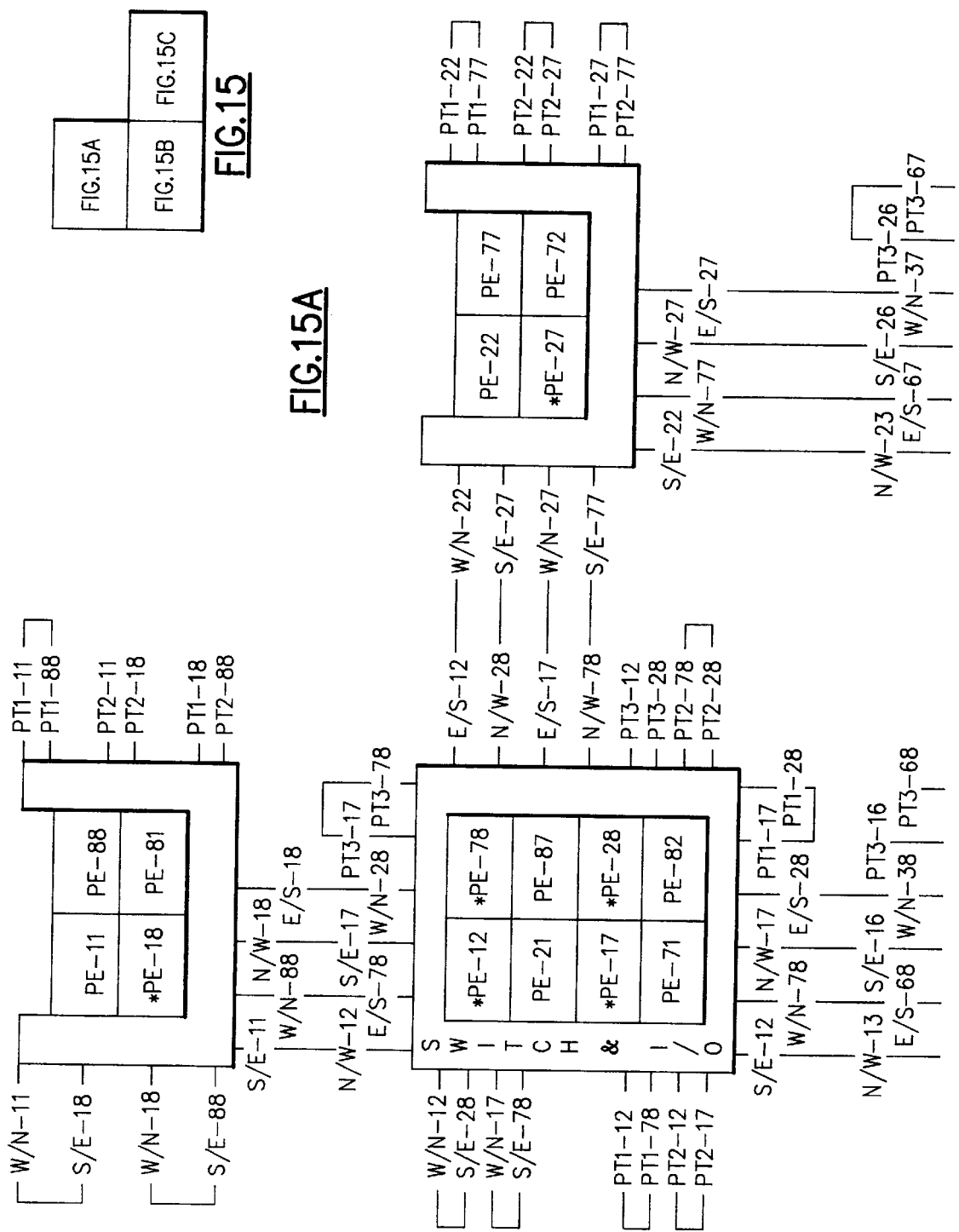

2M WRAPAROUND CONNECTIONS ASSUMED

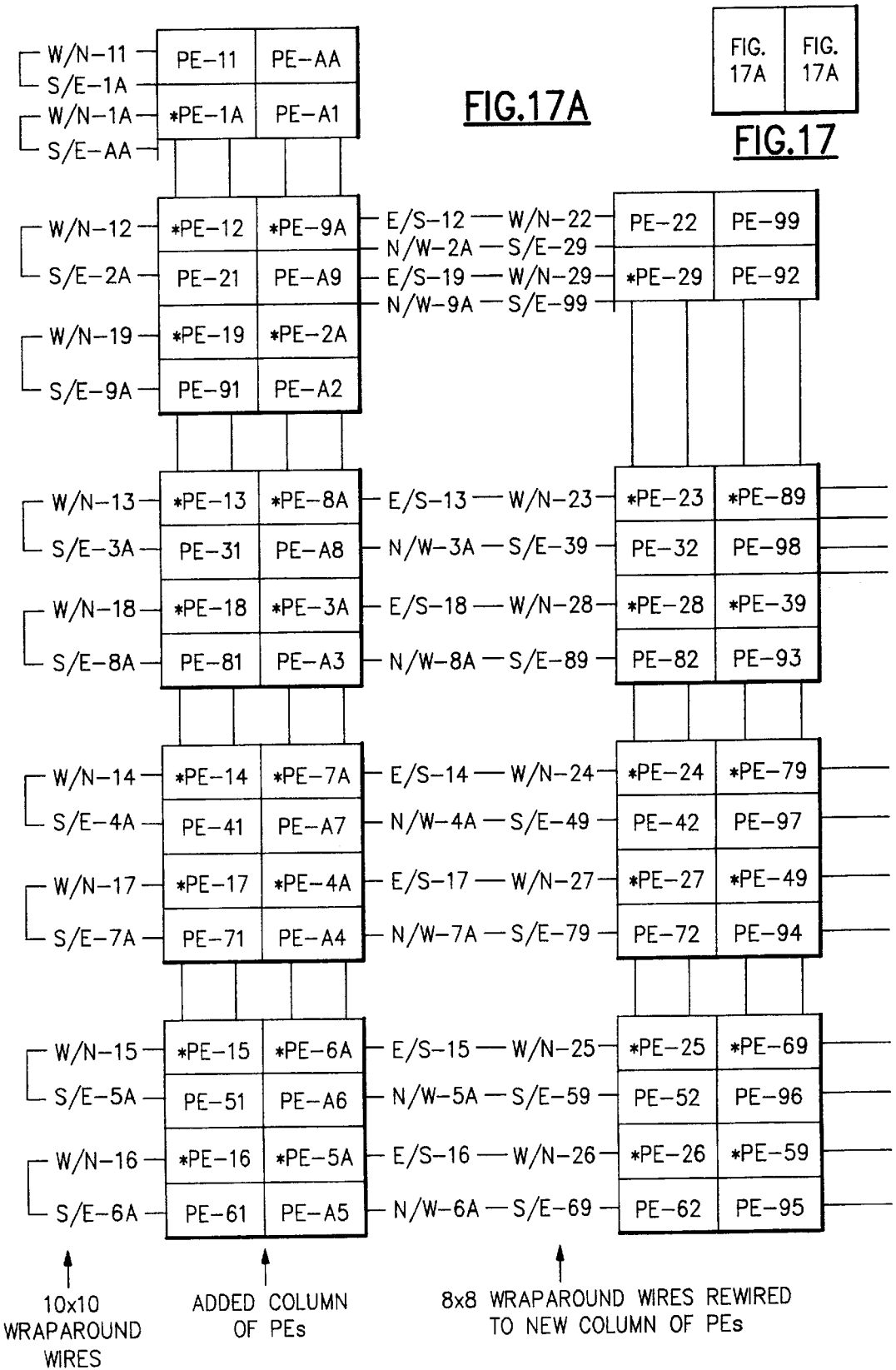

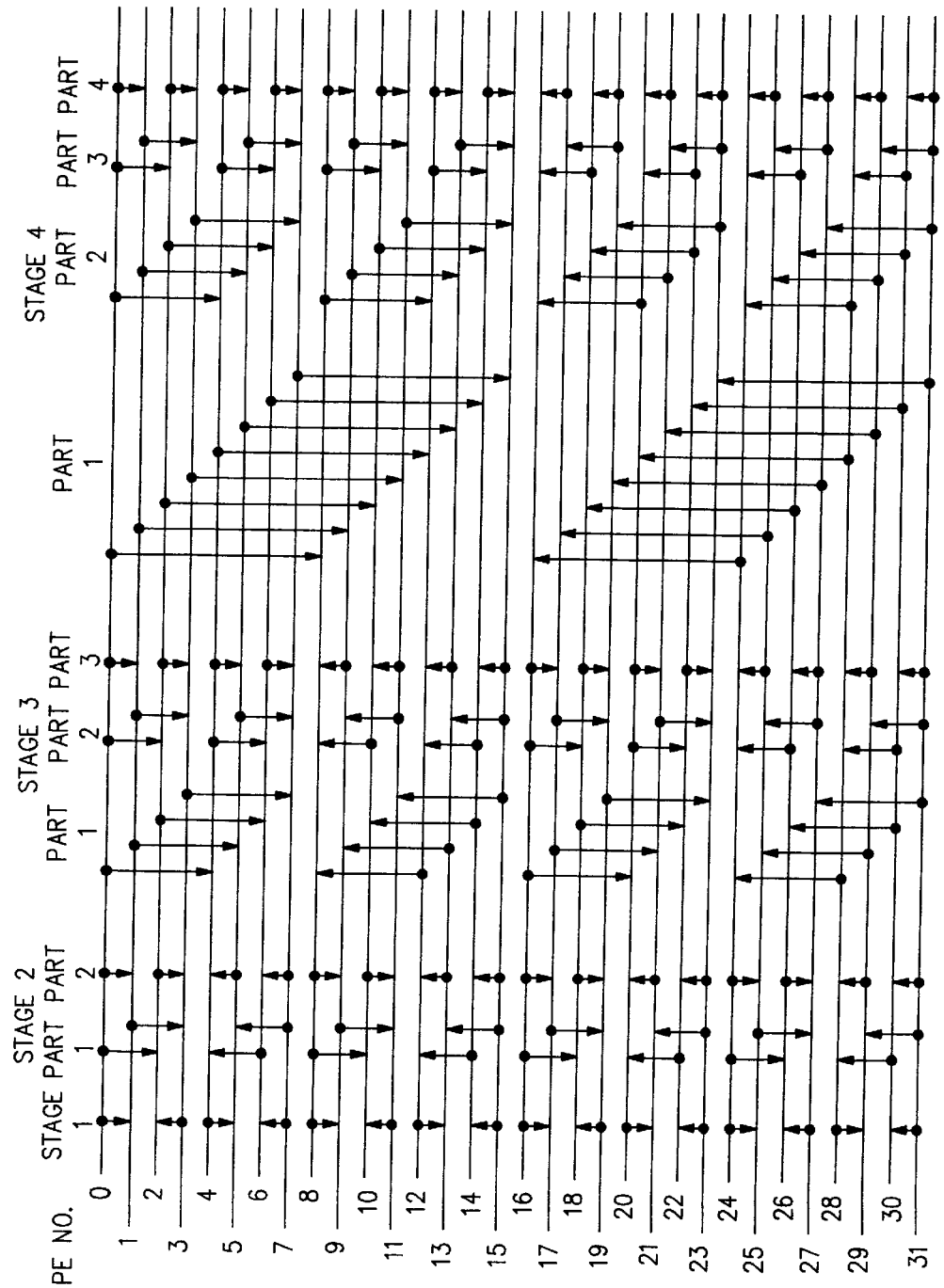
FIG.22A(a) Prior Art

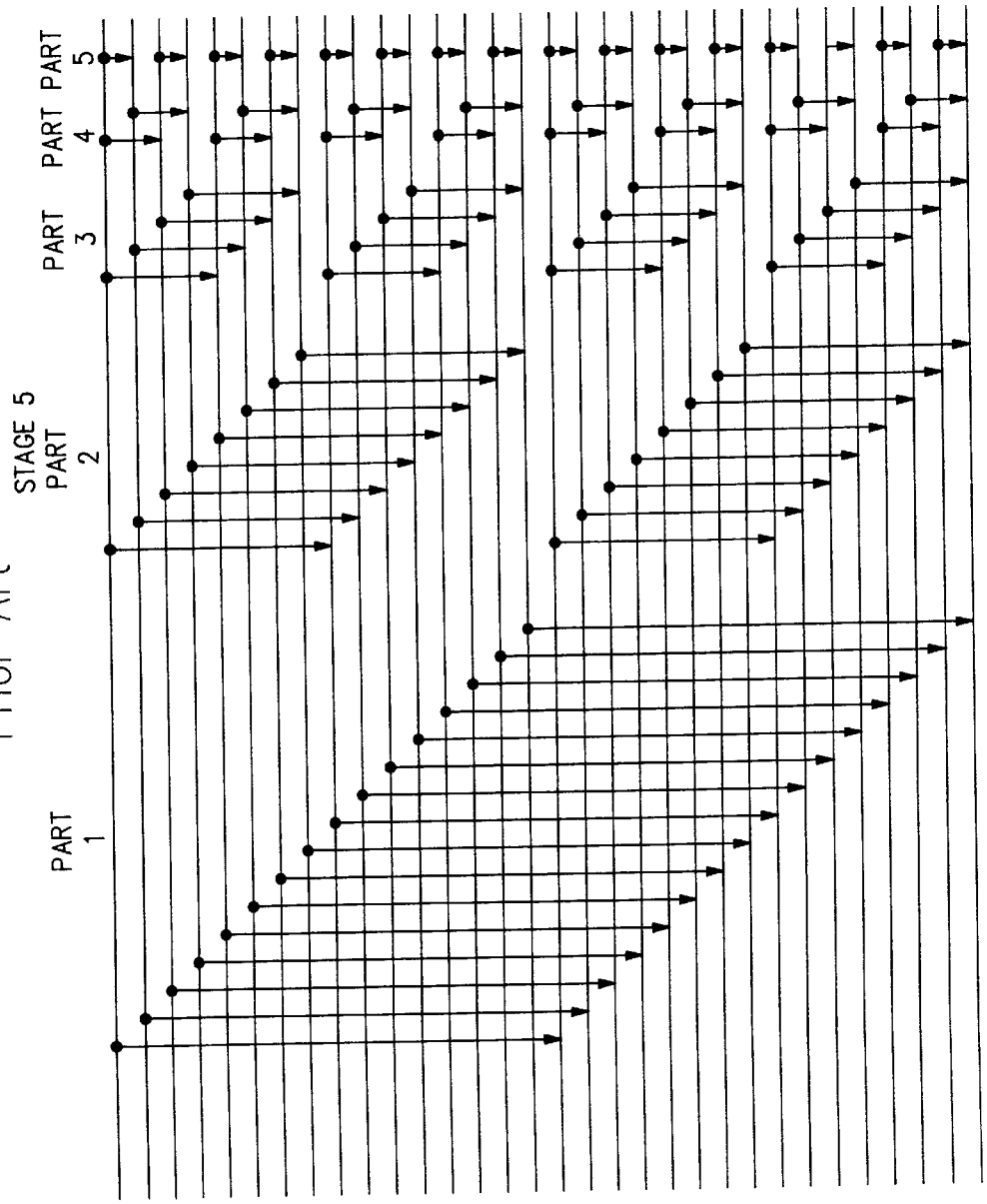
FIG.22A(b) Prior Art

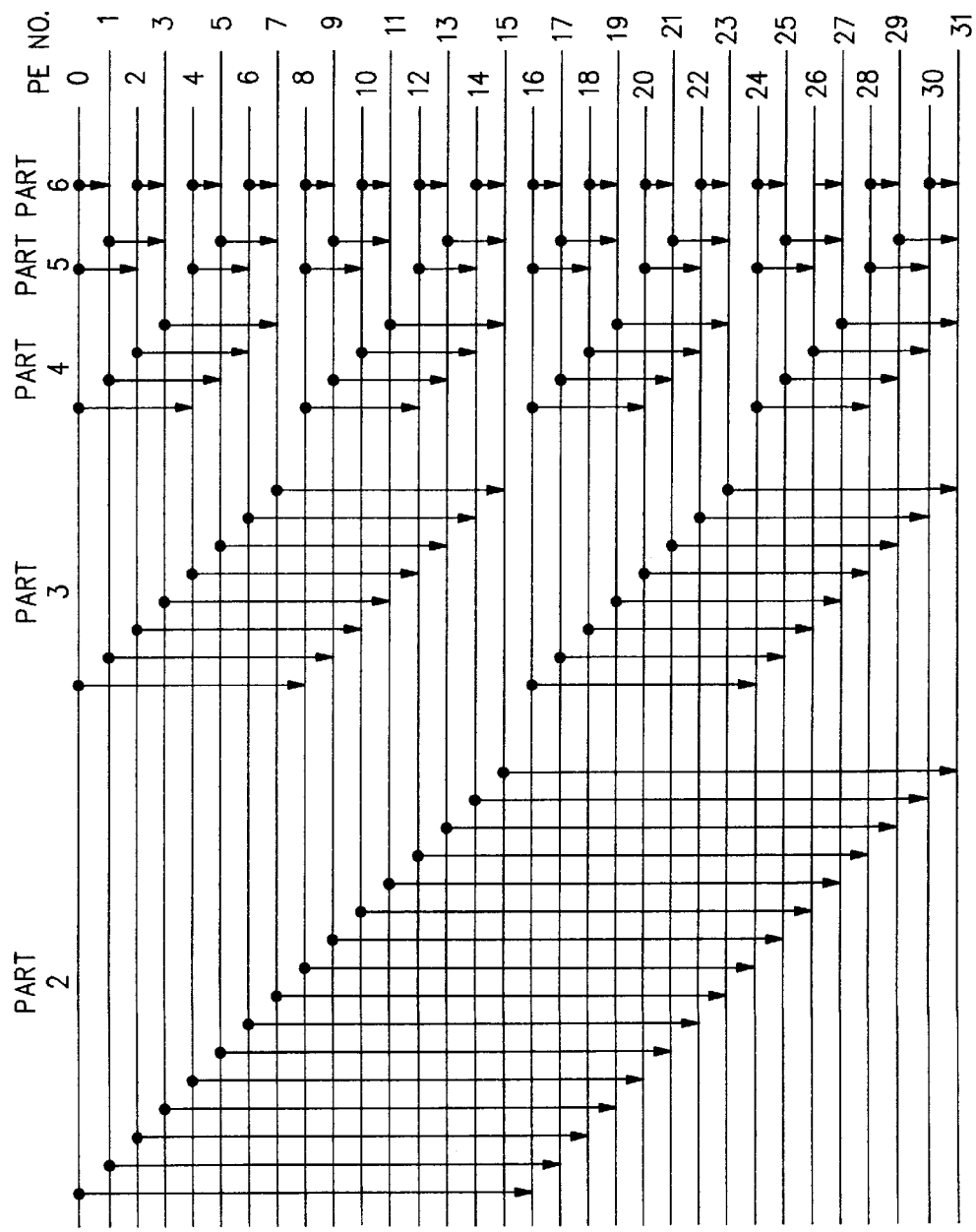
FIG.22B(b) Prior Art

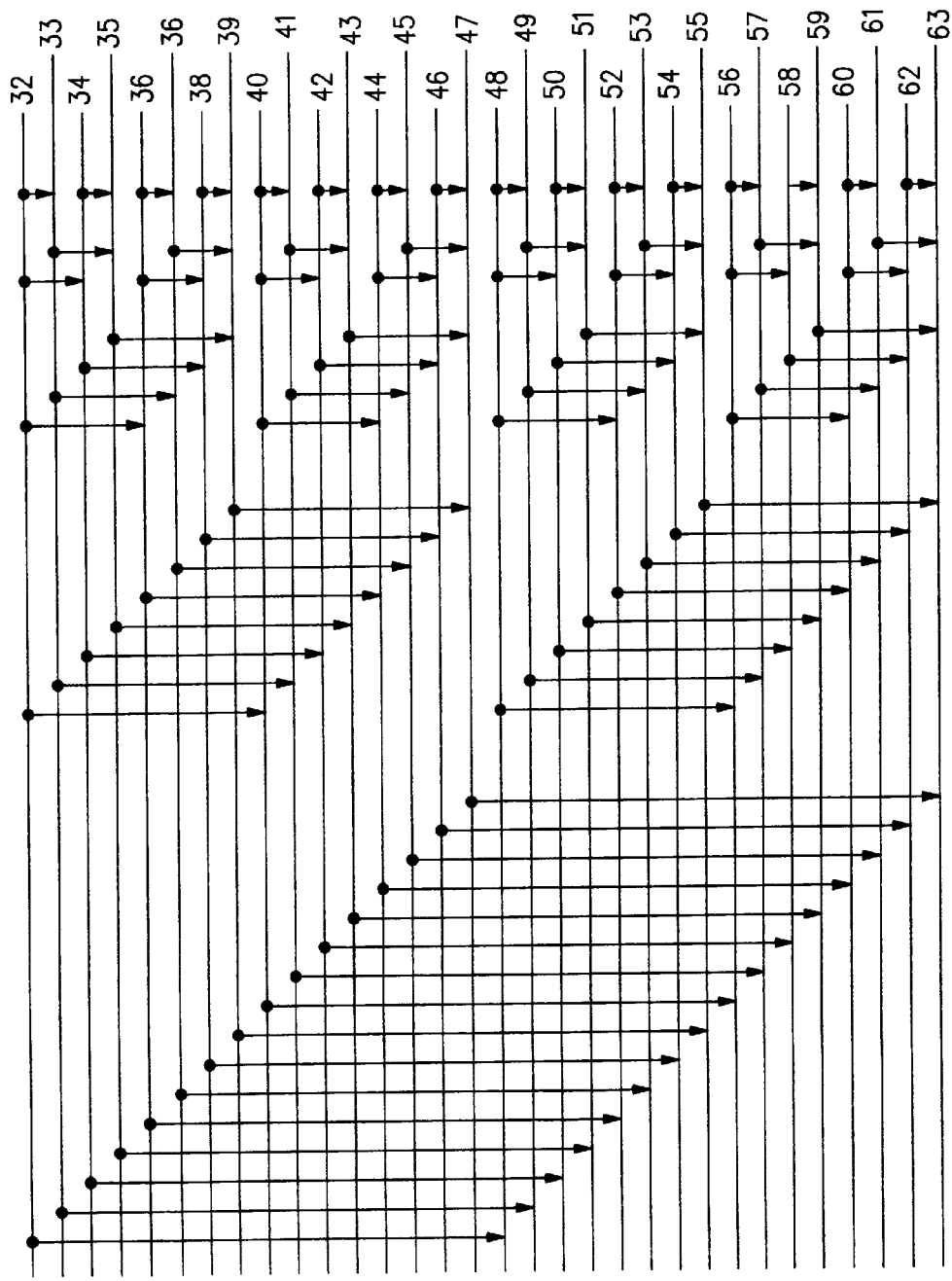
FIG.22B(d) Prior Art

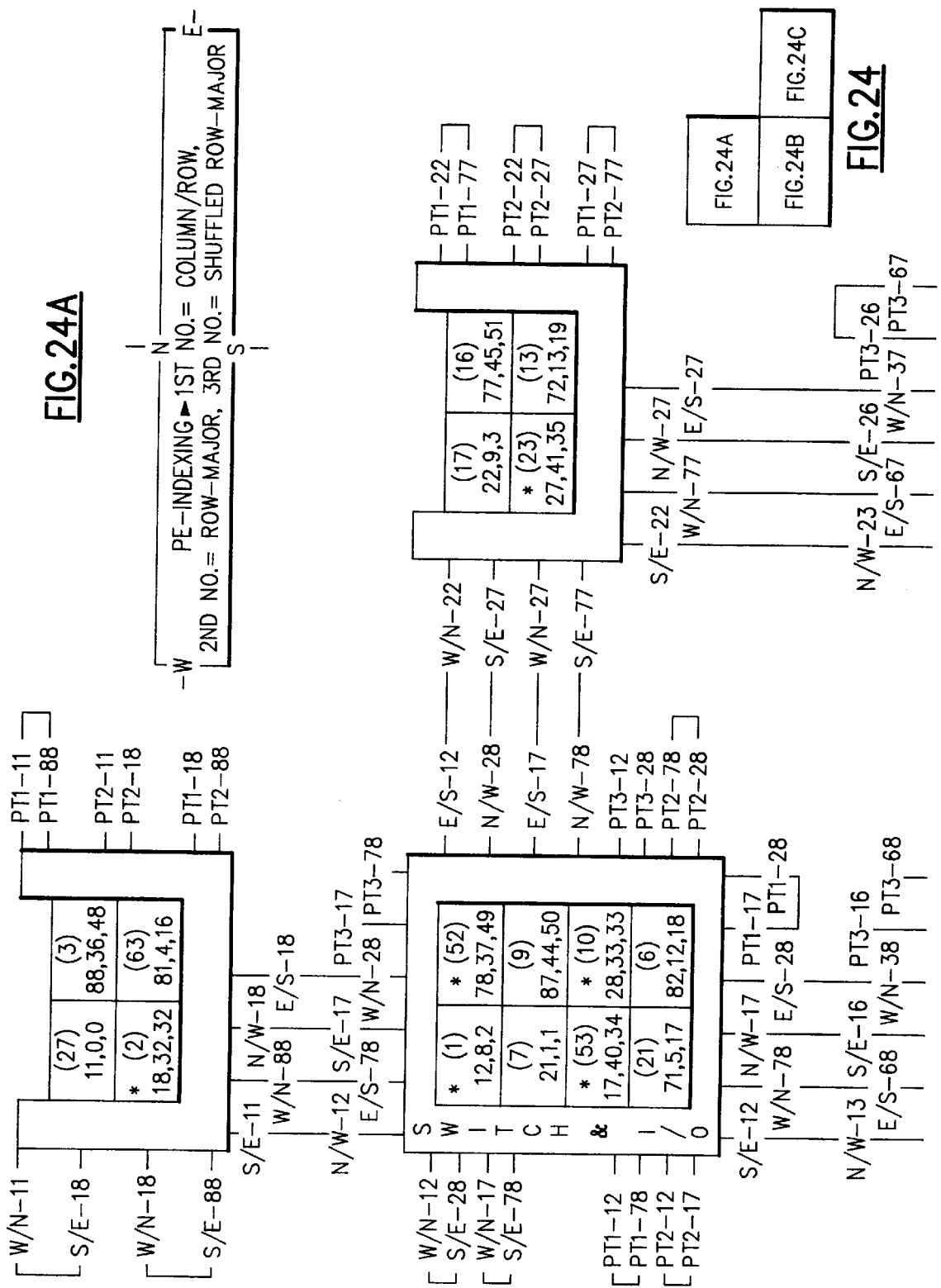

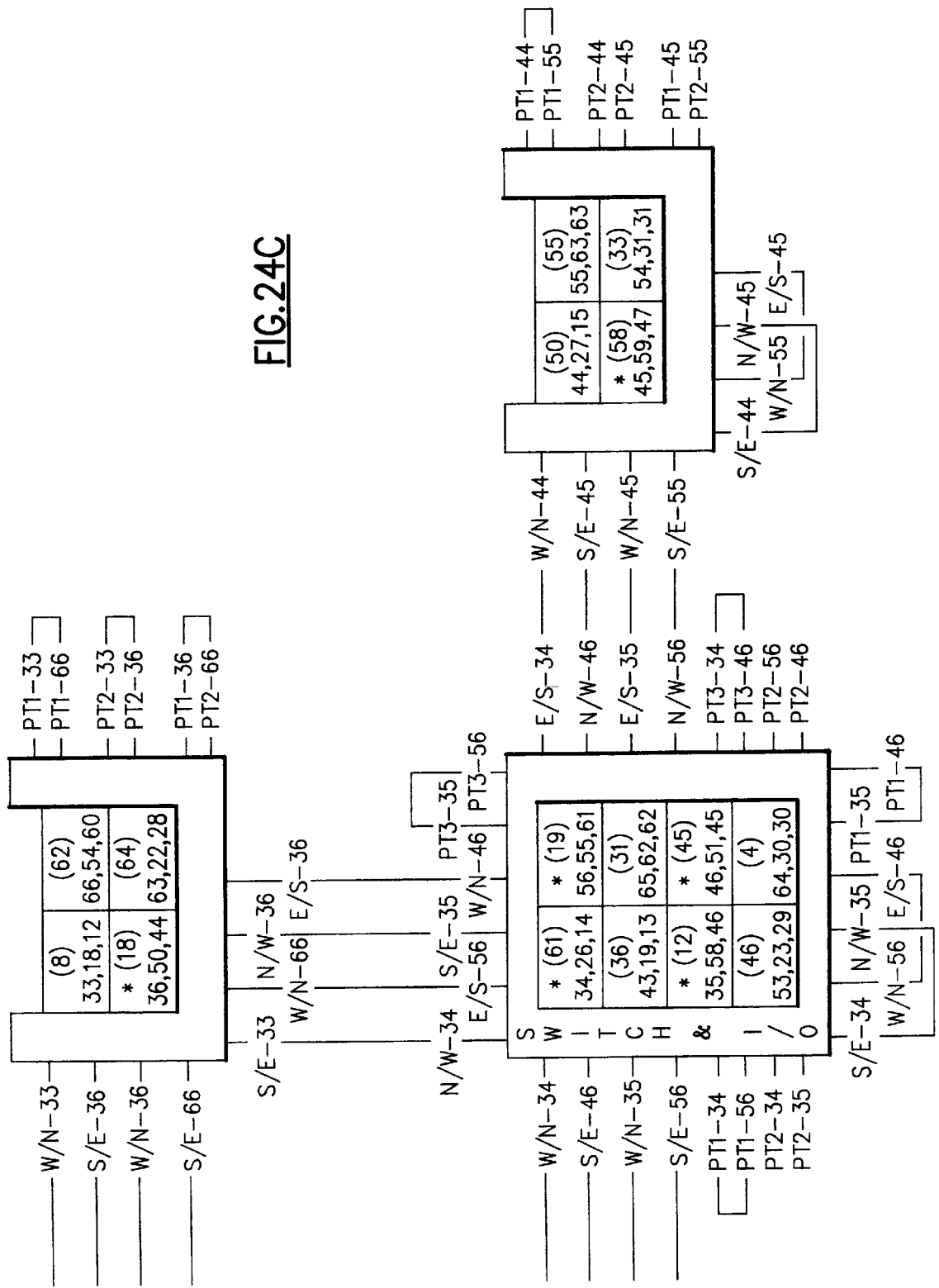

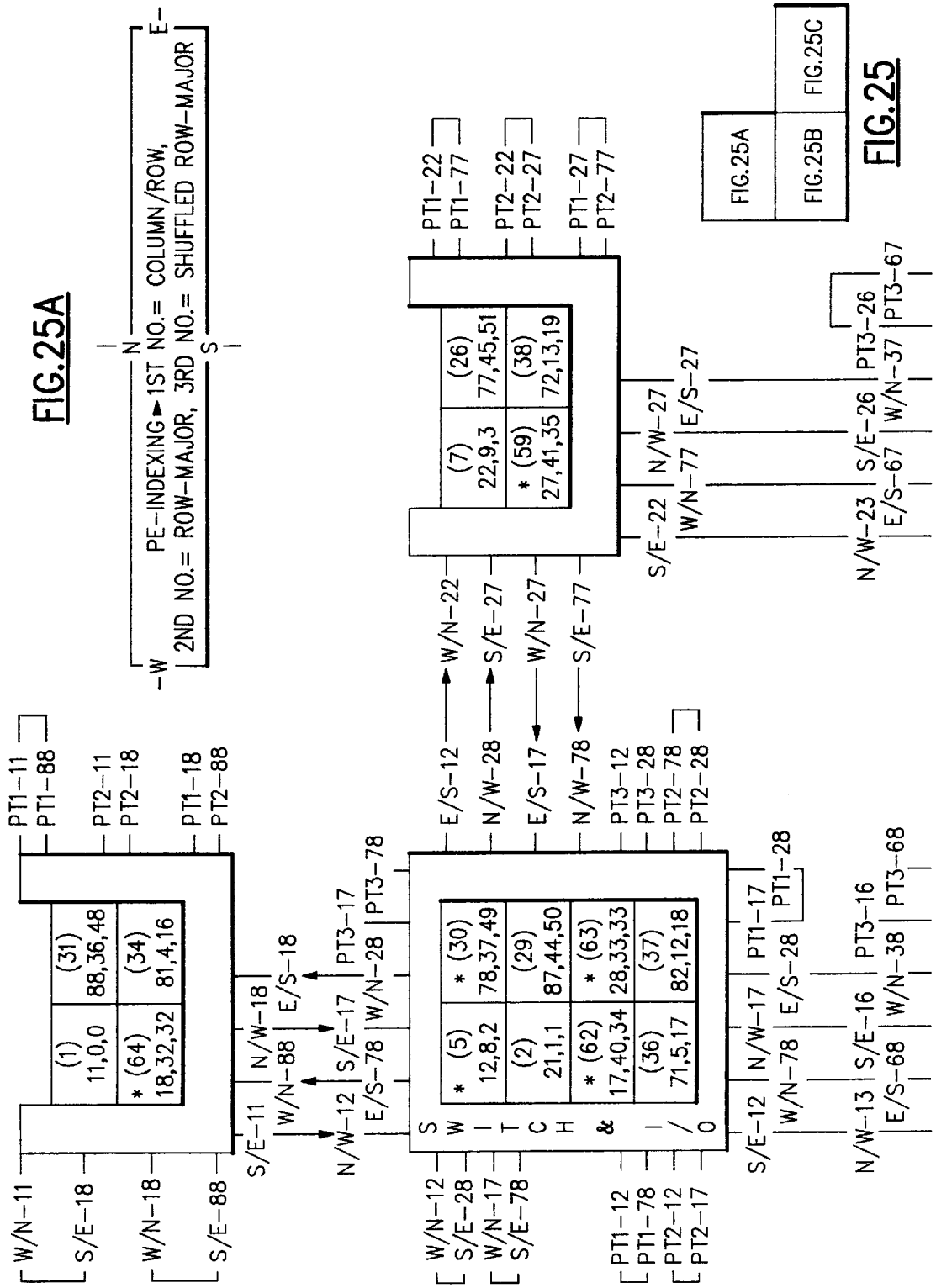

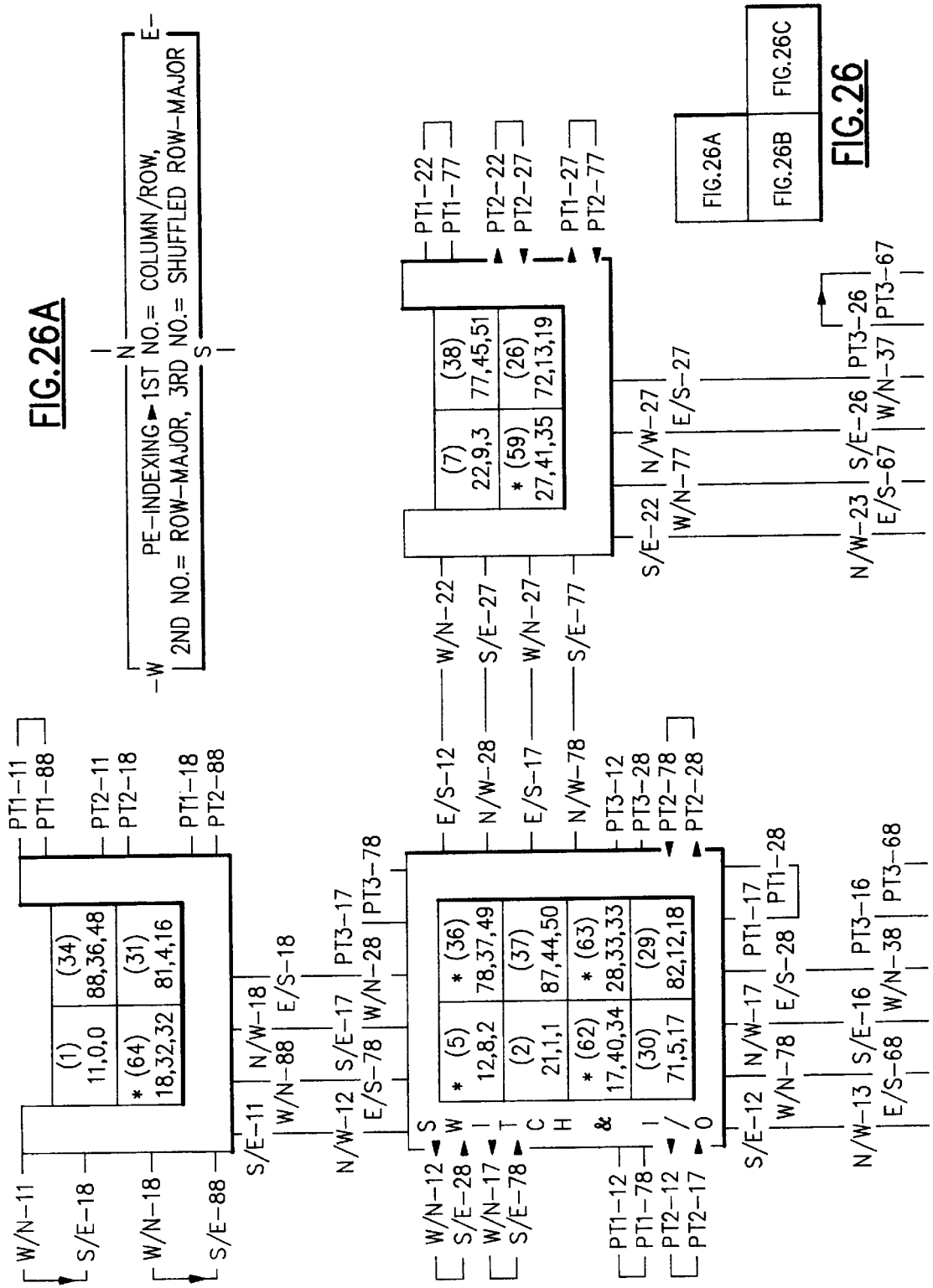

MASSIVELY PARALLEL MULTIPLE-FOLDED CLUSTERED PROCESSOR MESH ARRAY

FIELD OF THE INVENTION

These inventions relate to multi-media image processing, computers, and particularly to massively parallel array processors.

CROSS REFERENCE TO RELATED APPLICATIONS

This continuing application claims priority and is filed before the patenting or abandonment of or termination of proceedings on the following parent applications or an application similarly entitled to the benefit of the filing date of these applications:

U.S. Ser. No. 07/526,866 filed May 22, 1990, of S. Vassiliadis et al, entitled: Orthogonal Row-Column Neural Processor (now U.S. Pat. No. 5,065,339, issued Nov. 12, 1991); and its following pending divisional applications:

U.S. Ser. No. 07/740,355 filed Aug. 5, 1991, of S. Vassiliadis et al, entitled: Scalable Nerual Array Processor, now U.S. Pat. No. 5,146,543and, U.S. Ser. No. 07/740,556 filed Aug. 5, 1991, of S. Vassiliadis et al, entitled: Adder Tree for a Neural Array Processor, now U.S. Pat. No. 5,146,420; and, U.S. Ser. No. 07/740,568 filed Aug. 5, 1991, of S. Vassiliadis et al, entitled: Apparatus and Method for Neural Processor, now abandoned; and, U.S. Ser. No. 07/740,266 filed Aug. 5, 1991, of S. Vassiliadis et al, entitled: Scalable Neural Array Processor and Method, now U.S. Pat. No. 5,148,515; and U.S. Ser. No. 07/682,786, filed Apr. 8, 1991, of G. G. Pechanek et al, entitled: Triangular Scalable Neural Array Processor, now abandoned.

U.S. Ser. No. 07/681,842 filed Apr. 8, 1991, of G. G. Pechanek et al, entitled: SPIN: A Sequential Pipelined Neurocomputer, now U.S. Pat. No. 5,337,395.

U.S. Ser. No. 07/702,261, filed May 17, 1991, of G. G. Pechanek et al, entitled: A Learning Machine Synapse Processor System Apparatus, now abandoned.

U.S. Ser. No. 07/702,260, filed May 17, 1991, of G. G. Pechanek et al, entitled: Virtual Neurocomputer Architectures for Neural Networks, now U.S. Pat. No. 5,243,688.

U.S. Ser. No. 07/702,262, filed May 17, 1991, of G. G. Pechanek et al, entitled: Scalable Flow Virtual Learning Neurocomputer, now abandoned.

U.S. Ser. No. 07/702,263, filed May 17, 1991, of G. G. Pechanek et al, entitled: PLAN: Pyramid Learning Architecture Neurocomputer, now abandoned.

U.S. Ser. No. 07/881,597, filed May 12, 1992, of G. G. Pechanek et al, entitled: Massively Parallel Diagonal-Fold Tree Array Processor, now abandoned.

U.S. Ser. No. 07/881,594, filed May 12, 1992, of G. G. Pechanek et al, entitled: Scalable Massively Parallel Group Partitioned Diagonal-Fold Switching Tree Computing Apparatus, now abandoned.

The following application, which is a continuation-in-part of the aforenamed applications, namely, U.S. Ser. No. 07/864,112, filed Apr. 6, 1992, of G. G. Pechanek et al, entitled: Massively Parallel Array Processor, now abandoned.

These applications and the present continuation-in-part application are owned by one and the same assignee, namely, International Business Machines Corporation of Armonk, N.Y.

The descriptions set forth in these above applications are hereby incorporated into the present application.

REFERENCES USED IN THE DISCUSSION OF THE INVENTIONS

During the detailed description which follows the following works will be referenced as an aid for the reader. These additional references are:

1. U.S. Ser. No. 07/799,602, filed Nov. 27, 1991, by H. Olnowich, entitled: "Multi-Media Serial Line Switching Adapter for Parallel Networks and Heterogenous and Homologous Computer Systems".
2. U.S. Ser. No. 07/798,788, filed Nov. 27, 1991, by P. M. Kogge, entitled: "Dynamic Multi-mode Parallel Processor Array Architecture". (Systems which allow dynamic switching between MIMD, SIMD, and SISD).
3. R. J. Gove, W. Lee, Y. Kim, and T. Alexander, "Image Computing Requirements for the 1990s: from Multimedia to Medicine," *Proceedings of the SPIE* Vol. 1444-Image Capture, Formatting, and Display, pp. 318–333, 1991 now abandoned.
4. K. E. Batcher, "Design of a Massively Parallel Processor," *IEEE Transactions on Computers* Vol. C-29, No. 9, pp. 836–840, September 1980.
5. L. Uhr, *Multi-Computer Architectures for Artificial Intelligence*. New York, N.Y.: John Wiley & Sons, chap.8, pp.97, 1987.
6. R. Cypher and J. L. C. Sanz, "SIMD Architectures and Algorithms for Image Processing and Computer Vision," IEEE *Transactions on Acoustics, Speech, and Signal Processing*, Vol. 37, No. 12, pp. 2158–2174, December 1989.
7. D. E. Knuth, *The Art of Computer Programming Volume 3/Sorting and Searching*. Philippines:Addison-Wesley Publishing Company, Inc., chap.5.3.4, pp.232–233, 1973.
8. U.S. Ser. No. 07/864,112, filed Apr. 6, 1992, of G. G. Pechanek et al, entitled: Massively parallel array processor (the above referenced co-pending application from which priority is claimed, now abandoned).

BACKGROUND OF THE INVENTIONS

During the detailed discussion of our inventions, we will reference other work including our own unpublished works, as mentioned above. These background literature references are incorporated herein by reference.

In the never ending quest for faster computers, engineers are linking hundreds, and even thousands of low cost microprocessors together in parallel to create super supercomputers that divide in order to conquer complex problems that stump today's machines. Such machines are called massively parallel. Multiple computers operating in parallel have existed for decades. Early parallel machines included the ILLIAC which was started in the 1960s. Other multiple processors include (see a partial summary in U.S. Pat. No. 4,975,834 issued Dec. 4, 1990 to Xu et al) the Cedar, Sigma-1, the Butterfly and the Monarch, the Intel ipsc, The Connection Machines, the Caltech COSMIC, the N Cube, IBM's RP3, IBM's GF11, the NYU Ultra Computer, the Intel Delta and Touchstone.

Large multiple processors beginning with ILLIAC have been considered supercomputers. Supercomputers with greatest commercial success have been based upon multiple vector processors, represented by the Cray Research Y-MP systems, the IBM 3090, and other manufacturer's machines including those of Amdahl, Hitachi, Fujitsu, and NEC.

Massive Parallel (MP) processors are now thought of as capable of becoming supercomputers. These computer systems aggregate a large number of microprocessors with an interconnection network and program them to operate in parallel. There have been two modes of operation of these computers. Some of these machines have been MIMD mode machines. Some of these machines have been SIMD mode machines. Perhaps the most commercially acclaimed of these machines has been the Connection Machines series 1 and 2 of Thinking Machines, Inc. These have been essentially SIMD machines. Many of the massively parallel machines have used microprocessors interconnected in parallel to obtain their concurrency or parallel operations capability. Intel microprocessors like i860 have been used by Intel and others. N Cube has made such machines with Intel '386 microprocessors. Other machines have been built with what is called the "transputer" chip. Inmos Transputer IMS T800 is an example. The Inmos Transputer T800 is a 32 bit device with an integral high speed floating point processor.

As an example of the kind of systems that are built, several Inmos Transputer T800 chips each would have 32 communication link inputs and 32 link outputs. Each chip would have a single processor, a small amount of memory, and communication links to the local memory and to an external interface. In addition, in order to build up the system communication link adaptors like IMS C011 and C012 would be connected. In addition switches, like a IMS C004 would be profited to provide, say, a crossbar switch between the 32 link inputs and 32 link outputs to provide point to point connection between additional transputer chips. In addition, there will be special circuitry and interface chips for transputers adapting them to be used for a special purpose tailored to the requirements of a specific device, a graphics or disk controller. The Inmos IMS M212 is a 16 bit process, with on chip memory and communication links. It contains hardware and logic to control disk drives and can be used as a programmable disk controller or as a general purpose interface. In order to use the concurrency (parallel operations) Inmos developed a special language, Occam, for the transputer. Programmers have to describe the network of transputers directly in an Occam program.

Some of these MP machines use parallel processor arrays of processor chips which are interconnected with different topologies. The transputer provides a crossbar network with the addition of IMS C004 chips. Some other systems use a hypercube connection. Others use a bus or mesh to connect the microprocessors and there associated circuitry. Some have been interconnected by circuit switch processors that use switches as processor addressable networks. Generally, as with the 14 RISC/6000s which were interconnected last fall at Lawarence Livermore by wiring the machines together, the processor addressable networks have been considered as coarse-grained multi-processors.

Some very large machines are being built by Intel and nCube and others to attack what are called "grand challenges" in data processing. However, these computers are very expensive. Recent projected costs are in the order of $30,000,000,00 to $75,000,000,00 (Tera Computer) for computers whose development has been funded by the U.S. Government to attack the "grand challenges". These "grand challenges" would include such problems as climate modeling, fluid turbulence, pollution dispersion, mapping of the human genome and ocean circulation, quantum chromodynamics, semiconductor and supercomputer modeling, combustion systems, vision and cognition.

One problem area involved in the implementation of a massively parallel processing system is visual information processing which can be considered to consist of three different processing domains: image processing, pattern recognition, and computer graphics. The merger of image processing, pattern recognition and computer graphics is referred to as image computing and represents a capability required by the multimedia workstations of the future. "Multimedia refers to a technique that presents information in more than one way, such as via images, graphics, video, audio, and text, in order to enhance the comprehensibility of the information and to improve human-computer interaction" (See Additional Reference 1).

Sorting is another area suitable for massive parallel processing.

Problems addressed by our Massively Parallel Multiple-Folded Clustered Processor Mesh Array It is a problem for massively parallel array processors to attack adequately the image processing, finite difference method problems, and sorting problems which exist.

One particular algorithm used in image processing is convolution, which replaces each image pixel value with a weighted sum of the pixels in a defined surrounding area or window of pixels. A M×M square convolution window consists of a set of M×M weights, each corresponding to the associated pixels located in the window (Additional Cypher et al.). For an N by N array of pixels, the convolution algorithm requires $M^2N^2$ multiplication operations. Assuming an N of 1024 and a M of 3 a single image frame convolution would take 9 million multiplications and sum of product calculations per convolution and if the processing is on video data occurring at a rate of 30 frames per second then 270 million multiplications sum of product calculations per second would be required. For a uniprocessor to process this data, where each convolution window weight value must be fetched separately, with the multiple and add treated as separate operations, and followed by a write of the weighted average pixel result, the convolution would consist of 27 separate operations per pixel (9 reads, 9 multiplies, 8 adds, and 1 write) resulting in 27 million×30 operations per second or 810 million operations per second (Additional Gove et al.). Due to the high computational load, special purpose processors have been proposed to off load the image processing task from the system processor and to provide the adequate through put required for image computing. One of these special purpose processors is the nearest neighbor mesh connected computer (See Additional Cypher et al., Batcher, and Uhr-pp. 97) where multiple Processor Elements (PEs) are connected to their north, south, east west neighbor PEs and all PEs are operated in a synchronous Single Instruction Multiple Data (SIMD) fashion. It is assumed that a PE can communicate with any of its neighboring PEs but only one neighbor PE at a time. For example, each PE can communicate to their east neighbor PE, in one communication cycle. It is also assumed that a broadcast mechanism is present such that data and instructions can be communicated simultaneously to all PEs in one broadcast communication period. Bit serial interfaces are typical, as they were present in the Thinking Machines CM-1 family.

In the Massively Parallel Array Processor (Pechanek et al. 1992) a single diagonal-fold processor array provided the computational needs for the image processing convolution and finite difference method applications. It is recognized as needed a method of scaling and enhancing the connectivity of the Massively Parallel Array Processor and providing a general purpose processing node architecture encompassing the image processing and finite difference method requirements while extending the capabilities to cover more general purpose applications such as sorting.

SUMMARY OF OUR INVENTION

The improvements which we have made result in a new machine apparatus. We have provided a way to fold a processor interconnection to achieve simplicity and speed, in a way that allows multiple processor units to be intercoupled to achieve either a square mesh equivalency or a hexagonal mesh equivalency while eliminating the wiring problems which would be required if traditional approaches were employed. In addition to equivalency, the multiple folded structure which we will describe improves interprocessor connectivity and achieves the ability to scale array organizations easily and without having to rearrange all of wrap around wiring that would be required with traditional approaches. Our wiring permits direct and local interconnections to achieve scaleability.

As a result, we provide a parallel array organization for a computer system which will have many computer processor units, as many as thousands, with interconnected clusters of processors in an array organization. Our array organization enabling said plurality of computer processor units to function in a massively parallel computer system organization for executing general purpose applications, including multimedia, finite difference methods of solving differential equations, and sorting. We have expanded upon the folded concept of our earlier Massively Parallel Array Processor and now have provided for coupling the cluster processor units with a first, second and third fold of a mesh interconnection.

With our system a functional array having arithmetic logic functions and for permitting external communication is formed into an array of processor elements (PEs). The multiple folded PEs are part of the array organization which is arranged in clusters with a multiple folded interconnection of processing elements. Each of the plurality of processing elements provides for connection to PEs to the neighboring PEs. A computer interface is provided among PEs, providing a network structure enabling symmetric processing to share wiring. For example, all PEs transferring data North, are coupled processing elements together sharing the north-south wires with the east-west wires, thereby reducing the wiring complexity without affecting performance.

Our interconnection in an array organization is achieved by providing processor cluster units having arithmetic functions with a way to be coupled together to form a resulting multiple folded array processor for providing a matrix transformation operation to be accomplished in one cycle by simple interchange of the data elements in dual symmetric processing elements. This enables use with an array of processing element for providing a parallel 2-D convolution mechanism for image processing and multimedia applications, for a finite difference method of solving differential equations, and for sorting.

Our processor cluster unit for a massively parallel computer system, has multiple execution units, a broadcast memory interface for receiving data and instructions, and multiple interprocessor communication interface means for the processor cluster unit to other processor cluster units of a parallel array of processor cluster units. The cluster unit has an instruction data buffer coupled to said broadcast memory interface for receiving instructions and data. An instruction register processing control instructions and is coupled to the instruction data buffer. For each of the execution units we provide multiple data storage registers to which data is distributed by a distribution unit controlled by the instruction register and coupled to the the data buffer and the multiple execution units. In order to interconnect the units, we have provided a common selector unit coupled to said data storage registers of the multiple execution unit for retrieving data therefrom and for passing said data to a selected execution unit and to said multiple interprocessor communication interface.

We have also provided new facilities for computation, and these are described in the detail below.

These and other improvements are set forth in the following detailed description. For a better understanding of the inventions with advantages and features, reference may be had to the description and to the drawings.

Figure 1:
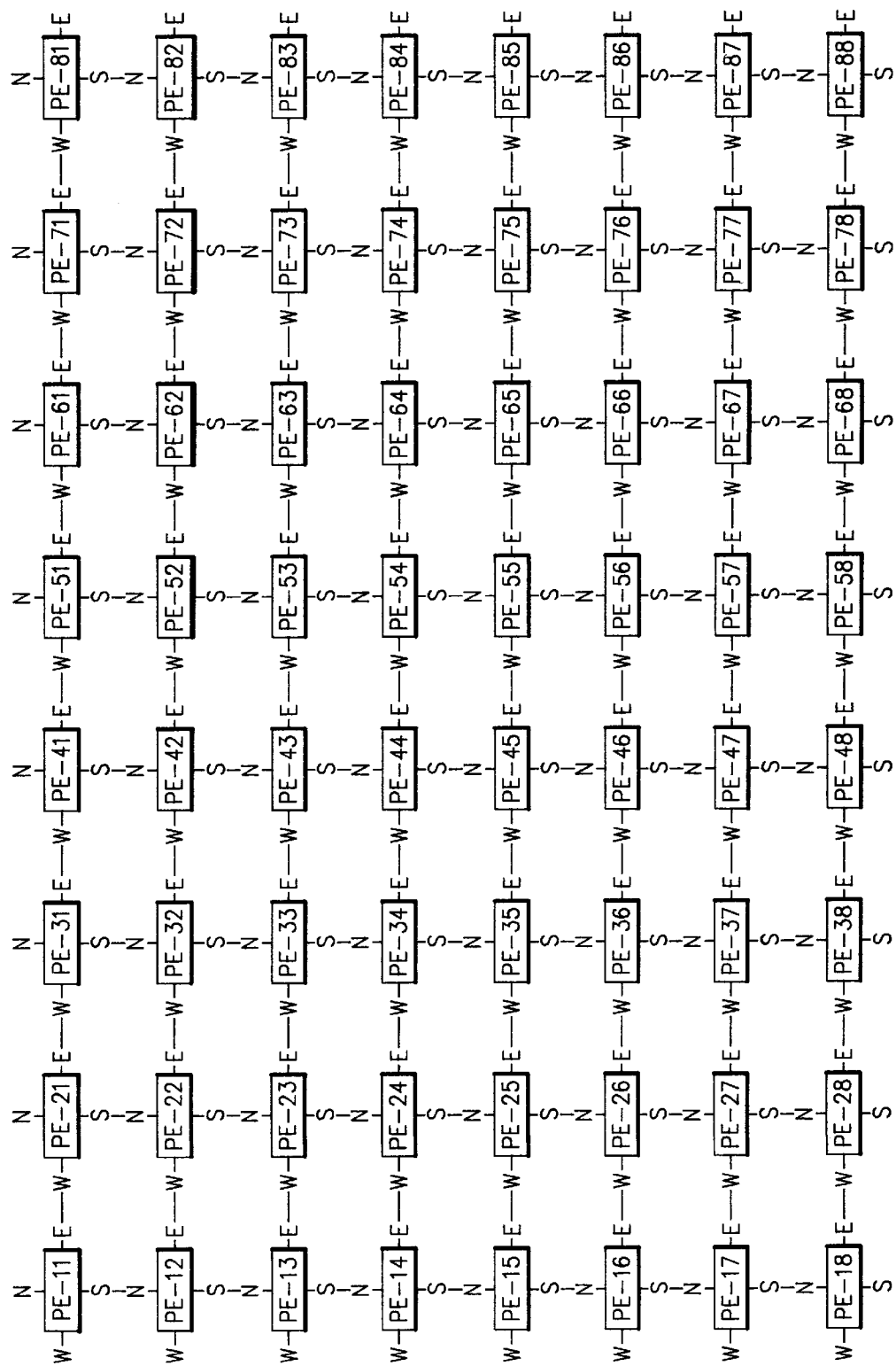
FIG. 1 shows a 8×8 mesh for convolution image processing.

(Note: For convenience of illustration, FIGURES may be separated in parts and as a convention we place the top of the FIGURE as the first sheet, with subsequent sheets proceeding down and across when viewing the FIGURE, in the event that multiple sheets are used.)

Our detailed description explains the preferred embodiments of our inventions, together with advantages and features, by way of example with reference to the above drawings.

DETAILED DESCRIPTION OF THE INVENTIONS.

1. INTRODUCTION

We call the machine which implements our invention the Massively Parallel Multiple-Folded Clustered Processor Mesh Array and we will describe it below. Our present invention relates to the apparatus which enables making a massively parallel computing system appropriate for multimedia image processing and more general purpose applications such as sorting. We present a new Processor Element (PE) encompassing the architecture of the Massively Parallel Array Processor and related architectures of computer systems which can be employed in our massively parallel multiple-folded clustered processor mesh array for general purpose applications such as bitonic sorting.

Two preferable machine organizations are presented utilizing the multiple-folding concept, one which emulates and extends the capabilities of the square North, East, South, West nearest neighbor mesh processor array and the other which emulates and extends the capabilities of the hexagonal six neighborhood mesh processor array.

The PEs in both organizations are interconnected by a nearest neighbor with wrap-around interconnection structure. Each PE is identified with a reference notation to the original square four neighborhood or hexagonal six neighborhood array prior to folding that supports the transport of square or hexagonal mesh algorithms to the new structures.

Multiple-folding the arrays allows the wraparound wires to become connections between local PEs and allows for simplified scaling of the array with enhanced connectivity in the scaled array. By adding additional interconnections within a cluster of processors the overall connectivity of the array is enhanced. This enhancement provides, for the processors in the clusters, greatly reduced communications distances as compared to the communications distances between the same processors in the original unfolded array organization.

With our notation for the square four neighborhood array organization each said processing unit is identified by a two subscript notation $PE_{column, row}$ in reference to the original N by N matrix prior to folding. The apparatus has processor units that include data storage elements, execution units, a broadcast interface for the communications of instructions and data, a data storage interface supporting initialization, and a nearest-neighbor with wrap-around interface, termed the interprocessor interface, and communication's means.

With this introduction to our invention, and before we proceed to our more detailed description of our preferred embodiments, we will recognize that the processing of visual information can be considered to consist of three different processing domains: image processing, pattern recognition, and computer graphics (reference Gove et al. 1991). The merger of these three domains is referred to as image computing and represents a capability required by the multimedia workstations of the future. "Multimedia refers to a technique that presents information in more than one way, such as via images, graphics, video, audio, and text, in order to enhance the comprehensibility of the information and to improve human-computer interaction" (reference Gove et al. 1991). One particular algorithm used in image processing is convolution, which replaces each image pixel value with a weighted sum of the pixels in a defined surrounding area or window of pixels. This represents a high computational load for a processing system. Consequently, special purpose processors have been proposed to off load the image processing task from the system processor and to provide the adequate through put required for image computing. One of the special purpose processors used for image computing is the nearest neighbor mesh connected computer organization (references Batcher 1980, Uhr 1987-pp97, and Cypher et al. 1989).

The massively parallel diagonal-fold mesh array processor consisted of a triangular diagonally folded mesh computer which provided the same functionality as a square mesh computer but with half the number of connection wires. The diagonal-fold mesh array processor is modified herein to provide a more general purpose processor node and to enhance the connectivity between the processing nodes while still providing the image processing and finite difference capabilities of the original structure. The multiple folded mesh processor organization is presented first, followed by a description of a common processor node architecture that incorporates the capabilities of the massively parallel diagonal-fold mesh array nodes for both convolution and finite difference algorithmic support. The discussion then proceeds to describe the method of enhancing the connectivity of the processor array and next presents the application of the folding concept to the six neighborhood hexagonal array processor organization.

In accordance with our inventions we have preferred to describe our inventions with bit-serial interfaces. We should here note that it will be possible to have effective parallel interfaces through other expedients. For instance, the application of Howard Olnowich, discloses a way for use of a protocol to interface bit-serial communication with parallel communication in a multi-system environment as described in U.S. Ser. No. 07/799,602, filed Nov. 27, 1991, in his application entitled: "Multi-Media Serial Line Switching Adapter for Parallel Networks and Heterogenous and Homologous Computer Systems". This application is incorporated by reference.

With appropriate network connections our machine may be employed with systems which allow dynamic switching between MIMD, SIMD, and SISD modes, as described in U.S. Ser. No. 07/798,788, filed Nov. 27, 1991, by P. M. Kogge, in his application entitled: "Dynamic Multi-mode Parallel Processor Array Architecture". Our PE can form part of a parallel array processor composed of many nodes, each node having its PE and Memory, and ports to communicate externally with other nodes.

2. NEAREST NEIGHBOR MESH ORGANIZATION

The nearest neighbor mesh connected computer (references Batcher 1980, Uhr 1987-pp97, and Cypher et al. 1989) is shown in FIG. 1, where multiple Processor Elements (PEs) are connected to their north, south, east west neighbor PEs and all PEs are operated in a synchronous Single Instruction Multiple Data (SIMD) fashion. It is assumed that a PE can communicate with any of its neighboring PEs but only one neighbor PE at a time. For example, each PE can communicate to their east neighbor PE, in one communication cycle. It is also assumed that a broadcast mechanism is present such that data and instructions can be communicated simultaneously to all PEs in one broadcast communication period. To minimize wiring complexity, bit serial interfaces between PEs are assumed.

In FIG. 1, the processing elements are labeled as $PE^{ij}$ where "i" denotes the matrix column and "j" denotes the matrix row. Each $PE_{ij}$ processing element contains four interface ports labeled North (N), East (E), South (S), and West (W). FIG. 1 is an M by M mesh array with M=8, i.e. an 8 by 8 array, resulting in $M^2$ PEs. With wraparound connections, i.e. a torus configuration, each row contains M interconnection wires and with M rows, there are $M^2$ horizontal interconnection wires. Each column contains M interconnection wires and with M columns, there are $M^2$ vertical interconnection wires. The total number of wires in the mesh connected computer with wraparound connections is $2M^2$ (K), where K is equal to the number of interprocessor interconnection wires which for bit-serial interfaces K can be equal to 1.

3. MULTIPLE FOLDED MESH ARRAY PROCESSOR

Figure 2B:
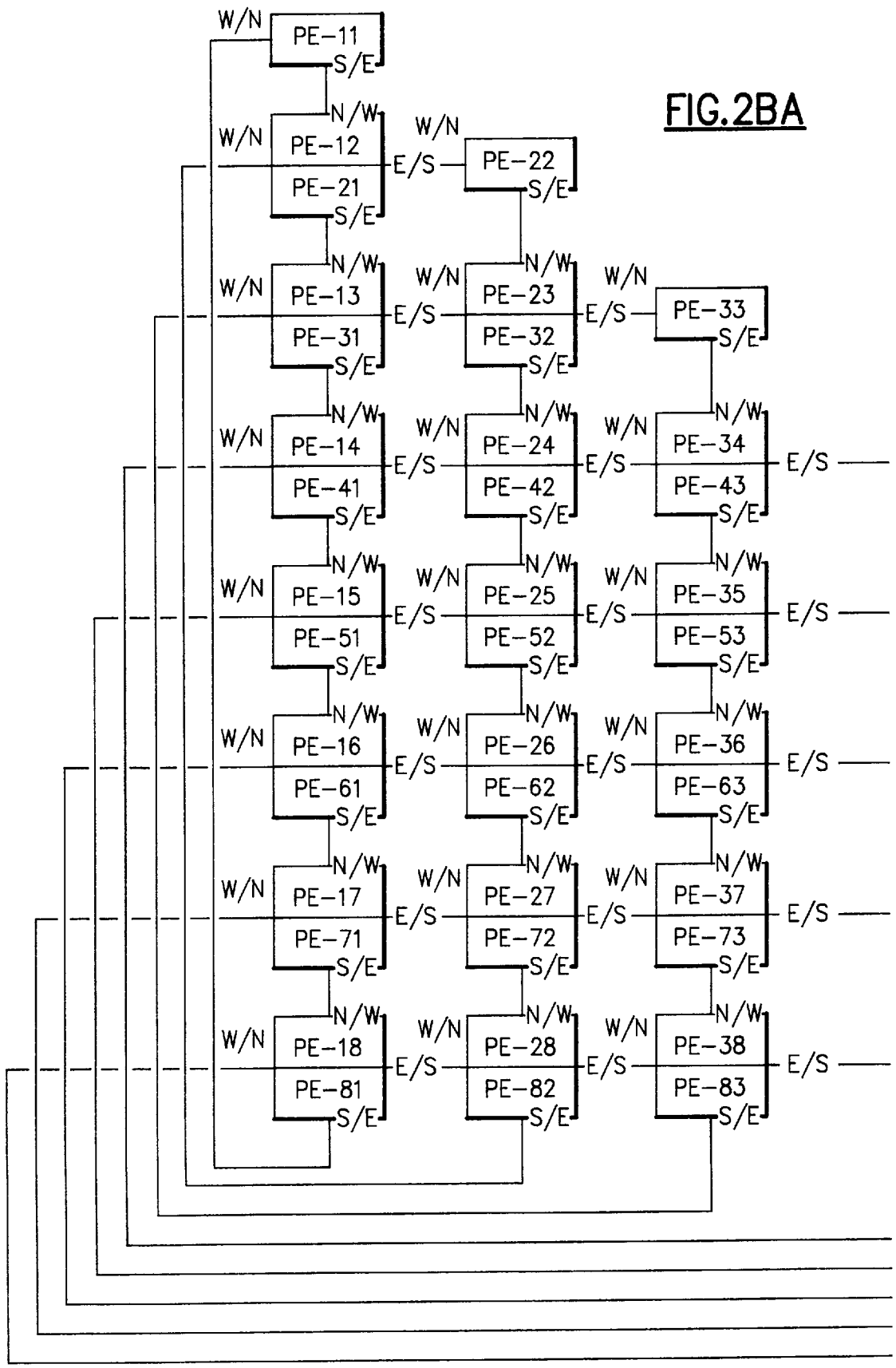
FIG. 2 shows a 8×8 diagonal-fold mesh redrawn with new PE symbolism.
Figure 2B:
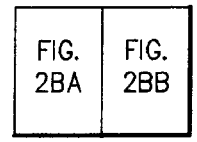
Figure 2B:
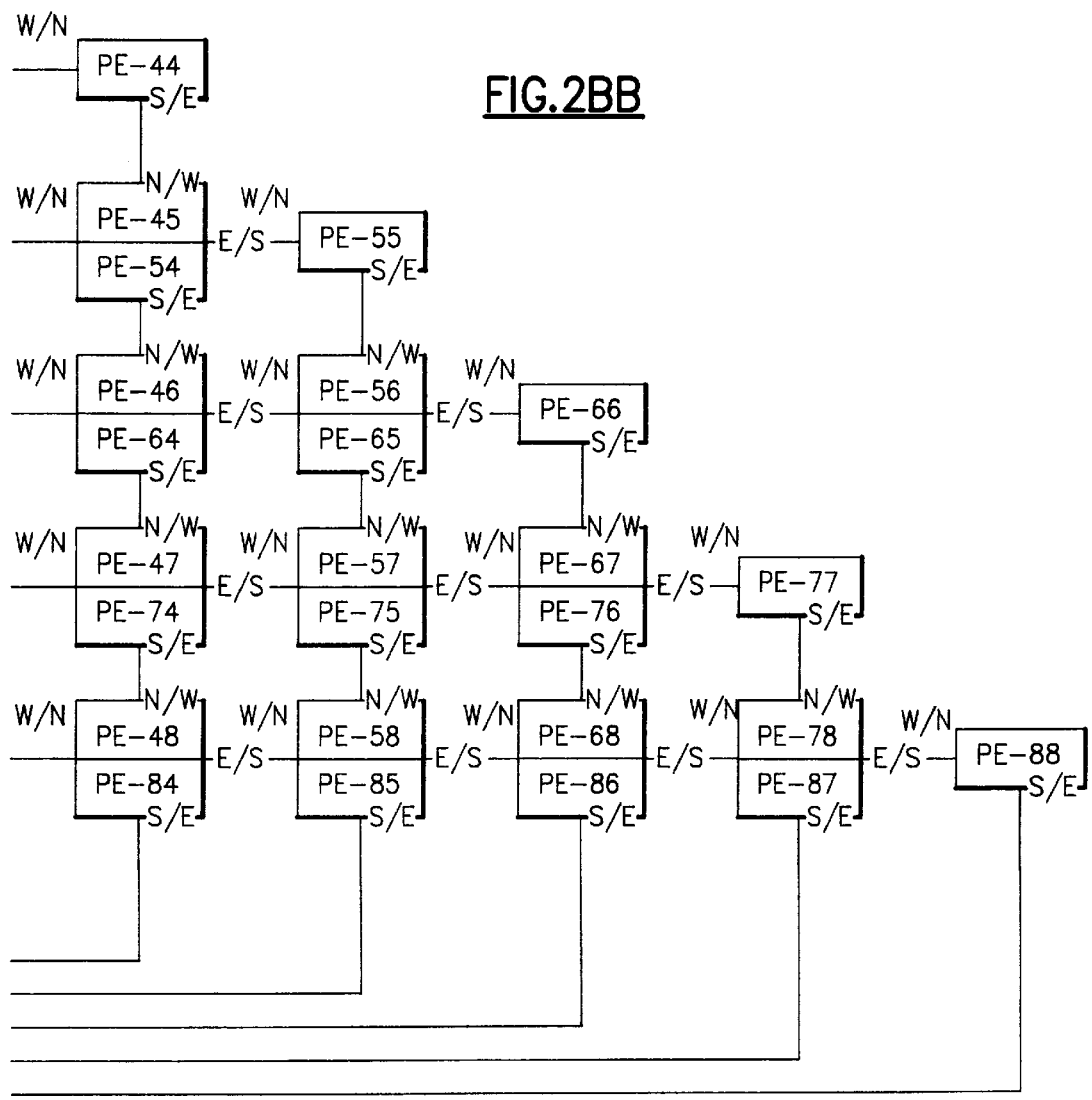

In the mesh connected computer organization of FIG. 1, it can be noted that during any transmission of information in the structure only 50% of the PE connection wires are utilized. It is desirable to achieve the same functionality and performance as the mesh connected computer with half the connecting wires since this amounts to a savings of $M^2$ wires with corresponding savings in chip real estate. The diagonal-fold computer organization achieves this capability. The first step in the process of creating the diagonal-fold organization of PEs is to fold a square mesh connected computer along the $PE_{ii}$ diagonal elements, i.e. "i=j". For example, folding the 8×8 mesh depicted in FIG. 1 results in the diagonal-fold mesh (reference Massively Parallel Array Processor Pechanek et al. 1992) shown in FIGURE 2B, where the symmetric PEs, $PE_{ij}$ and $PE_{ji}$ are placed together. The symmetric PEs share transmission and reception ports, symbolically indicated in FIG. 2A where the top PE's, $PE_{ij}$ W, S, N, and E ports are shared with the bottom PE's, $PE_{ji}$ N, E, W, and S ports respectively. The shared I/O ports are indicated as (PE direction port label) I ( bottom PE direction port label) where $PE_{ij}$ represents the top PE and $PE_{ji}$ represents the bottom PE. The choice of top and bottom PE notation is for ease of discussion and representation only.

The folding of the square mesh structure along the diagonal places the top edge of the square mesh in line with the West edge and the East edge of the square mesh in line with the South edge. The 2M wraparound connections of the square mesh computer organization which are between the North/South edges and the East/West edges of the square array can be shared in the diagonal-fold mesh organization requiring only M wraparound connections. The total number of diagonal-fold mesh array wires was demonstrated in the Massively Parallel Array Processor Pechanek et al. 1992, to be exactly one half the number of wires required by the square mesh organization.

Figure 3C:
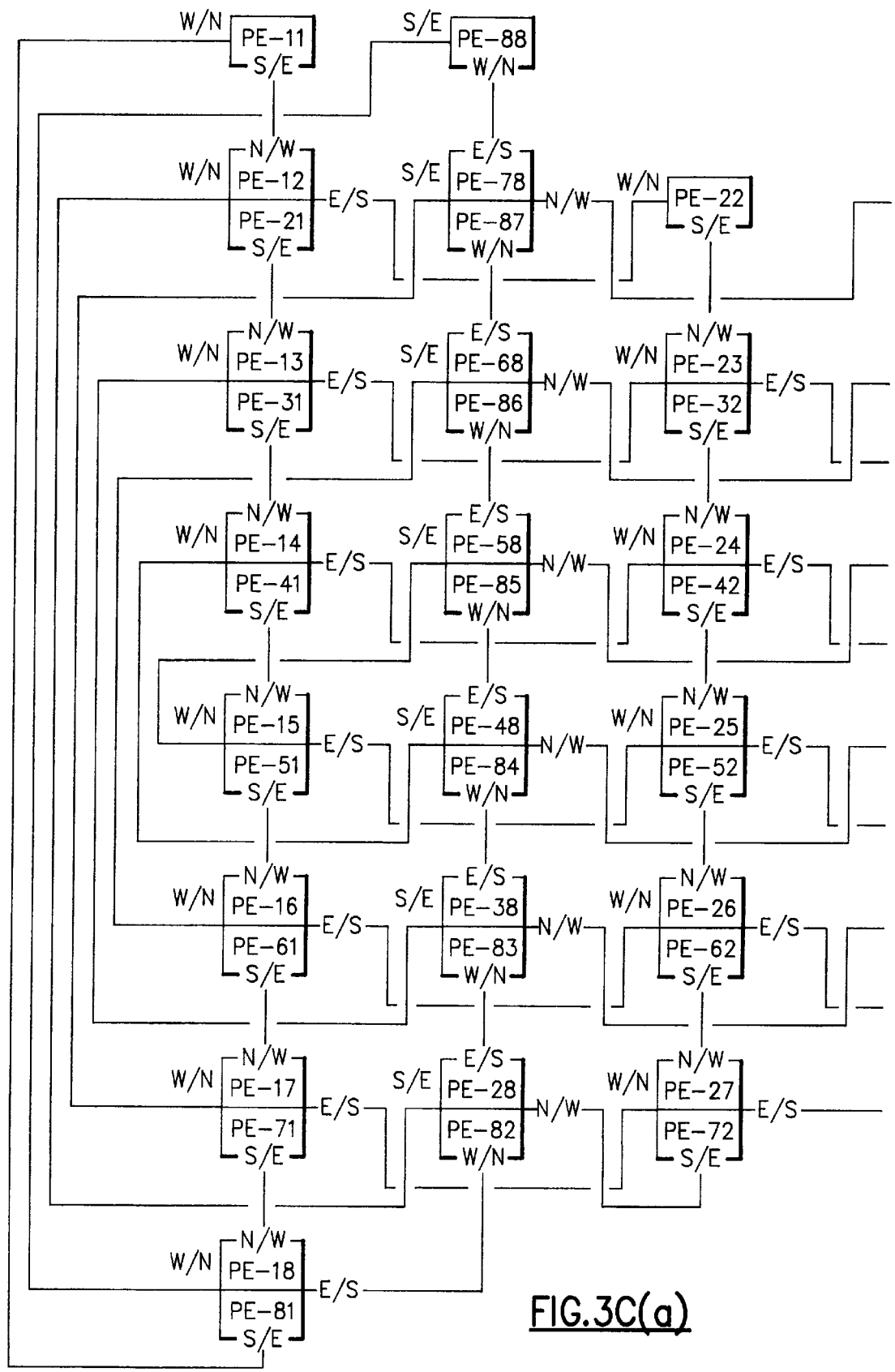
FIG. 3 shows a 8×8 second diagonal-fold mesh array in accordance with our preferred embodiment.

The triangular mesh of FIG. 2B can be folded again along the diagonal made up of PEs (PE-18,PE-81), (PE-27,PE-72), (PE-36,PE-63), and (PE-45,PE-54) resulting in the triangular array shown in FIG. 3C.

Figure 4C:
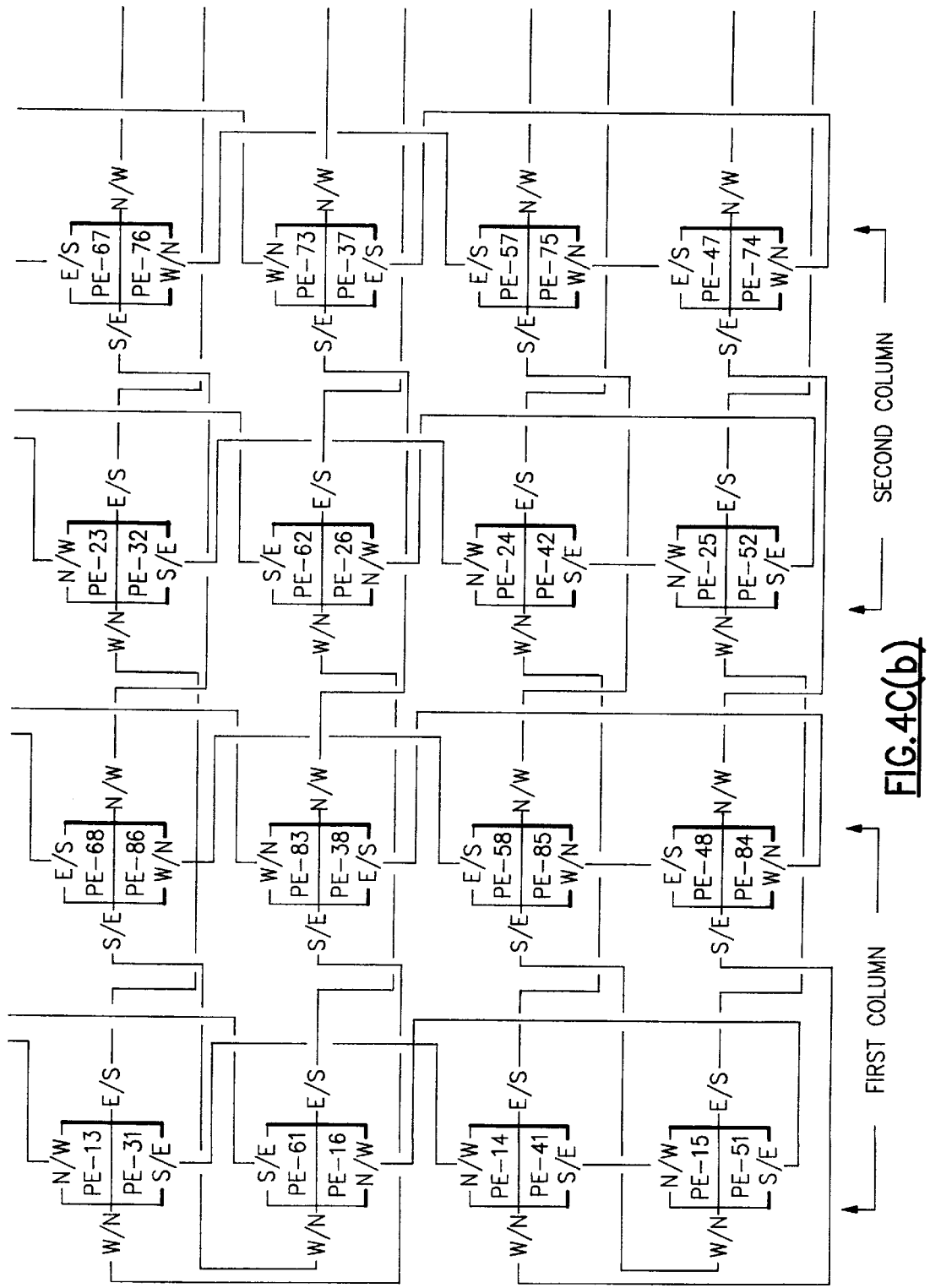
FIG. 4 shows a 8×8 third fold clustered processor mesh array in accordance with our preferred embodiment.
Figure 4C:
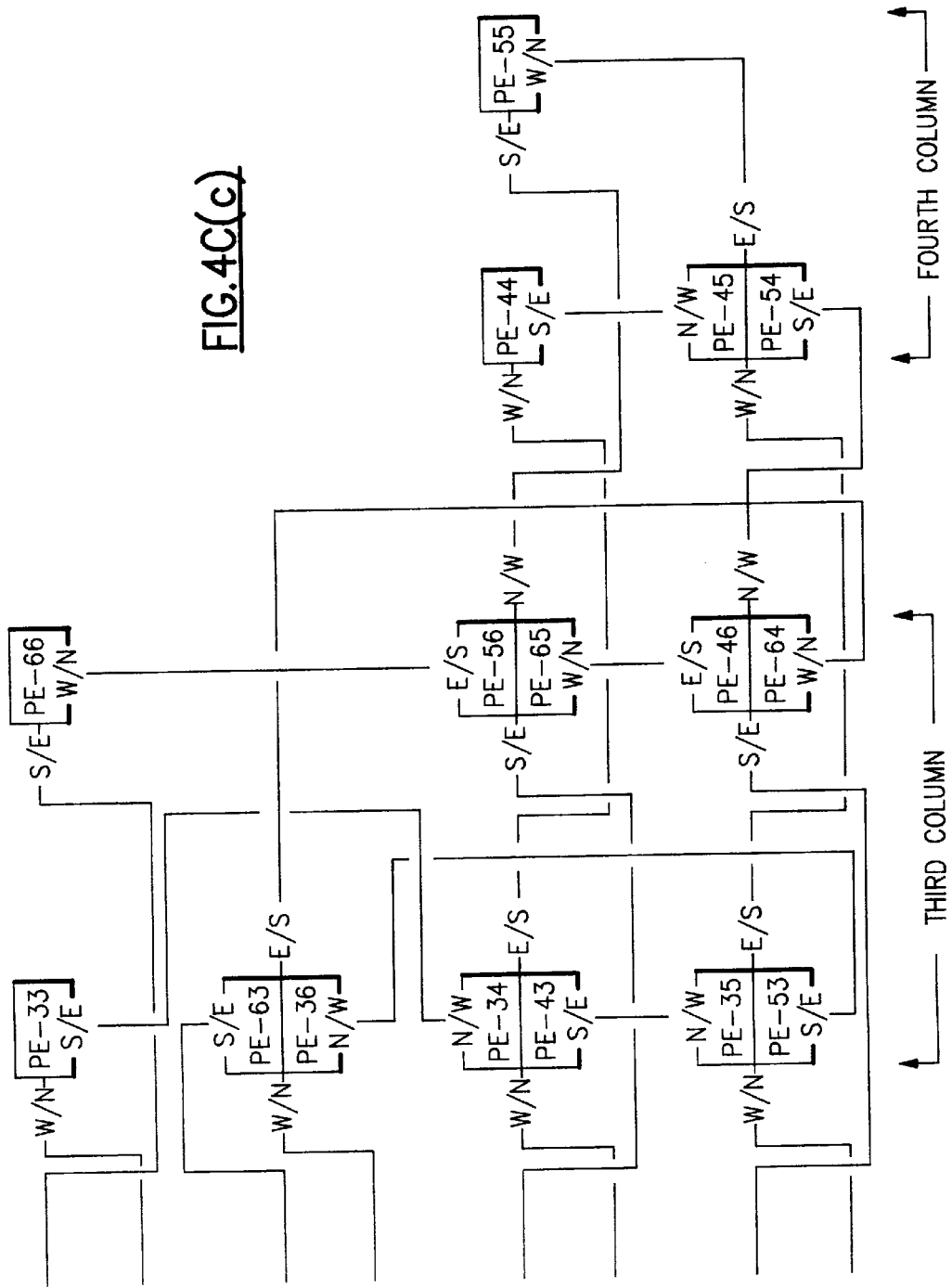

The triangular mesh of FIG. 3C can be folded again along the imaginary line between the following two groups of processors: group-1 made up of (PE-14/PE-41, PE-58/PE-85, PE-24/PE-42, PE-57/PE-75, PE-34/PE-43, PE-56/PE-65, and PE-44/PE-55) and group-2 made up of (PE-15/PE-51, PE-48/PE-84, PE-25/PE-52, PE-47/PE-74, PE-35/PE-53, PE46/PE-64, and PE-45/PE-54) resulting in the triangular array shown in FIG. 4C.

By examining FIG. 4C and comparing the location of the processors in reference to the square mesh shown in FIG. 1 it can be noted that the first column of processors in FIG. 4C contain the N,S,E,W edge processors in the square mesh, i.e. the North edge PE-11, PE-21, . . . , PE-81, the East edge PE-81, PE-82, . . . , PE-88, the South edge PE-18, PE-28, . . . , PE-88, and the West edge PE-11, PE-12, . . . , PE-18. The second column of the 3rd Diagonal Fold mesh of FIG. 4C contains the second concentric series of processors in the square mesh, namely the North 2nd concentric edge PE-22, PE-32, . . . PE-72, the East 2nd concentric edge PE-72, PE-73, . . . , PE-77, the South 2nd concentric edge PE-27, PE-37, . . . , PE-77, and the West 2nd concentric edge PE-22, PE-23, PE-27. This continues with each column of the 3rd Diagonal Fold Mesh containing a corresponding concentric square of processing elements. In addition, in comparing FIG. 4C with FIG. 2B it can be noticed that the long connection wires, associated with the wraparound wires, become local connections within a processor group.

4. PROCESSOR NODE ARCHITECTURES

Figure 5A:
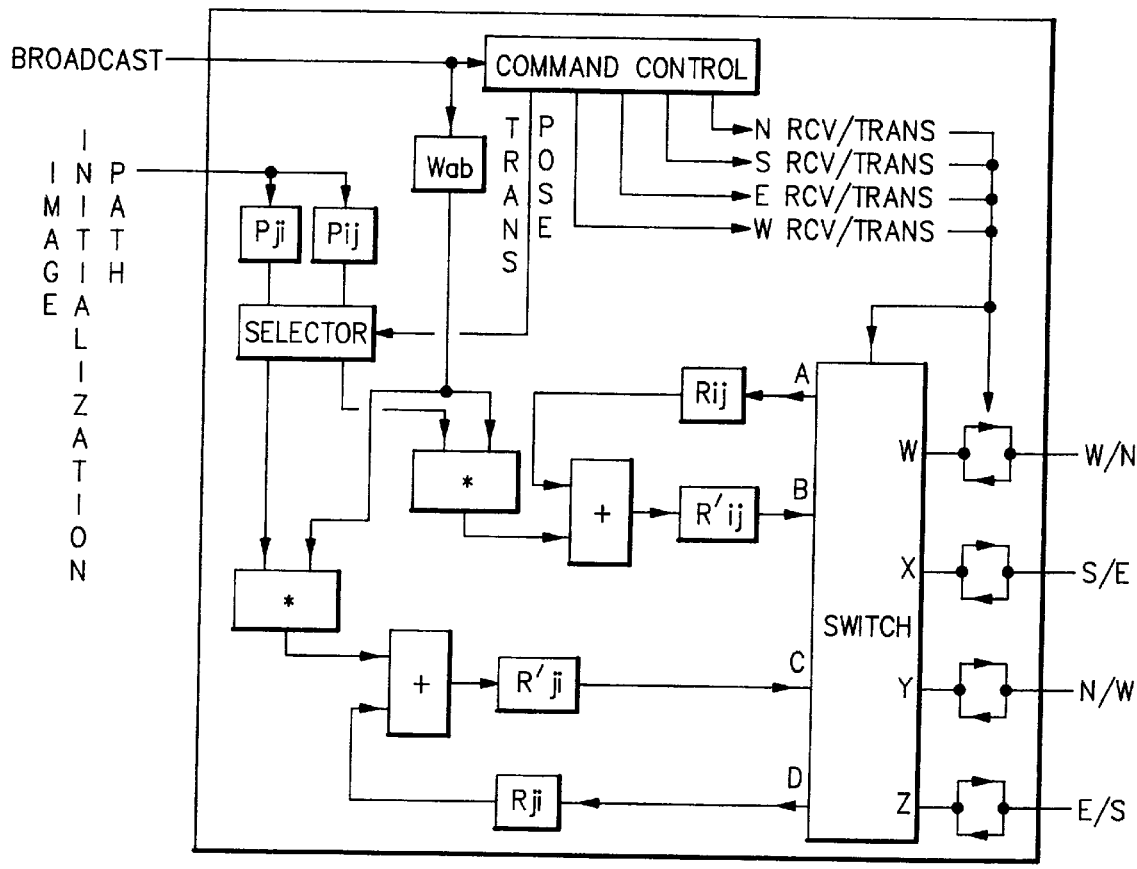
FIG. 5 shows a diagonal-fold symmetric PE "cell" structure supporting transposition and convolution.
Figure 5B:
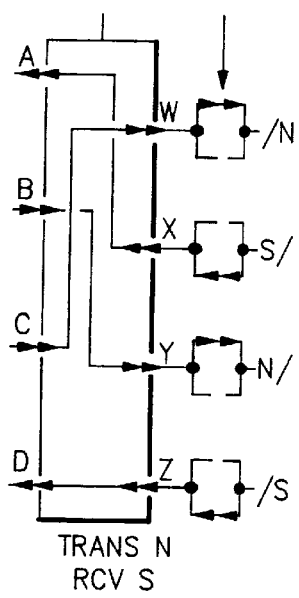
Figure 5C:
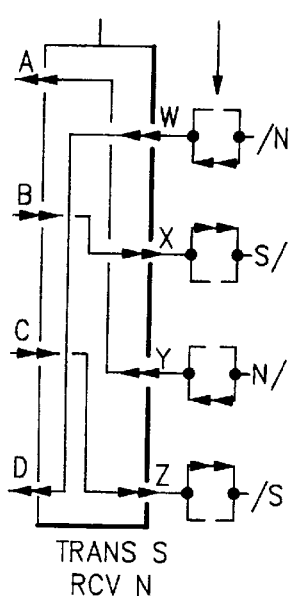
Figure 5D:
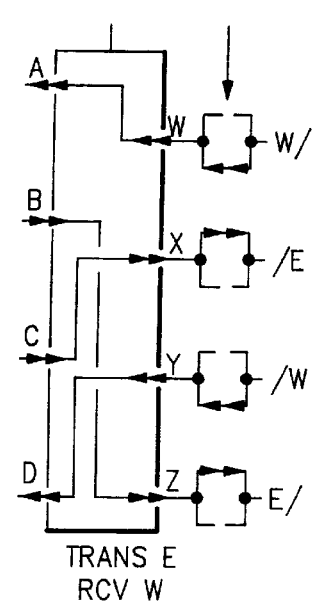

The first step in the process of creating the multiple-folded clustered processor organization of PEs is to fold a mesh connected computer along the $PE_{ii}$ diagonal elements, i.e. "i=j", resulting in the placement of the symmetric PEs, $PE_{ij}$ and $PE_{ji}$ together. The symmetric PEs share transmission and reception ports where $PE_{ij}$'s W, S, N, and E ports are shared with $PE_{ji}$'s N, E, W, and S ports respectively. This sharing of I/O ports in the symmetric PEs is shown in greater detail in FIG. 5 Diagonal-Fold Symmetric PE "Cell" Structure for transposition and convolution, an image processing task. For a detailed description of convolution and an example implementation see reference Massively Parallel Array Processor Pechanek et al. 1992. In FIG. 5A, the internal symmetric PE "cell" consists of a common $W_{ab}$ register for both internal PEs, two pixel registers labeled $P_{ij}$ and $P_{ji}$, a Selector which allows selection of the matrix P or its transpose $P^T$, two result registers $R'_{ij}$ and $R'_{ji}$, and two receiving registers $R_{ij}$ and $R_{ji}$. The PEs also contain a bit-serial multiplier, indicated by the "*" and a bit-serial adder indicated by the "+". Only four I/O ports are utilized in the symmetric dual PE "cell" as controlled from a single "Command Control" logic that decodes broadcast commands. The "Command Control" logic controls not only the direction of the I/O ports but also the setting of the switches linking the I/O ports to the transmitting and receiving registers. The shared I/O ports are indicated as ( PE direction port label )/(bottom PE direction port label ) where $PE_{ij}$ represents the top PE and $PE_{ji}$ represents the bottom PE. The choice of top and bottom PE notation is for ease of discussion and representation only.

FIGS. 5B through 5E depict the setting of the internal switches in support of the four transmission modes. In FIGURE SB the "Command Control" has set up the switches and transmitters/receivers for a transmission North (N) with reception from the South (S). Both the top and bottom PEs transmit North while both are receiving information from the South. This is indicated by following the arrows in FIG. 5B and the notation "N/_" for the top $PE_{ij}$ transmission and "_/N" for the bottom $PE_{ji}$ transmission. The information received is indicated by the arrows in FIG. 5B and the notation "S/_" for the top $PE_{ij}$ receiving port and "_/S" for the bottom $PE_{ji}$ receiving port. Using this notation for the four I/O ports in the symmetric PE "cells", a simplified symbology can be constructed for the symmetric PEs as shown in FIG. 2A, 3A, and 4A where $PE_{ij}$ is the top PE and $PE_{ji}$ is the bottom PE.

The dual processors internal switch consists of eight connection points A, B, C, D, and W, X, Y, and Z, FIG. 5A where:

point A is connected to processor $P_{i,j}$'s register $R_{i,j}$ that receives data from the interprocessor interface, point B is connected to processor $P_{i,j}$'s register $R'_{i,j}$ that supplies data to the interprocessor interface, point C is connected to processor $P_{j,i}$'s register $R'_{j,i}$ that supplies data to the interprocessor interface point D is connected to processor $P_{j,i}$'s register $R_{j,i}$ that receives data from the interprocessor interface, point W is connected to receiving/transmitting mechanisms for the transmission and reception of data between the $PE_{i,j}$'s West and $PE_{j,i}$'s North neighbor PEs, point X is connected to receiving/transmitting mechanisms for the transmission and reception of data between the $PE_{i,j}$'s South and $PE_{j,i}$'s East neighbor PEs, point Y is connected to receiving/transmitting mechanisms for the transmission and reception of data between the $PE_{i,j}$'s North and $PE_{j,i}$'s West neighbor PEs, point Z is connected to receiving/transmitting mechanisms for the transmission and reception of data between the $PE_{i,j}$'s East and $PE_{j,i}$'s South neighbor PEs, The dual processor switch provides connection/no connection paths between points A, B, C, D and points W, X, Y, and Z dependent upon the switch state. In the one switch state connection paths between points A and W, B and Z, C and X, and D and Y are provided for Transmit East Receive West. In a second switch state connection paths between points A and X, B and Y, C and W, and D and Z are provided for Transmit North Receive South. In a third switch state connection paths between points A and Y, B and X, C and Z, and D and W are provided for Transmit South Receive North and in a fourth switch state connection paths between points A and Z, B and W, C and Y, and D and X are provided for transmit West Receive East. It should be noted that the receiving/transmitting mechanisms consists of four bi-directional driver/receiver mechanisms each responsive in one state to drive signals from the PE to an attached receiving PE and responsive in another state to receive signals to the PE from an attached transmitting PE and controls are provided to ensure that of the four bidirectional driver/receiver mechanisms only two are simultaneously transmitting data and two are simultaneously receiving data for the four cases of Transmit East Receive West, Transmit North Receive South, Transmit South Receive North, and Transmit West Receive East.

Figure 5F:
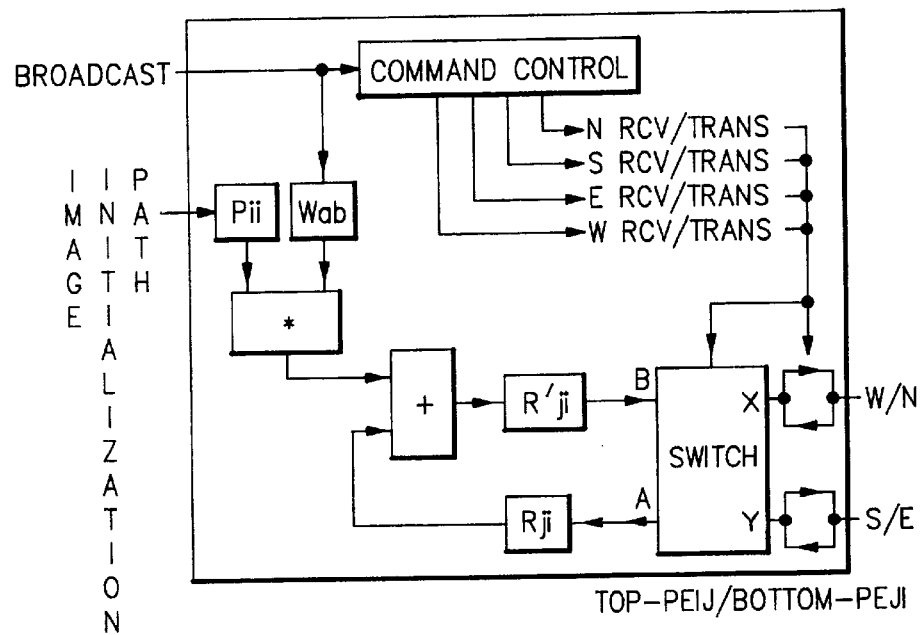
Figures 5E, 5G, 5H:
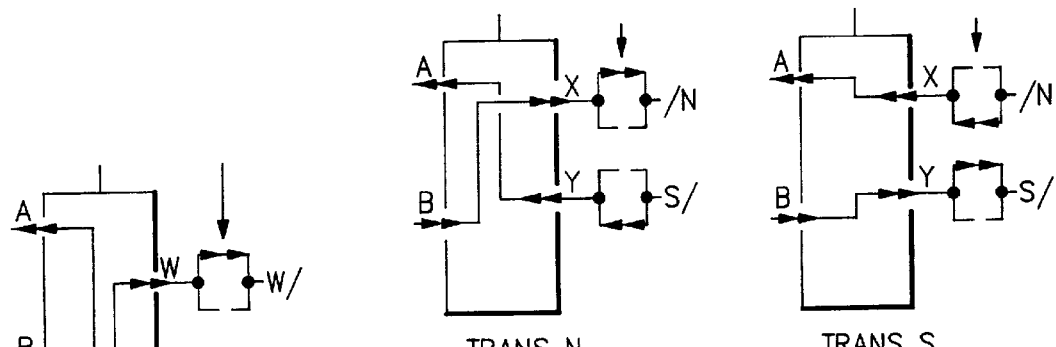
Figures 5I, 5J:
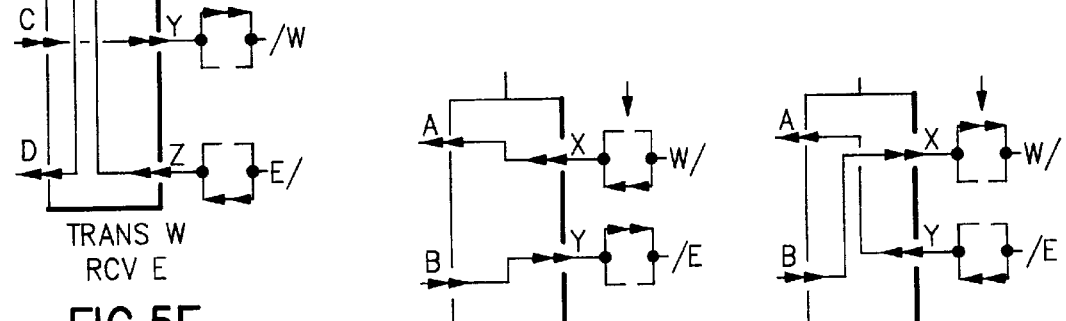

The diagonal PEs, FIG. 5F, share the West/North ports and the South/East ports requiring only two ports per diagonal PE "cell". FIGS. 5G through 5J depict the setting of the internal switches in support of the four transmission modes. The diagonal processor internal switch mechanism consists of four connection points A, B, X, and Y, where point A is connected to the receiving data register $R_{ji}$, point B is connected to register $R'_{ii}$ that supplies data to the interprocessor interface, point X is connected to receiving/ transmitting mechanisms for the transmission and reception of data between the diagonal PE's West and North (W/N) neighbor PEs, and point Y is connected to receiving/ transmitting mechanisms for the transmission and reception of data between the diagonal PE's South and East (S/E) neighbor PEs. The diagonal switch provides connection/no connection paths between points A, B and points X, Y dependent upon the switch state. In one switch state a connection path between points A and X and between points B and Y is provided for two transmission/reception cases, namely transmission South, through point Y, reception North, through point X, and transmission East, through point Y, reception West, through point X. In a second switch state a connection path between points A and Y and between points B and X is provided for two transmission/reception cases, namely transmission North, through point X, reception South, through point Y, and transmission West, through point X, reception East, through point Y. It should be noted that the receiving/trasmitting mechanisms consists of two bidirectional driver/receiver mechanisms each responsive in one state to drive signals from the PE to an attached receiving PE and responsive in another state to receive signals to the PE from an attached transmitting PE and controls are provided to ensure that the bidirectional driver/ receiver mechanisms are not both simultaneously driving or both simultaneously receiving data.

Figure 6A:
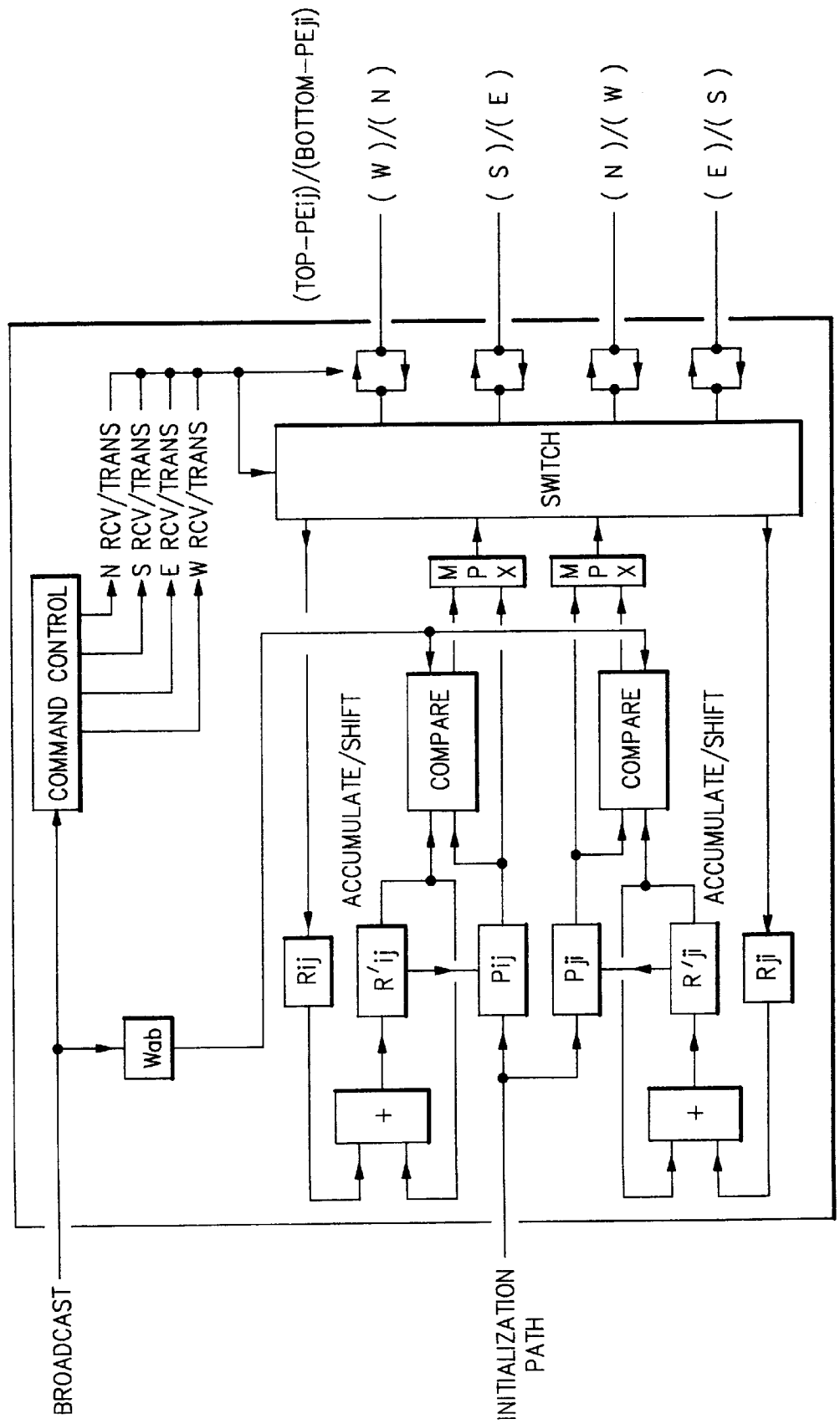
FIG. 6 shows a diagonal-fold symmetric PE "cell" structure supporting finite difference method.
Figure 6B:
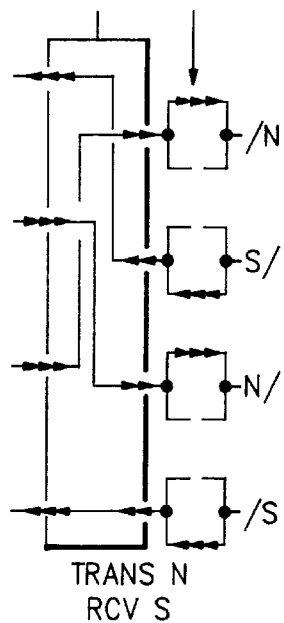
Figure 6C:
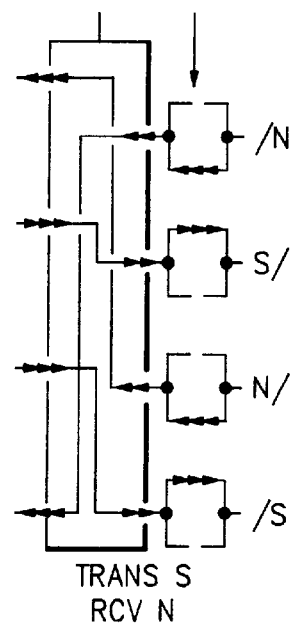
Figure 6D:
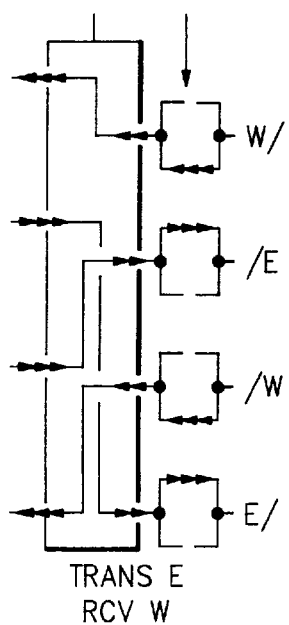
Figure 6E:
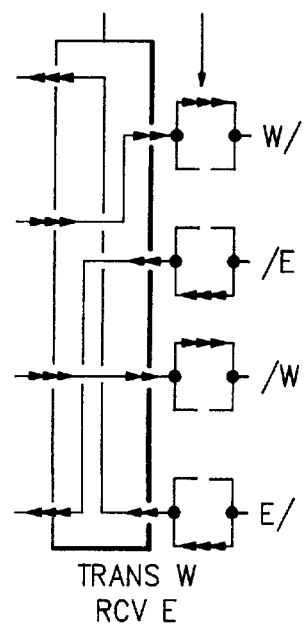

For the finite difference method and its implementation on the diagonal-fold mesh array processor see reference Massively Parallel Array Processor Pechanek et al. 1992. For the finite difference method the PE internal structure, FIG. 5A, is modified as shown in FIG. 6A. The diagonal PEs are also modified from the form shown in FIG. 5F in a manner similar to the dual PE structure. The diagonal PEs contain one execution unit and registers appropriate for a single PE, the structure is inferred from FIG. 6A. The same transmission/receiving I/O ports and controls are utilized in the new PE internal structure, but the computation functions are modified. FIG. 6B through 6E presents the switch and 110 port configurations for the North, South, East, and West transmission modes. The switch and transmission/receiving I/O ports are the same as for the image processing convolution example.

A general processing structure which incorporates the computational capabilities of both the convolution and finite difference method processing structures, depicted in FIG. 7, is discussed next. A minimum of four registers must be provided to each processor element with expanded registers defined as technology and applications allow. The standard switch interface shown in FIGS. 5B–5E and FIGS. 6B–6E is utilized in the general processing element structure shown in FIG. 7. The execution Unit (XU), FIG. 7, provides the necessary arithmetic and logical functions utilizing three register operand inputs. An instruction and data buffer are provided on the broadcast interface and a separate initialization path is provided for the registers. The initialization path may be an external data memory interface allowing further expansion of the processing elements data storage capabilities. In a similar manner an external instruction memory can be provided with a priority protocol for handling broadcast and external memory instructions. The Symmetric PE contains two processing elements and the Diagonal PE contains a single processing element. In FIG. 7, the transmitting and receiving I/O ports use the following referencing notation:

(topPEijdirection)/(bottomPEj,idirection)–ij

Where the ending "-i,j" is important for identifying a PE in a cluster of PE as will be discussed next.

The Symmetric and Diagonal PEs are grouped together through two additional folds of the structure. After three folds there are eight processors in a group, each of which can be determined given an initial set of i,j values as follows:

$PE_{ij}$ $PE_{ji}$ $PE_{j,M-i+1}$ $PE_{M-i+1,j}$ $PE_{i,M-j+1}$ $PE_{M-j+1,i}$ $PE_{M-j+1,M-i+1}$ $PE_{M-i+1,M-j+1}$

From the possible two number combinations for a particular value of M, the choices of "i,j" for the eight processor cluster are restricted by $1 \leq i \leq M/2$, $1 \leq j \leq M/2$, $i \neq j$, and $ij \neq ji$. For M=8 the valid combinations of i and j for the group of eight processors are:

1, 2

1, 3

1, 4

2, 3

2, 4

3, 4

For comparison with FIG. 4C with i=1 and j=2, the group of eight processors are:

$PE_{1,2}$ $PE_{2,1}$ $PE_{2,8}$ $PE_{8,2}$ $PE_{1,7}$ $PE_{7,1}$ $PE_{7,8}$ $PE_{8,7}$

After three folds the four processors in a diagonal group maintain the following relationship: for $1 \leq i \leq M/2$ the four processors are:

$PE_{ij}$ $PE_{i,M-j+1}$ $PE_{M-i+1,j}$ $PE_{M-j+1,M-i+1}$

For comparison with FIG. 4C with i=3, the diagonal group of four processors are:

$PE_{3,3}$ $PE_{3,6}$ $PE_{6,3}$ $PE_{6,6}$

Figure 8A:
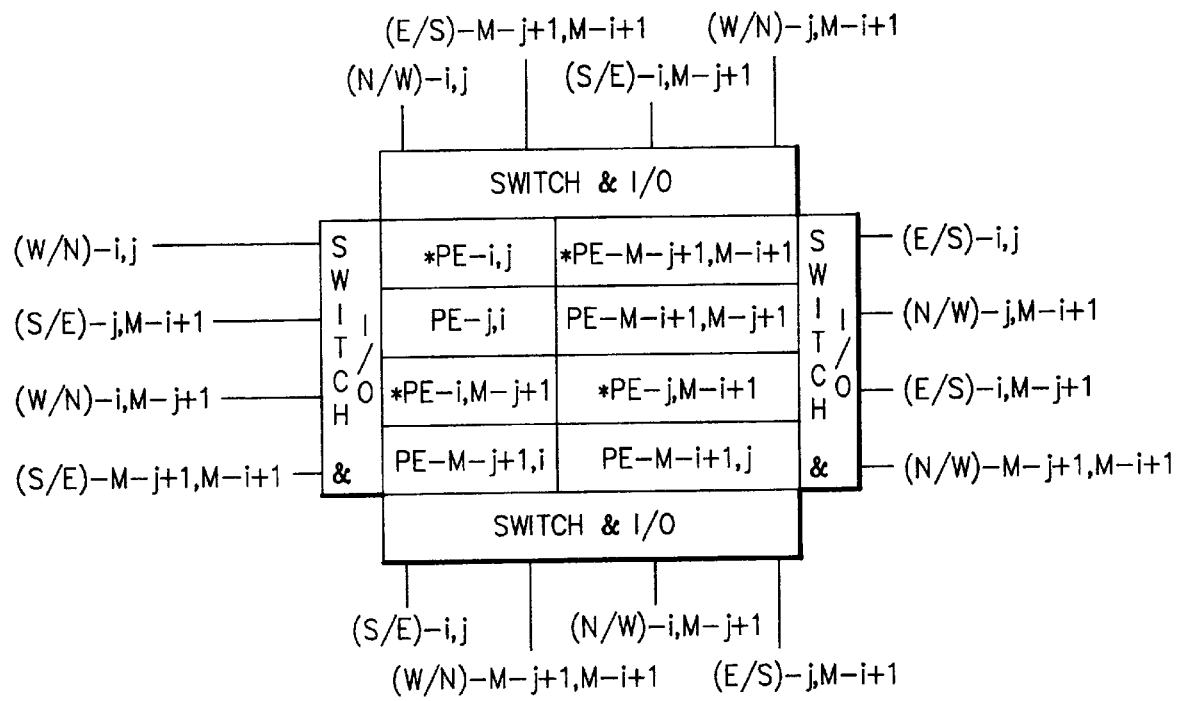
FIG. 8 shows the symbolism for clustered processor groups.
Figure 8B:
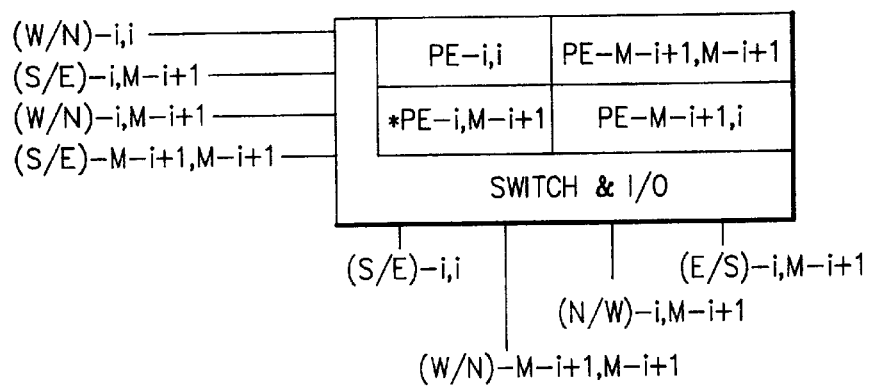

The group of eight PEs are symbolically represented as shown in FIG. 8A and the diagonal group of four PEs are symbolically represented as shown in FIG. 8B. In FIG. 8A, the symmetric PEs referenced by the PE with an asterisk, utilize the following ports:

$PE_{i,j}/PE_{j,i}$ uses ports (N/W)–i,j, (E/S)–i,j, (W/N)–i,j, and (S/E)–i,j.

$PE_{i,M-j+1}/PE_{M-j+1,i}$ uses ports (N/W)–i,M–j+1, (E/S)–i, M–j+1, (W/N)–i,M–j+1, and (S/E)–i,M–j+1.

$PE_{j,M-i+1}/PE_{M-i+1,j}$ uses ports (N/W)–j,M–i+1, (E/S)–j, M–i+1, (W/N)–j,M–i+1, and (S/E)–j,M–i+1.

$PE_{M-j+1,M-i+1}/PE_{M-i+1,M-j+1}$ uses ports (N/W)–M–j+1,M–i+1, (E/S)–M–j+1,M–i+1, (W/N)–M–j+1,M–i+1, and (S/E)–M–j+1,M–i+1.

As noted earlier, the diagonal PEs share the West/North ports and the South/East ports requiring only two ports per diagonal PE "cell". In FIG. 8B $PE_{ii}$ utilizes ports (W/N)–i,i and (S/E)–i,i, $PE_{M-i+1,M-i+1}$ utilizes ports (W/N)–M–i+1, M–i+1 and (S/E)–M–i+1,M–i+1, and the symmetric PE identified with an asterisk as $PE_{i,M-i+1}$ utilizes four ports (N/W)–i,M–i+1, (E/S)–i,M–i+1, (W/N)–i,M–i+1, and (S/E)–i,M–i+1. The 8×8 Third Fold Clustered Processor Mesh Array, shown in FIG. 4C, is redrawn, FIG. 9, using the notation and clustered processor symbols depicted in FIG. 8. It can be noticed in FIG. 9 that even with the multiple folds the wiring between the clusters of processors is very regular and that there are no long wires required to implement the torus wrap around wiring, just local wiring within processor clusters.

5. ENHANCING THE CONNECTIVITY

Figure 10C:
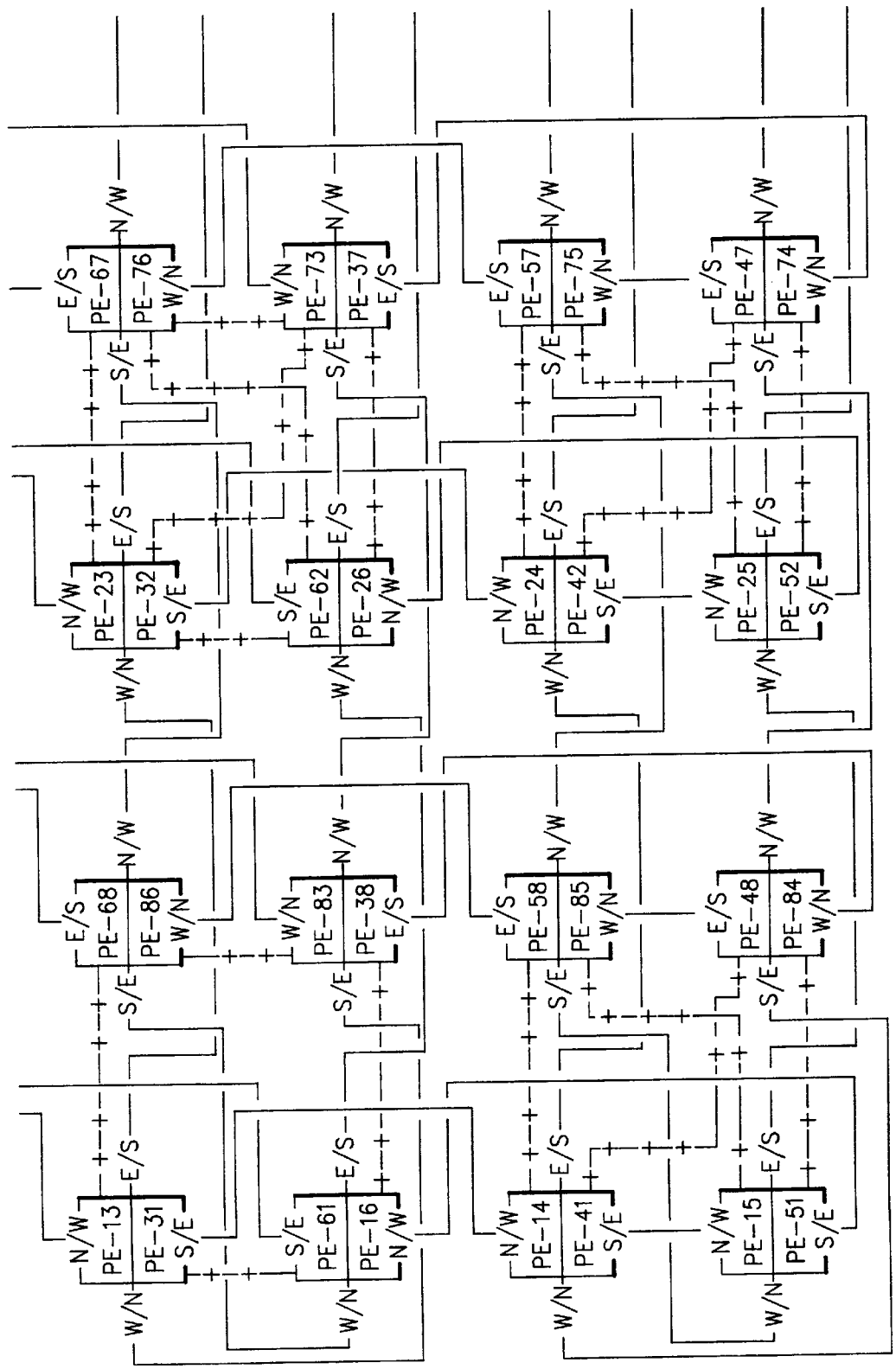
FIG. 10 shows a 8×8 increased connectivity third fold clustered processor mesh array as our preferred embodiment.
Figure 10C:
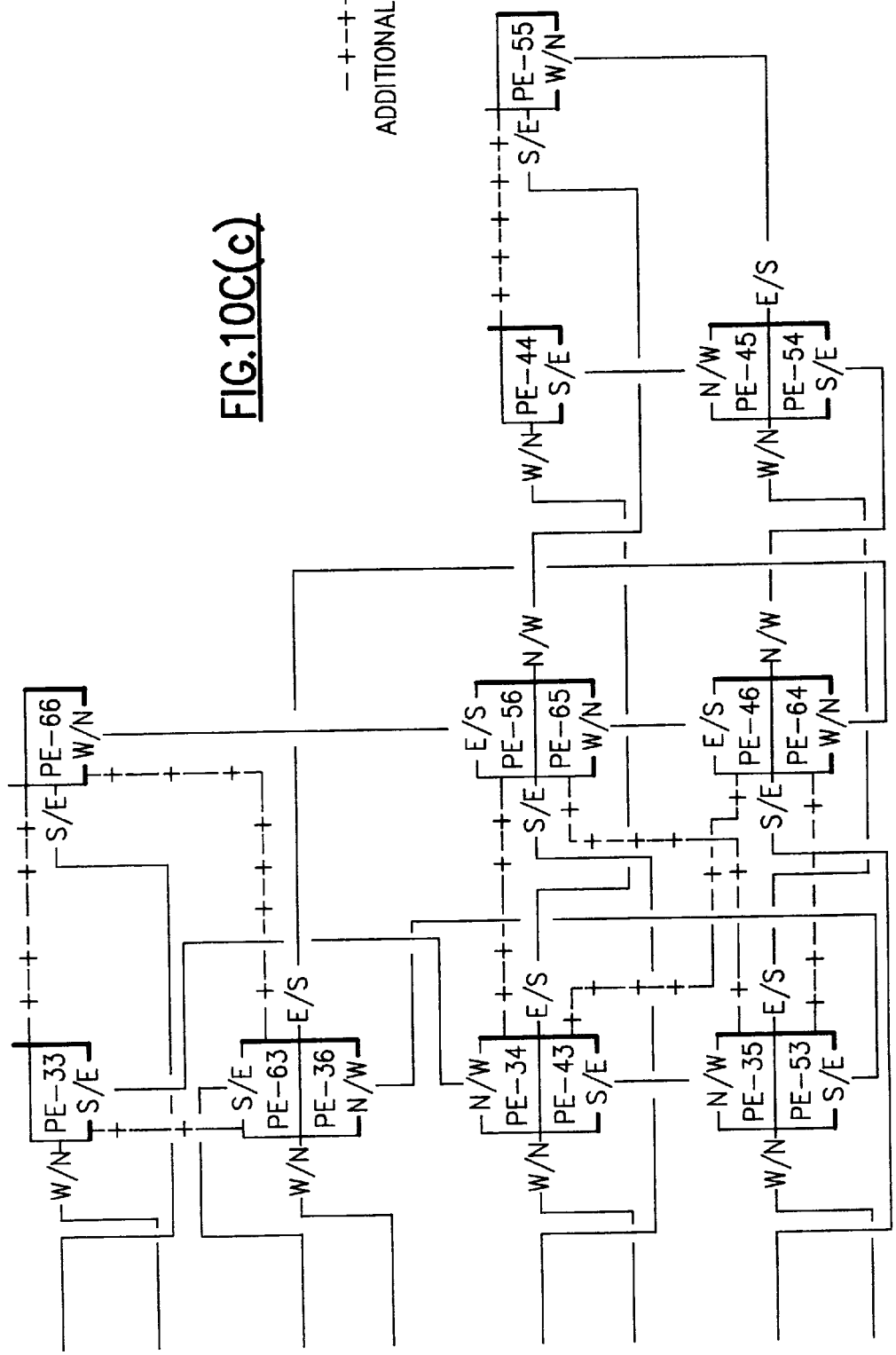
Figure 11:
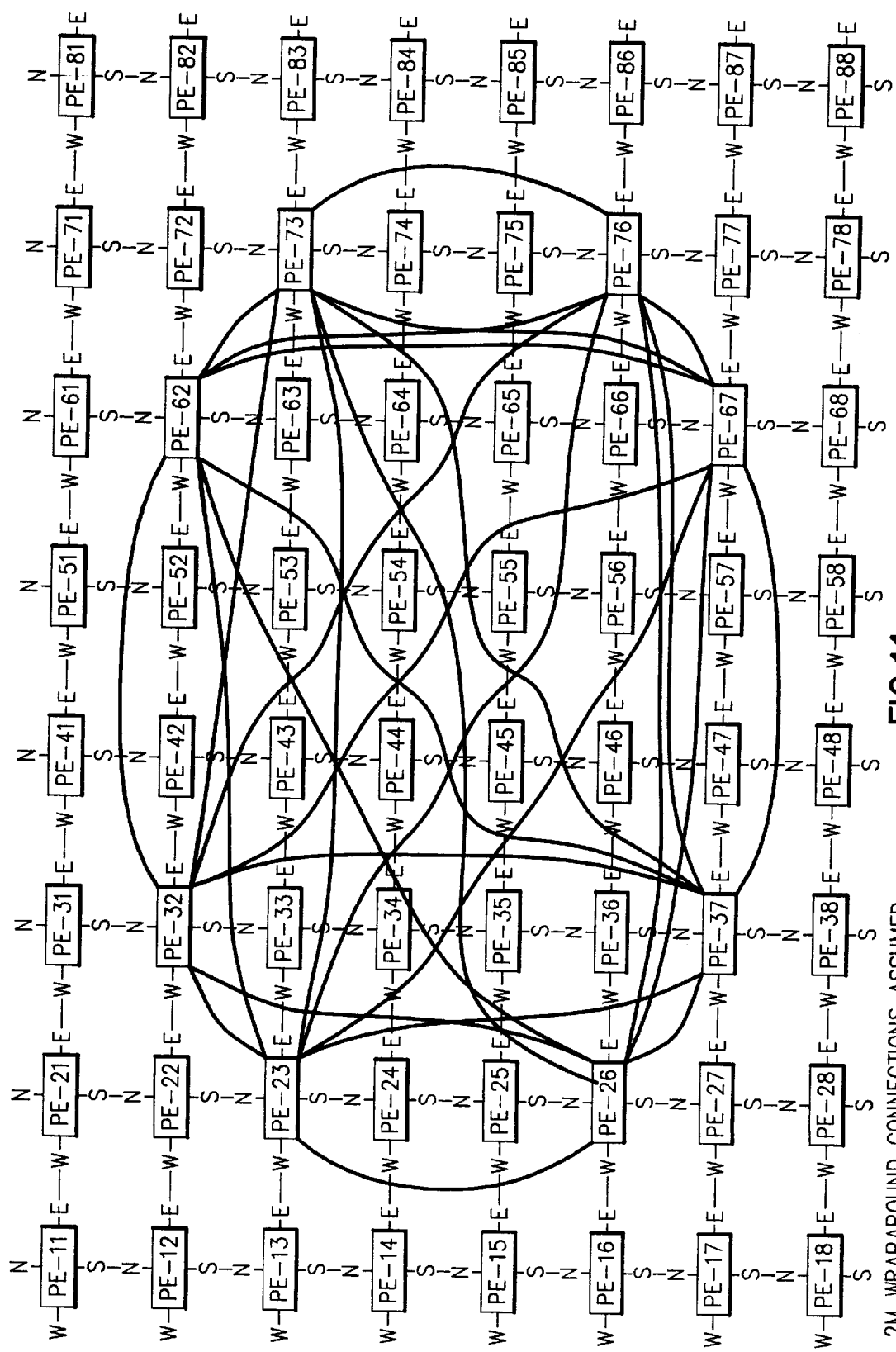
FIG. 11 shows a 8×8 mesh with additional wiring for one cluster processor group.

Increased connectivity can be obtained in the three-times-folded structure by adding wires between the processors that were placed together due to the folding. These wires, which in the folded structure are local to a group of processors, would not be easily added in the square mesh due to the large distance and numerous wire crossings that would occur if equivalent wiring was attempted. The increased connectivity multiple-folded clustered processor mesh array is shown in FIG. 10C which is the same as FIGURE 4C with the additional connectivity wires added. (The added wires use a "–+–+–" wiring symbol to differentiate the added wires from the existing wires.) An example of one set of additional wires for one cluster of processors that would need to be added to the square mesh array processor are shown in FIG. 11, to demonstrate the complexity of the wiring required to accommodate the logical interconnectivity provided by the clustered processor's enhanced connectivity. For FIG. 11 the additional wires added provide the logical interconnectivity for the single clustered processors (PE-1,2, PE-2,1, PE-2,8, PE-8,2, PE-1,7, PE-7,1, PE-7,8, and PE-8,7) shown in FIG. 10C only.

Figure 7A:
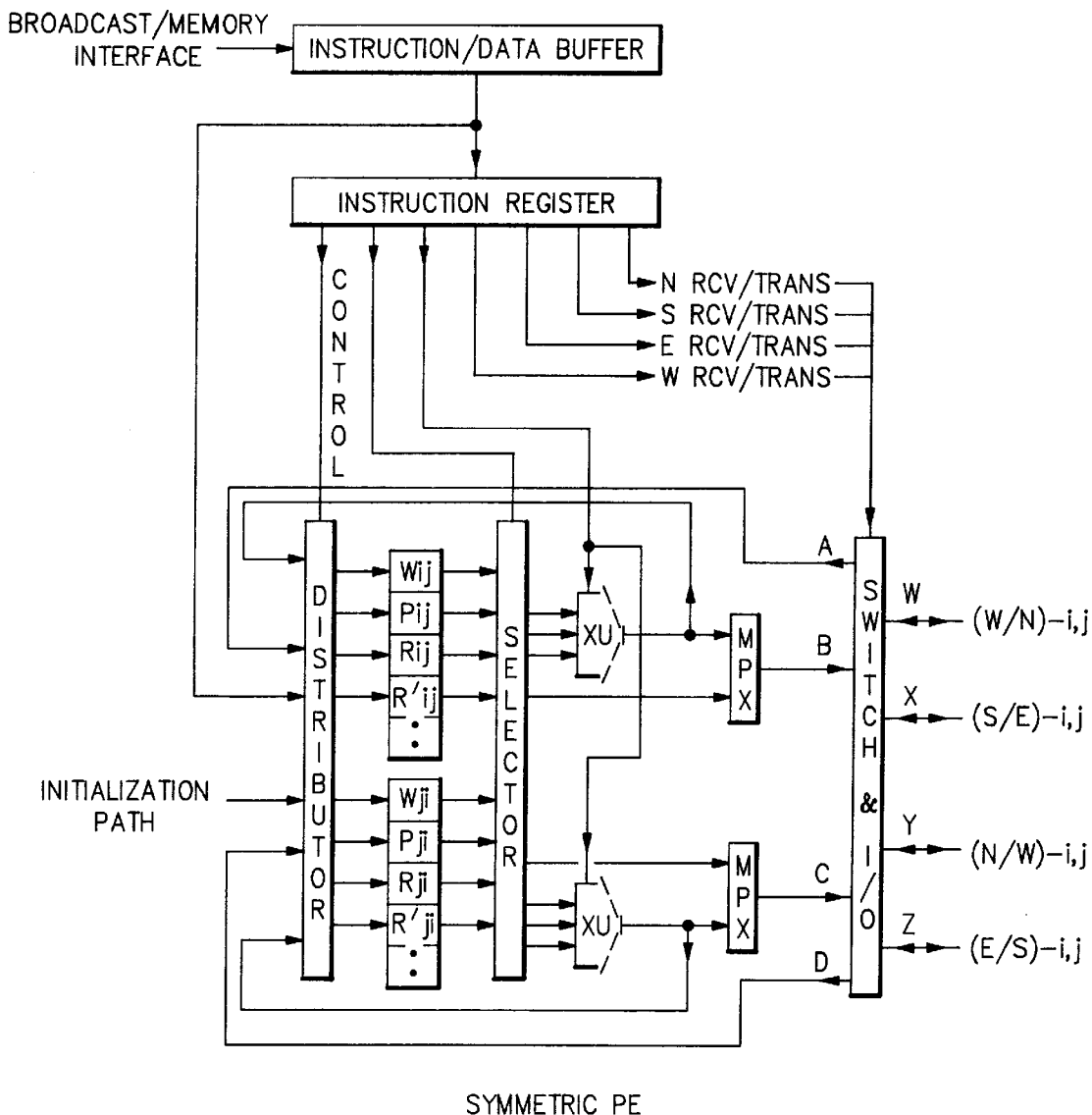
FIG. 7 shows a combined convolution and finite difference PE "cell" structures as our preferred embodiment.
Figure 7B:
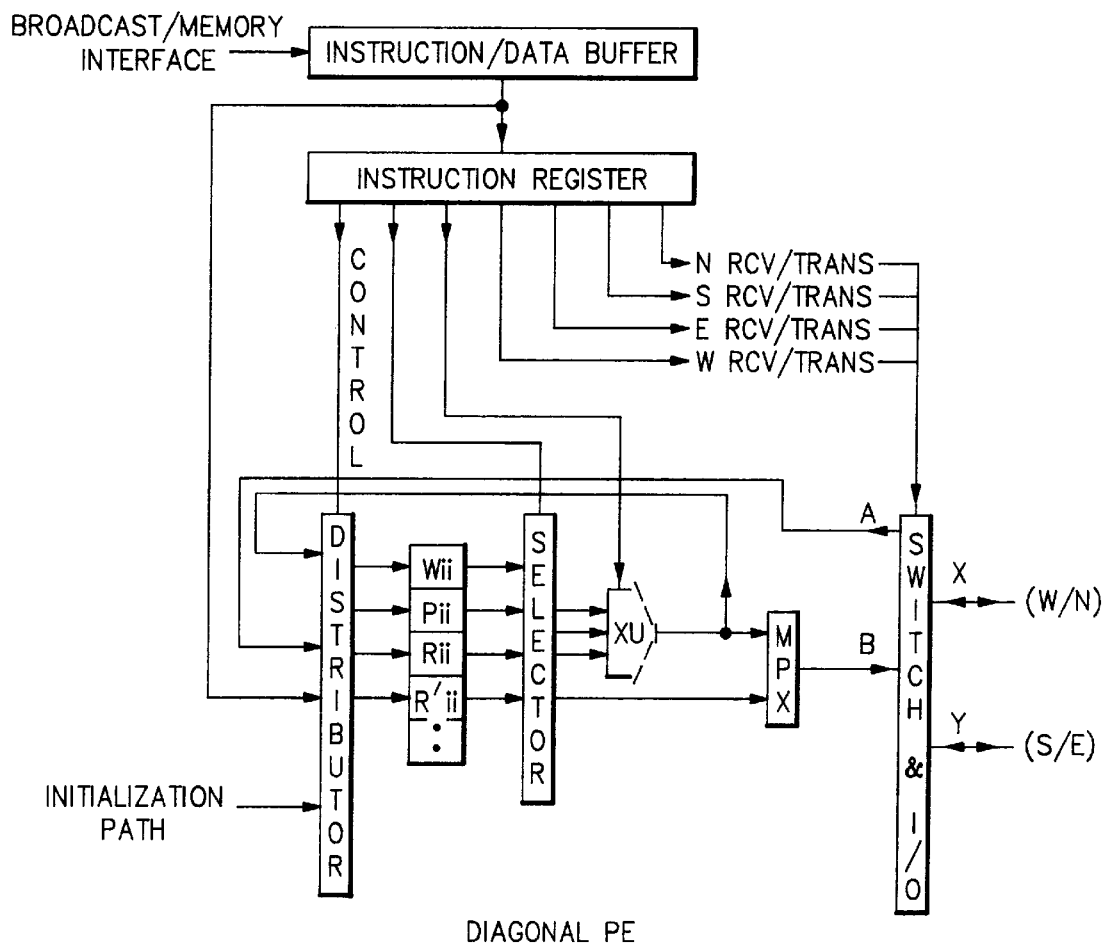
Figure 12A:
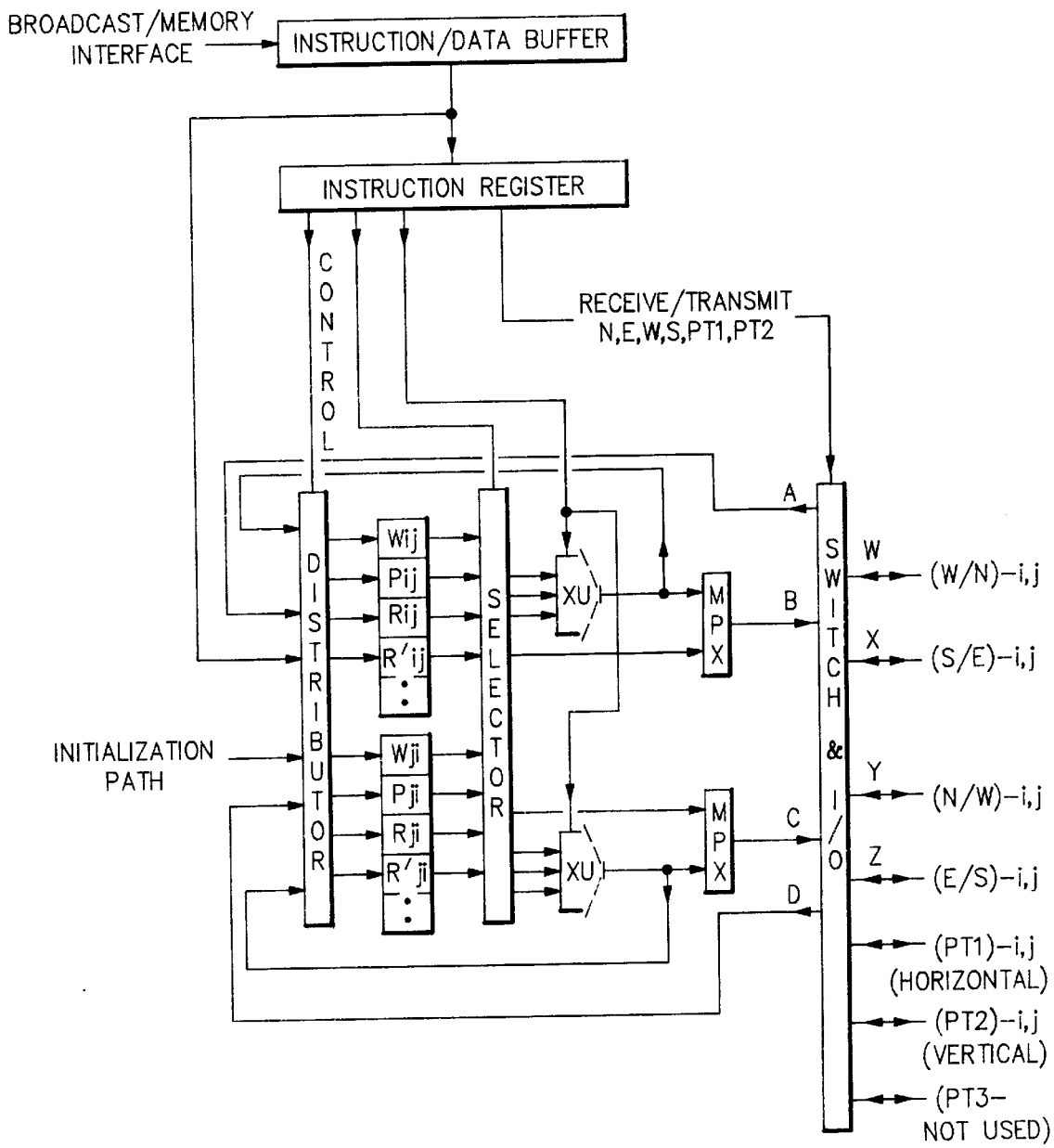
FIG. 12 shows the four processor diagonal clustered PEs with additional ports supporting enhanced connectivity.
Figure 12B:
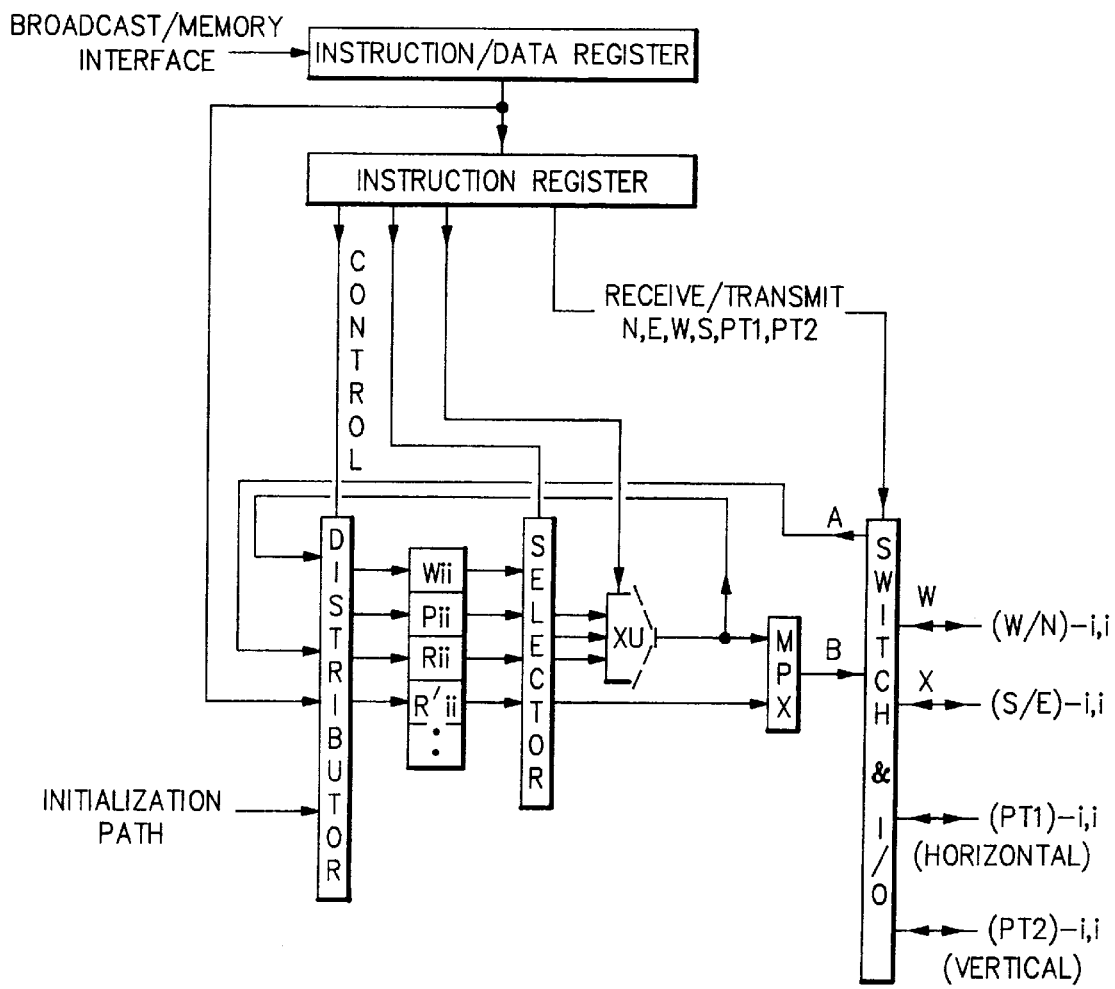

Many approaches can be taken to incorporate the additional wires connecting each group of eight processors. One approach is to add additional I/O ports per processor group, six additional per diagonal four PE group and twelve per group of eight symmetric PEs. The PE structure of FIGS. 7A and 7B are modified to incorporate the additional I/O ports as shown in FIG. 12A, 12B, and FIG. 13.

Figure 9B:
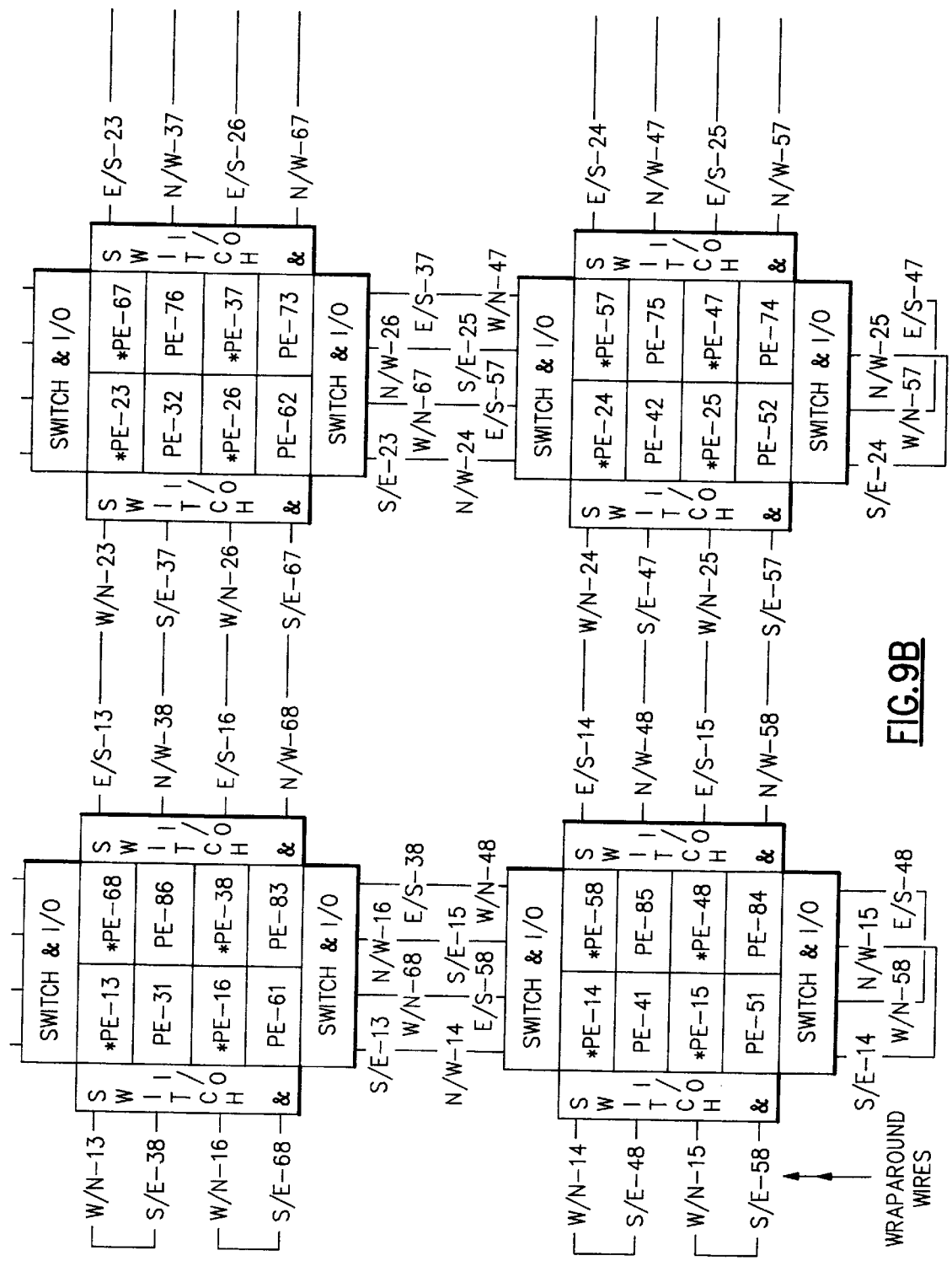
FIG. 9 shows a 8×8 third fold clustered processor mesh array using clustered processor symbols.
Figure 13:
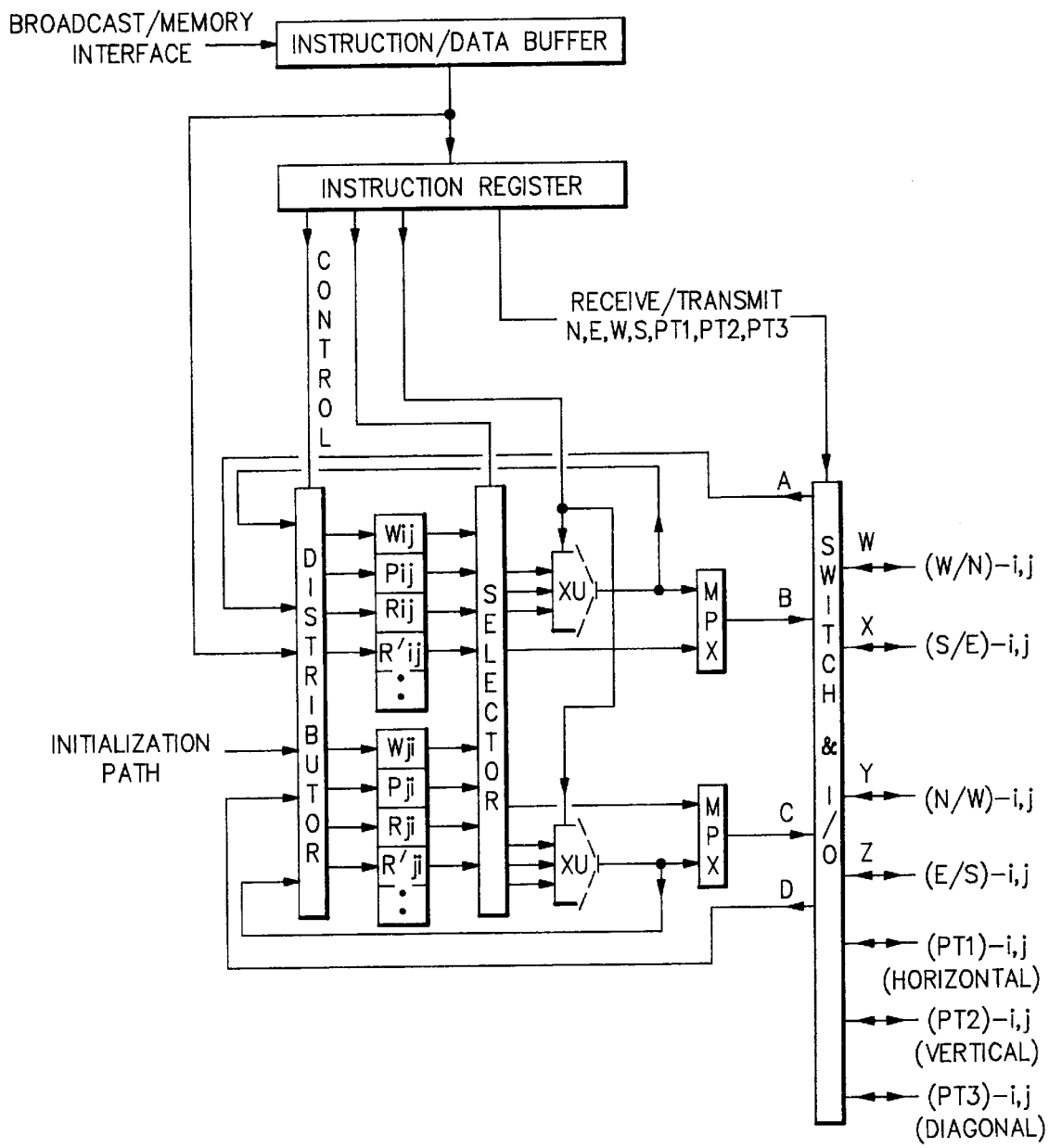
FIG. 13 shows the eight processor clustered PEs with additional ports supporting enhanced connectivity.
Figure 14A:
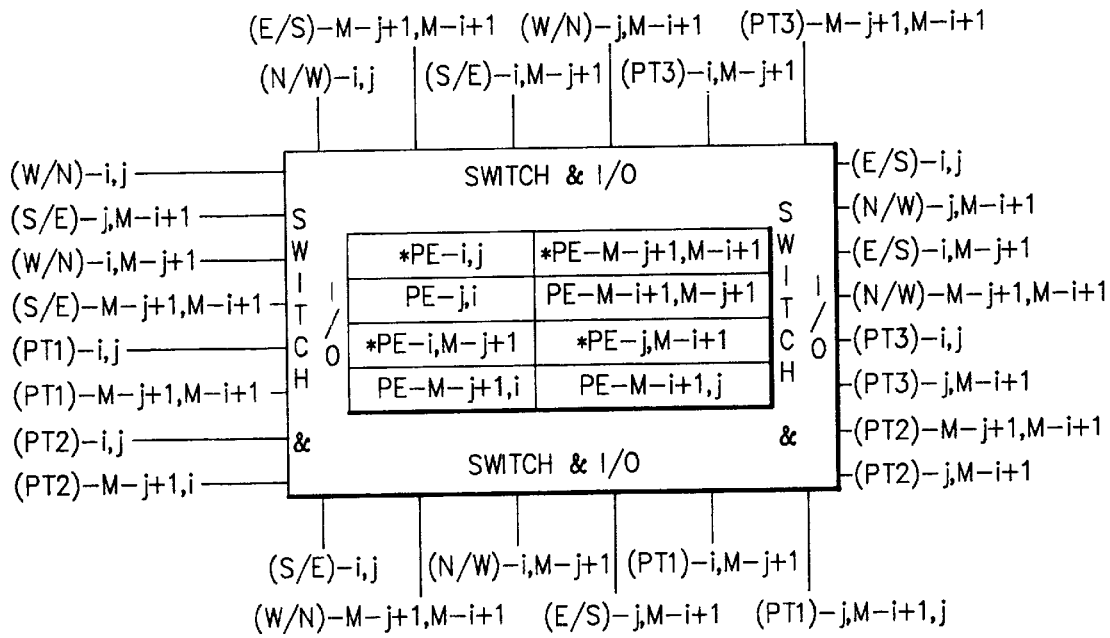
FIG. 14 shows the symbolism for enhanced connectivity processor groups.
Figure 14B:
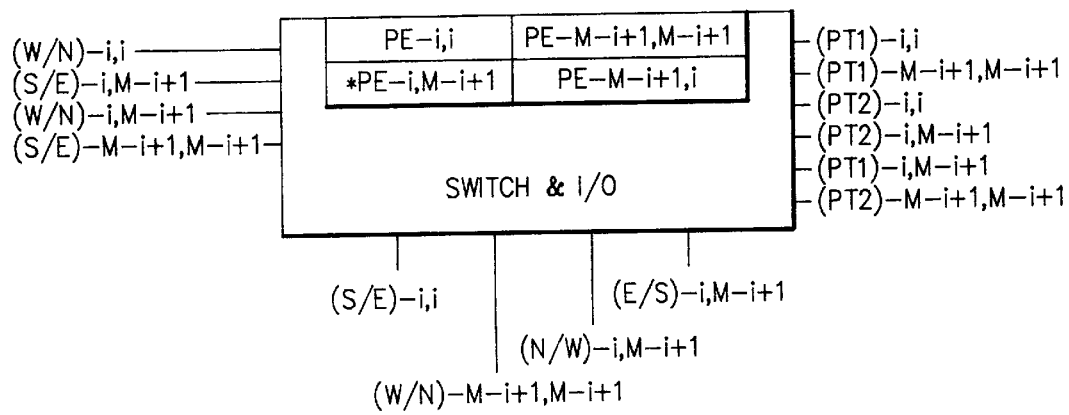
Figure 15B:
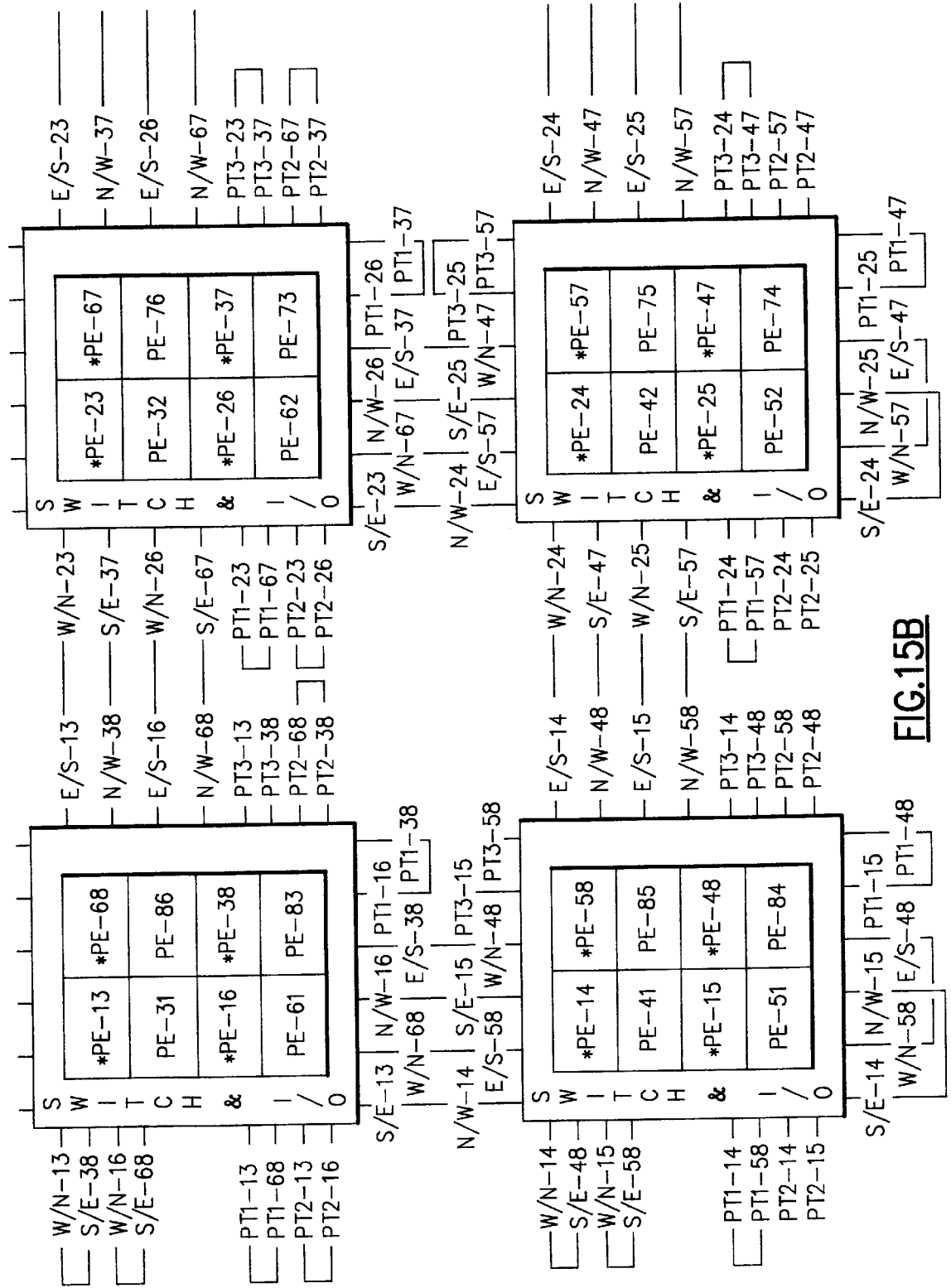
FIG. 15 shows a 8×8 increased connectivity third fold clustered processor mesh array with additional wiring within a cluster.
Figure 15C:
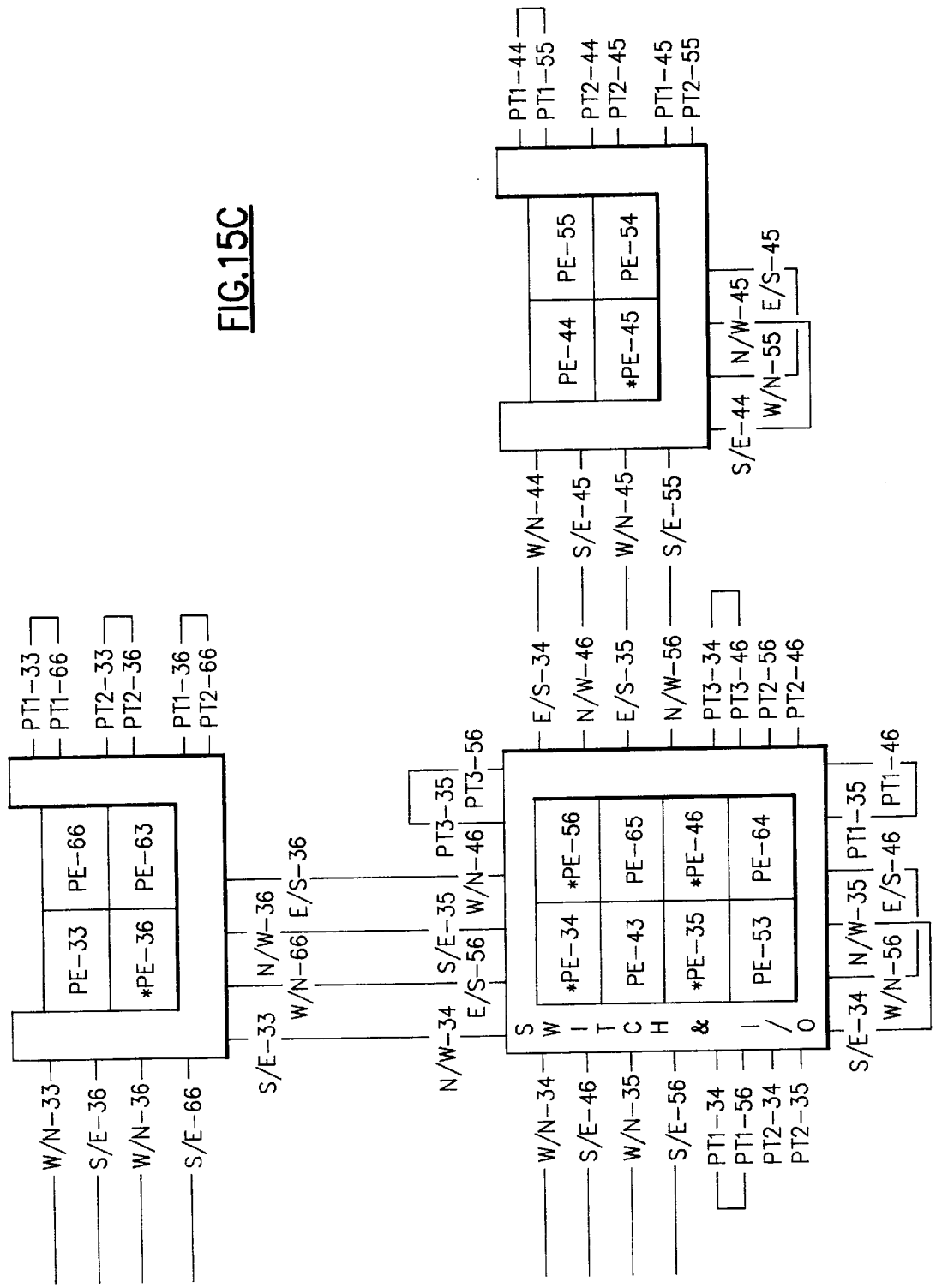

By convention and based upon the additional wire connections shown in FIG. 10C, the additional I/O ports labeled PT1, PT2, and PT3 shown in FIG. 12 and 13, the "horizontal" additional wires between PEs are the PT1 ports, the "vertical" additional wires between PEs are the PT2 ports, and the "diagonal" additional wires between PEs are the PT3 ports. The wiring for the Horizontal PT1, Vertical PT2, and Diagonal PT3 ports are in reference to the added wires shown in FIG. 10C. The cluster symbols of FIG. 8 are modified to incorporate the additional I/O ports and redrawn as shown in FIG. 14. All messages between processors are assumed to be tagged indicating message PE destination. The 8×8 Third Fold Clustered Processor Mesh Array Using Clustered Processor Symbols, shown in FIG. 9, is redrawn, FIG. 15, using the enhanced connectivity notation and clustered processor symbols with additional I/O ports depicted in FIG. 14. It can be noticed in FIG. 15 that even with the additional wiring and I/O ports the wiring between the clusters of processors remains very regular.

Another approach for providing the interconnectivity between processors in a cluster is to combine the processors in the cluster with an expanded distribution and selection mechanism. This allows the local cluster communications to remain in the combined structure and not require additional I/O ports for this purpose. We have illustrated as a preferred embodiment multiple exeuction units, but we also illustrate, when the multiple units are two, the use of I/O ports which can be eliminated when the function is incorporated into a combined processor cluster unit.

An advantage of the interconnection with multiple folding is that the packaging of processors is also discretionary. The apparatus can use individual processor units as well as multiple processor units on a chip and interconnect either kind of unit with our interconnection.

6. SCALEABILITY OF MULTIPLE-FOLDED CLUSTERED PROCESSOR MESH ARRAY

Figure 16:
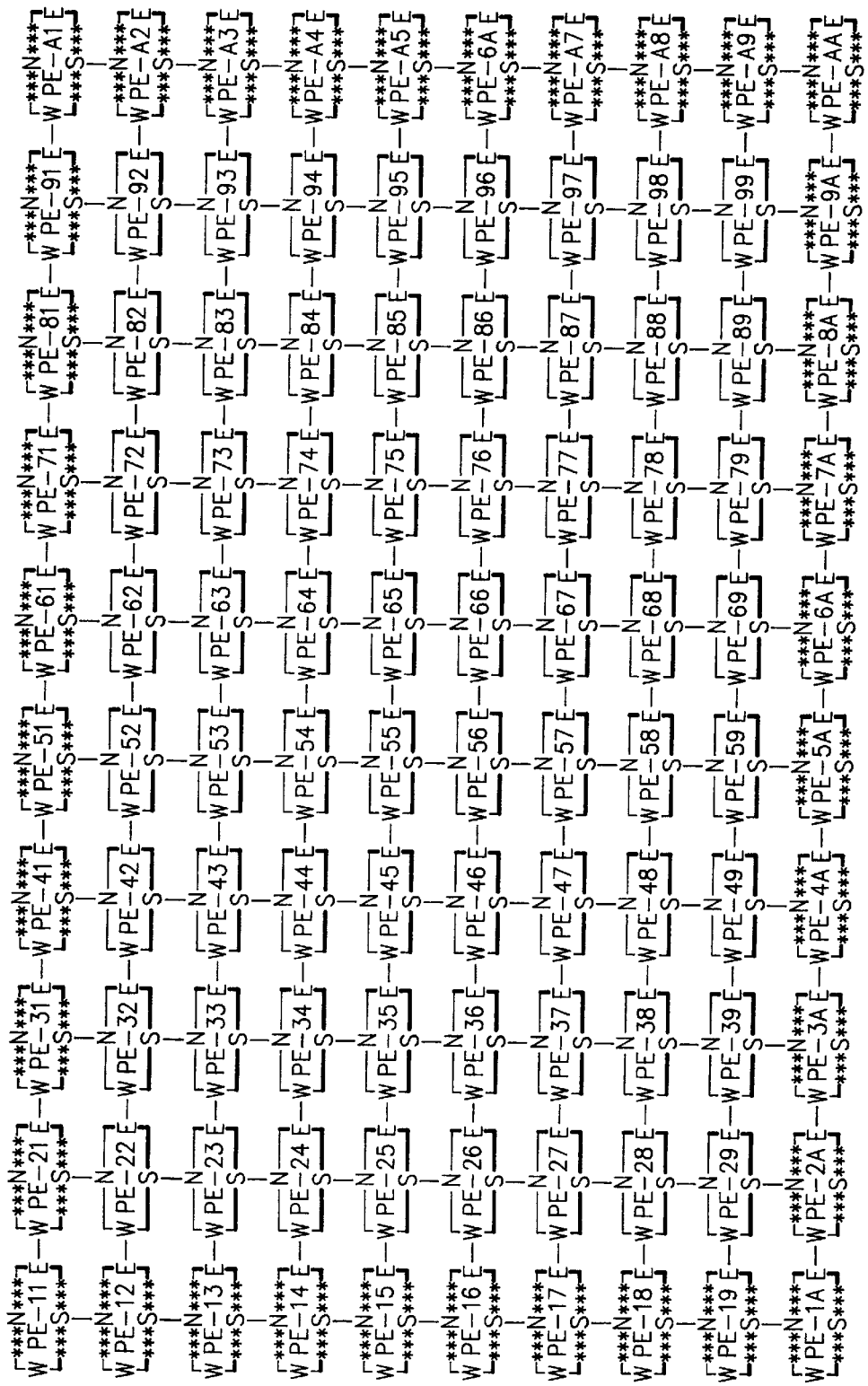
FIG. 16 shows a 10×10 mesh expanded from an 8×8 mesh by adding a concentric ring of "new" PEs.
Figure 17B:
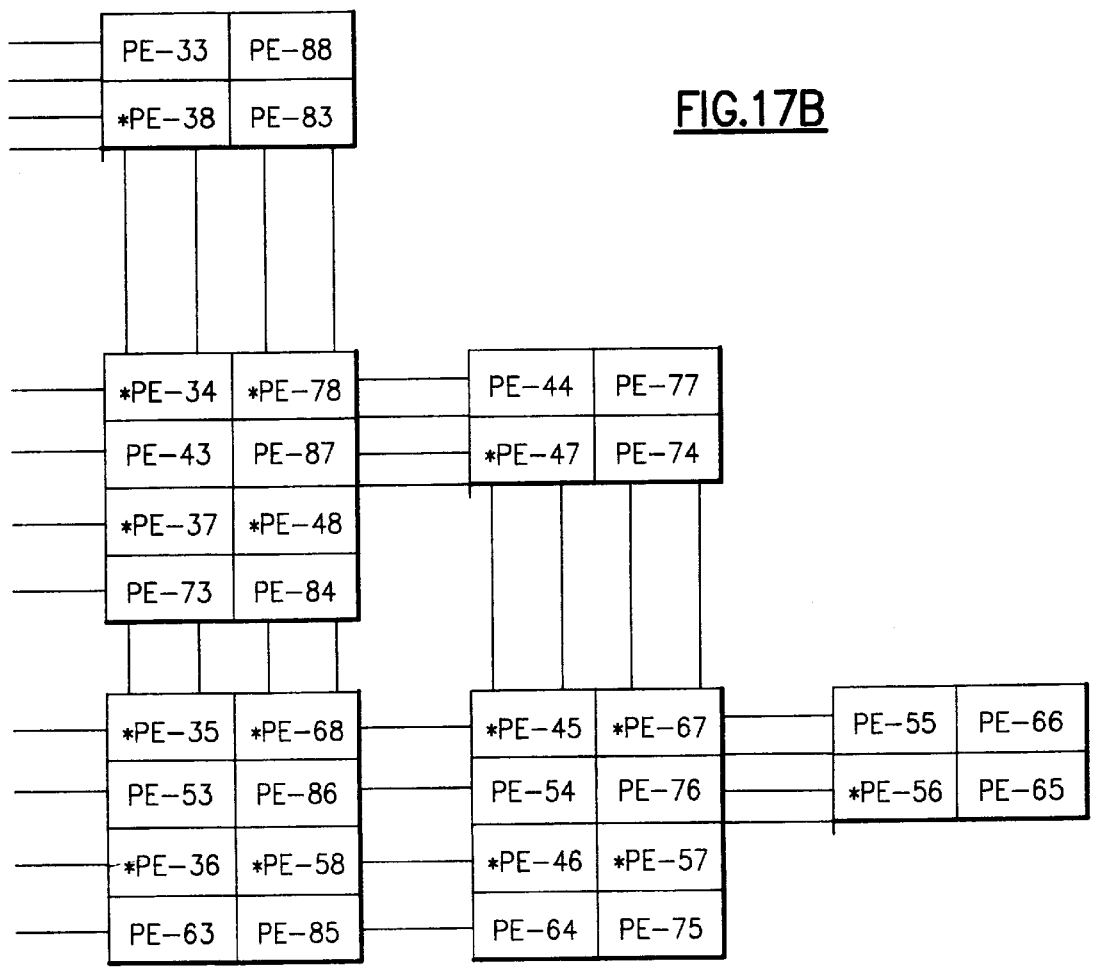
FIG. 17 shows a 10×10 multiple-folded mesh scaled from the 8×8 multiple-folded mesh.

A Z×Z mesh array, for example the 8×8 mesh of FIG. 1, can be expanded to a (Z+2)×(Z+2) array, 10×10 mesh of FIG. 16, by adding a concentric ring of processors to the original mesh, indicated by the PEs with surrounding asterisks in FIG. 16, and extending the wraparound wires accordingly. In the multiple-folded mesh array processor, the same expansion can be obtained by adding a new column of processing elements, breaking the Z×Z local wraparound wiring (an example for an 8×8 array which is shown in FIG. 9), and connecting the previous wraparound wire ports to the added column of PEs' appropriate I/O ports. The new added column of PEs contain the (Z+2)×(Z+2) wraparound wiring for the new mesh array. In both cases the PEs are renumbered. FIG. 17 depicts the 10×10 multiple-folded clustered processor mesh array as expanded from an 8×8 organization, FIGS. 9 and 15. In FIG. 17 only the modified 8×8 wraparound wiring and 10×10 wraparound wiring is depicted. The wiring providing the enhanced connectivity within the four and eight processor clusters is assumed internal to the clusters and not depicted.

7. MULTIPLE FOLDED HEXAGONAL PROCESSOR ARRAY WITH ENHANCED CONNECTIVITY

Figure 18:
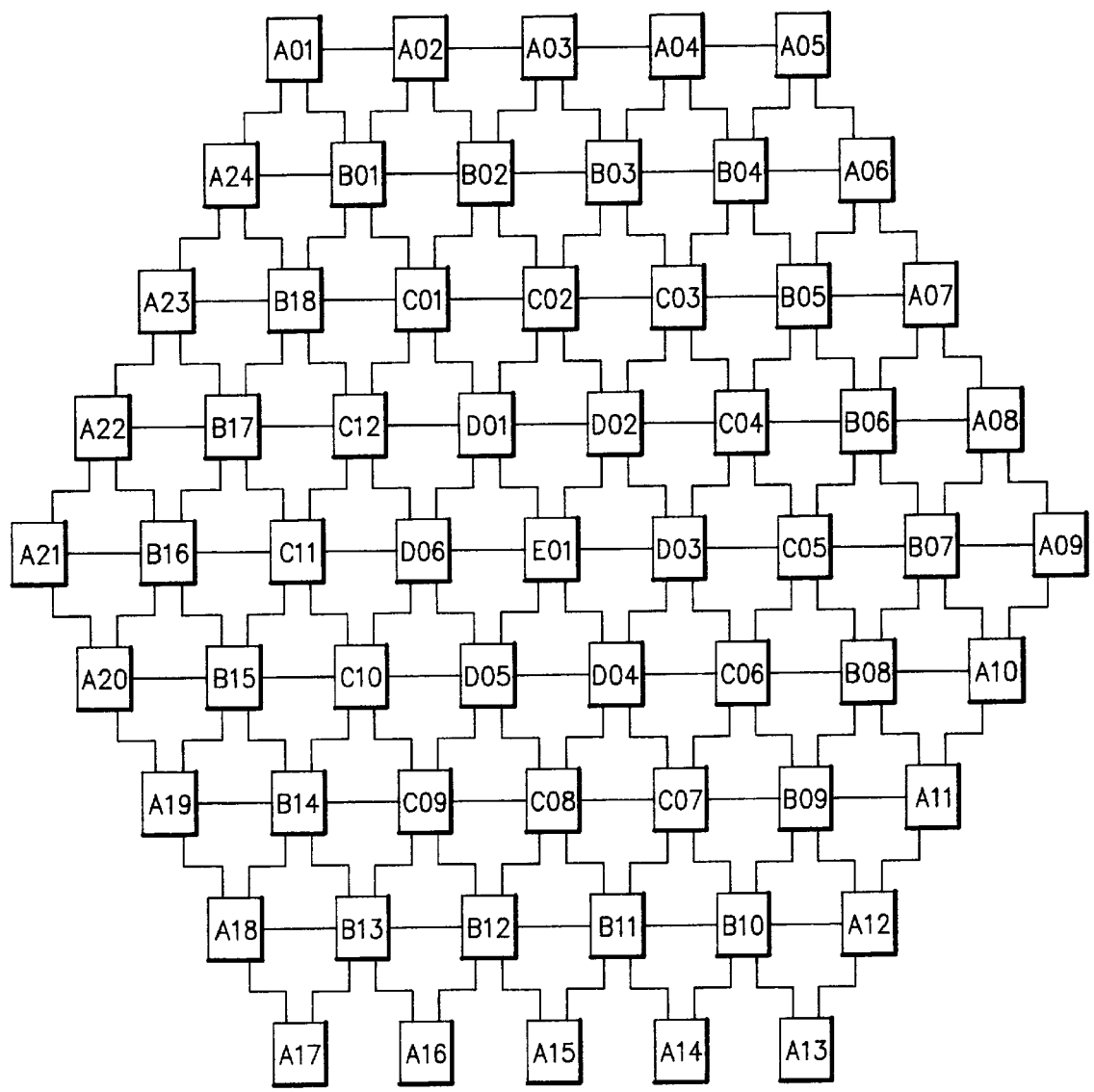
FIG. 18 shows a hexagonal six processor neighborhood array.

In this section the folding concepts developed in the previous sections are applied to the six neighborhood hexagonal processor array, FIG. 18. The processor nodes in FIG. 18 are labeled Axx for nodes in the outer concentric ring of processors, and Bxfor the next concentric ring of processors, continuing until the central processor node E01 is reached.

Figure 19:
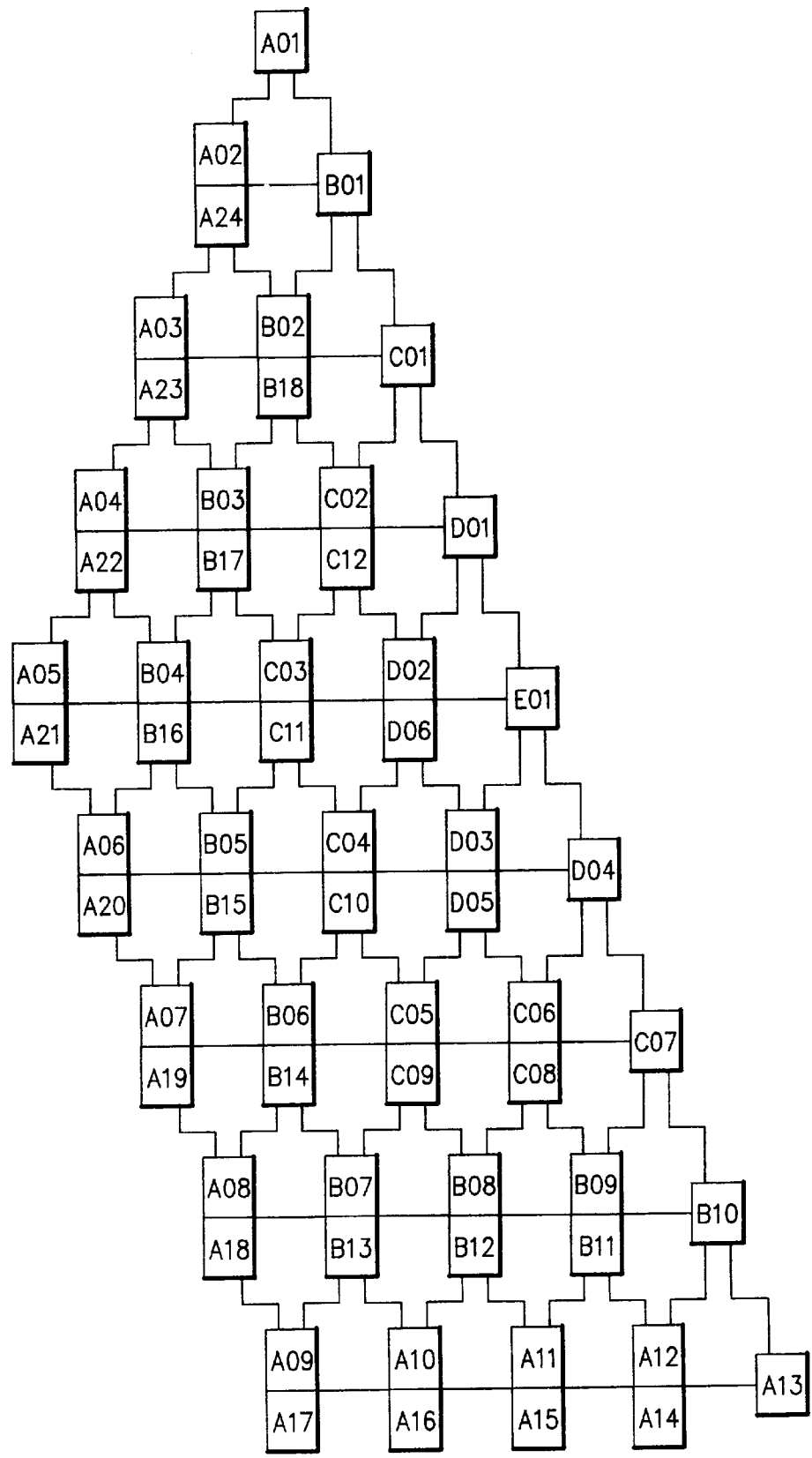
FIG. 19 shows a first fold hexagonal six processor neighborhood array.

The hexagonal processor array of FIG. 18 is folded along the diagonal made up of nodes A01, B01, C01, D01, E01, D04, C07, B10, and A13 which results in the processor organization depicted in FIG. 19. In FIG. 19 the processor nodes which overlapped due to the folding are combined into dual processor nodes, for example A02/A24 and B02/B18. The interconnecting wires depicted, in a similar manner to the diagonal fold mesh of FIG. 2B, may or may not be combined depending upon the application.

Figure 20:
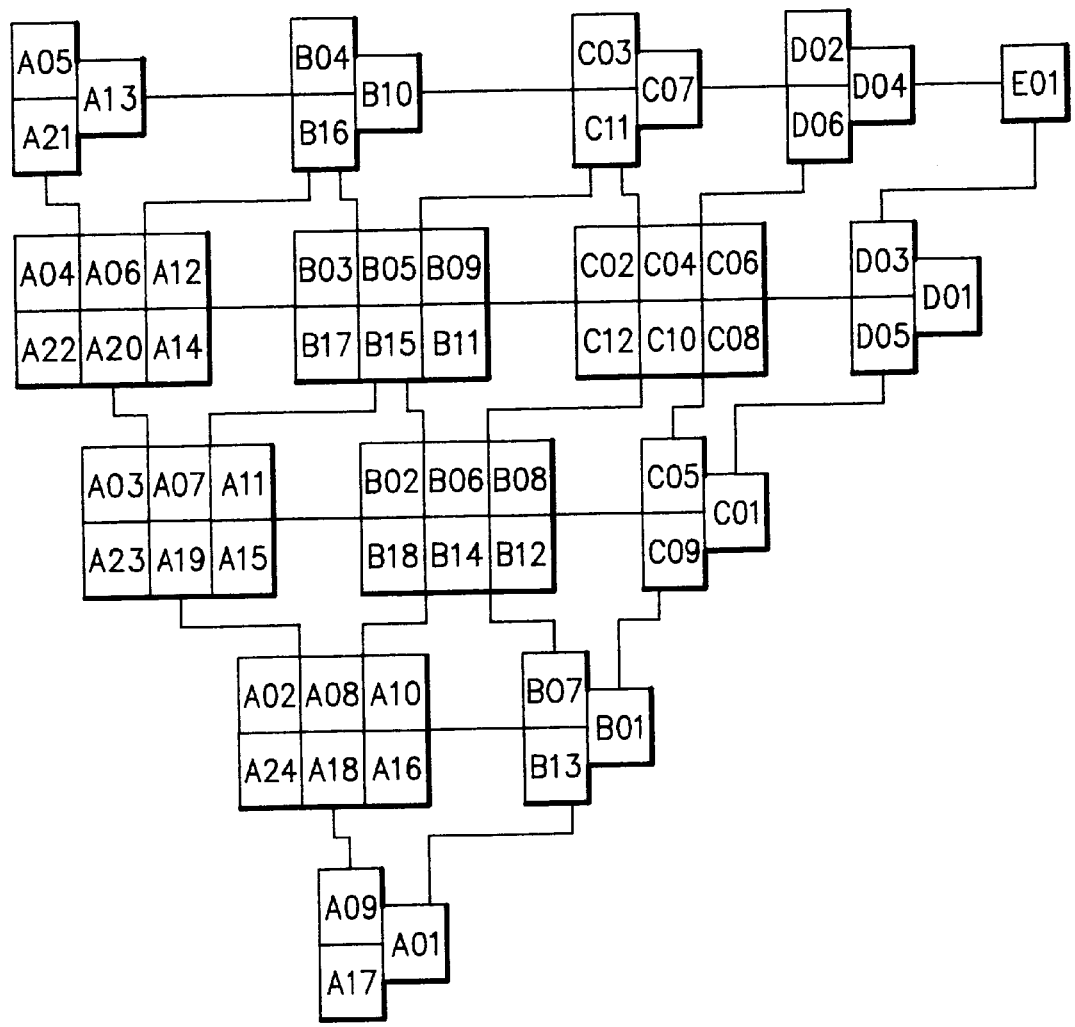
FIG. 20 shows a third fold hexagonal six processor neighborhood array.

The folded hexagonal array of FIG. 19 is next folded along two diagonals resulting in two separate fold operations. The first fold is along diagonal A05/A21, B04/B16, C03/C11, D02/D06, and E01. The second fold is along diagonal A09/A17, B07/B13, C05/C09, D03/D05, and E01. Both folds are inward with processor nodes folding over the triangular array that is bounded by the stated diagonals. The resulting organization is depicted in FIG. 20, made up of clusters of processing elements. Three processing elements in a cluster node are used on the two edges and six processing elements in a cluster node make up the rest of the array. For example, A05/A13/A21, B04/B10/B16, C03/C07/C11, D02/D04/D06, D01/D03/D05, C01/C05/C09, B01/B07/B13, and A01/A09/A17 make up the eight three cluster nodes. A single processing element E01 makes up the last processing element.

Figure 21:
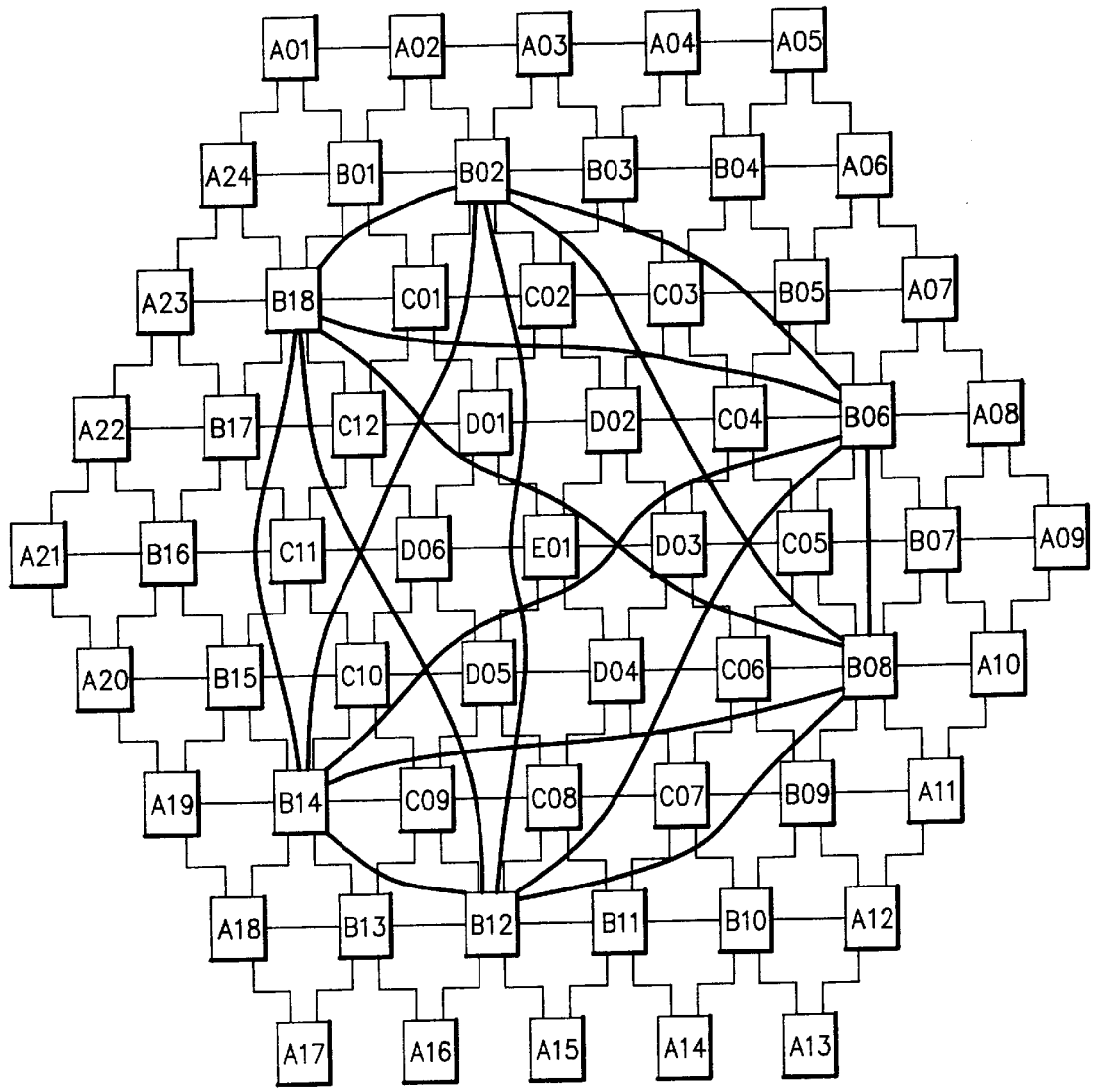
FIG. 21 shows a hexagonal array with additional wiring for nodes B02/B06/B08/B12/B14/B18.
Figure 22A:
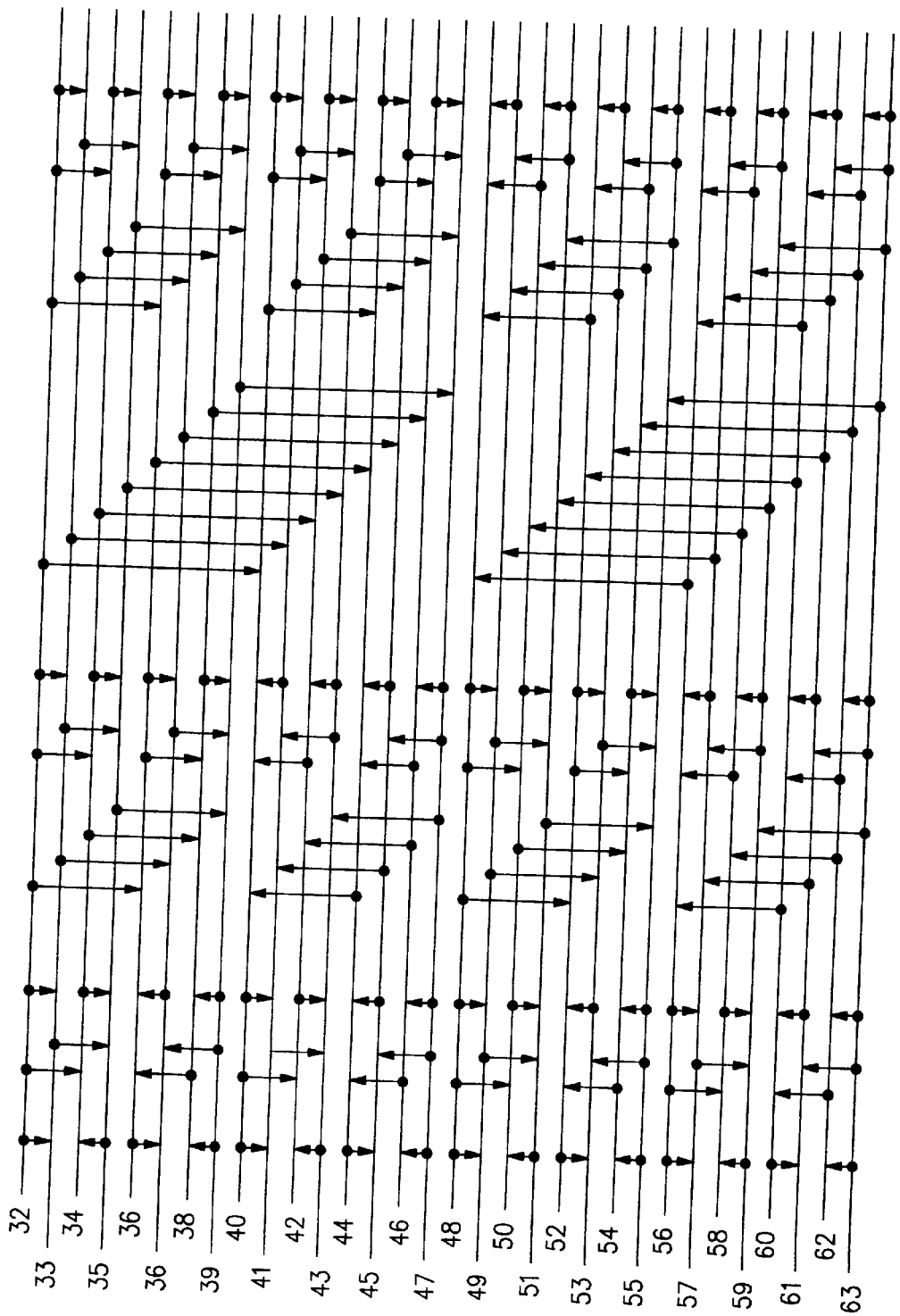
FIG. 22 shows a 64 number bitonic sort sequence made up of stages of transfer,compare,return operations identified as parts.
Figure 22A:
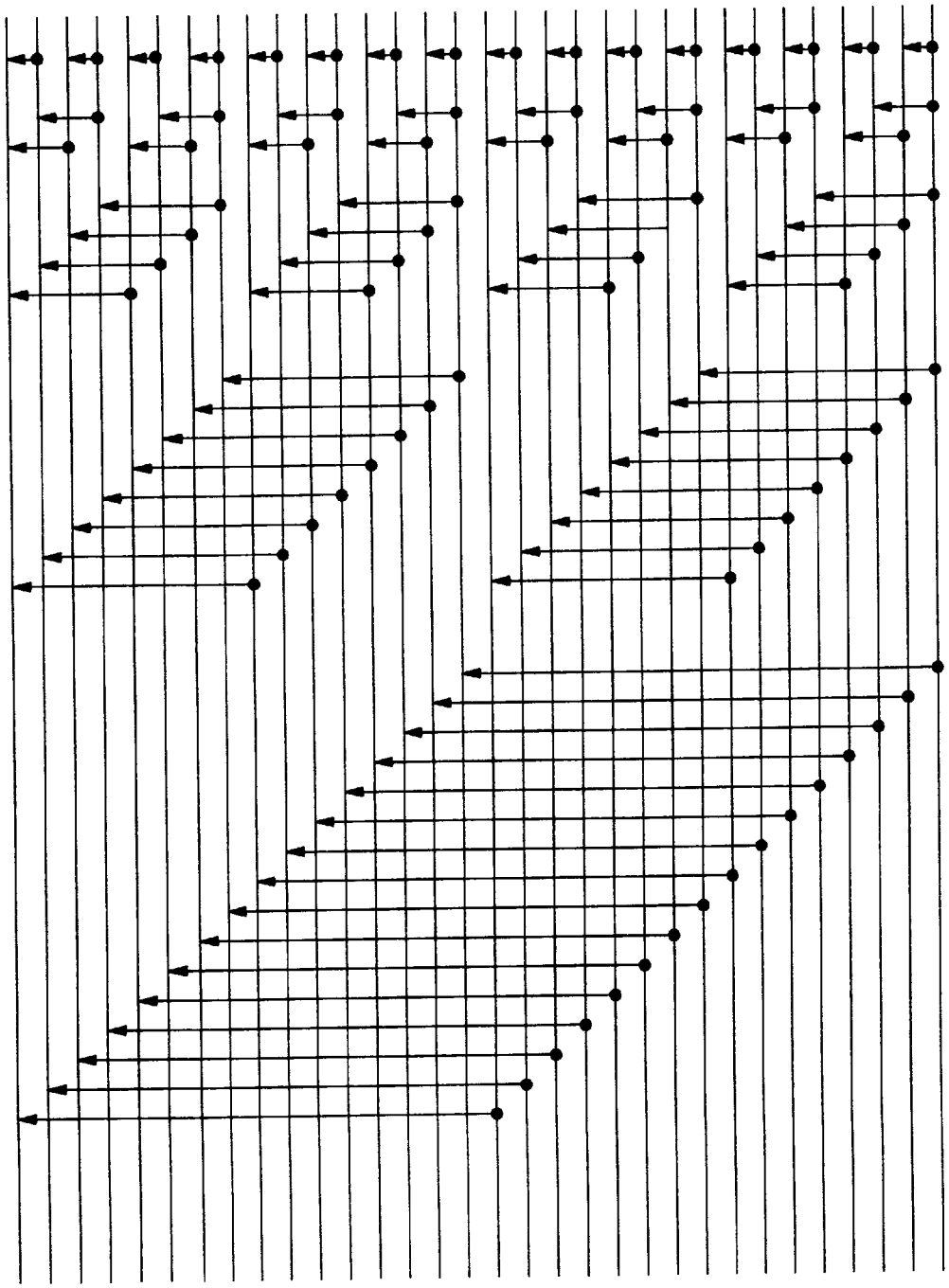
Figure 22B:
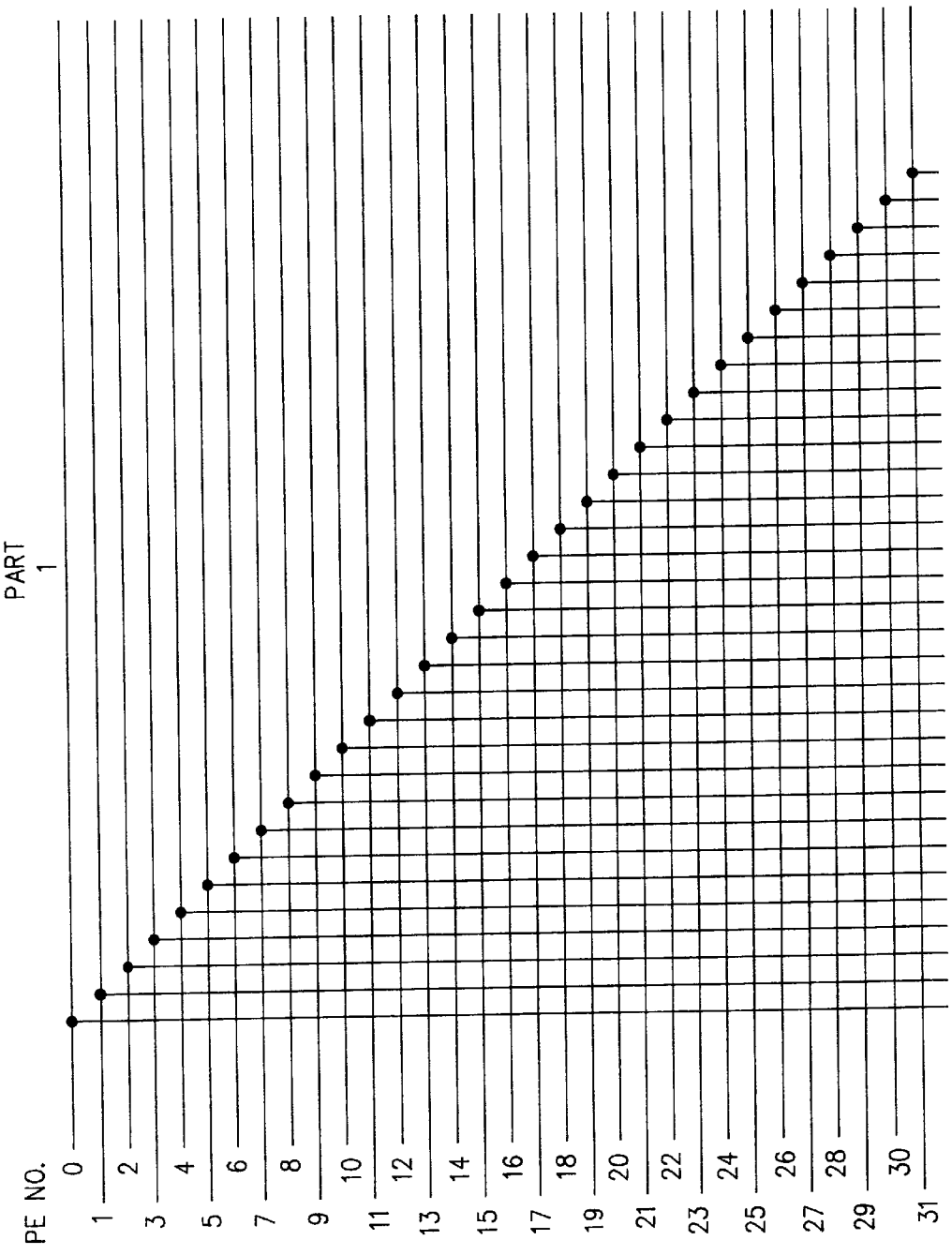
Figure 22B:
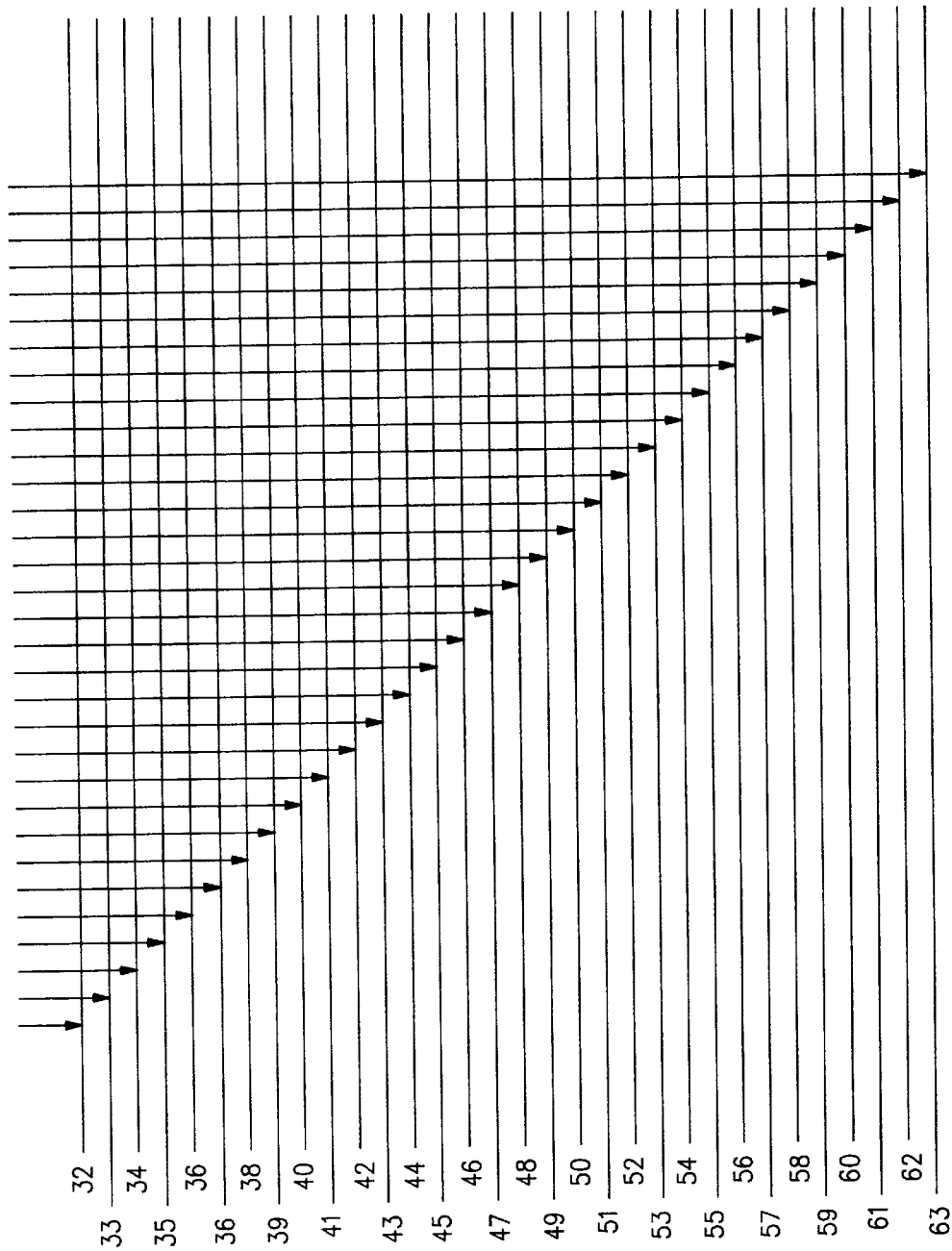

Within a three or six cluster processor group local connection wires are added in a manner similar to that depicted in FIG. 10C. Assuming a similar technique as was previously used with expanded I/O ports or other interconnection technique the enhanced connectivity would provide reduced communications distances that could not be easily obtained in the typical six neighborhood hexagonal processor array, FIG. 18. An example of the increased logical connectivity provided by the local cluster wires is demonstrated in FIG. 21 for the six processor cluster node B02/B06/B08/B12/B14/B18 mapped onto a standard six neighborhood hexagonal processor array.

In a similar manner to the method for scaling the multiple-folded square mesh array processor, the multiple-folded hexagonal processor array can be scaled. A concentric ring of processors surrounding an original hexagonal processor array can be added to the multiple-folded hexagonal array by adding an expanded edge of processors to the triangular processor array, for example FIG. 20. To add one concentric ring of processors requires the addition of one row or column of processors (depending upon ones perspective) to the triangular edge consisting of multiple six processor clusters bounded on both sides by a cluster of three processors. For example in FIG. 20, adding a concentric ring of processors would consist of adding a linear array of cluster elements made up of four clusters of six processors bounded on both sides by a cluster of three processors (30 processor elements total). This new linear array interconnects with the existing edge of processors in FIG. 20 identified by A05/A13/A21, A04/A06/A12/A14/A20/A22, A03/A07/A11/A15/A19/A23, A02/A08/A10/A16/A18/A24, and A01/A09/A17.

8. BITONIC SORT ON ENHANCED CONNECTIVITY MULTIPLE-FOLDED CLUSTERED PROCESSOR ARRAY

Figures 23, 23A:
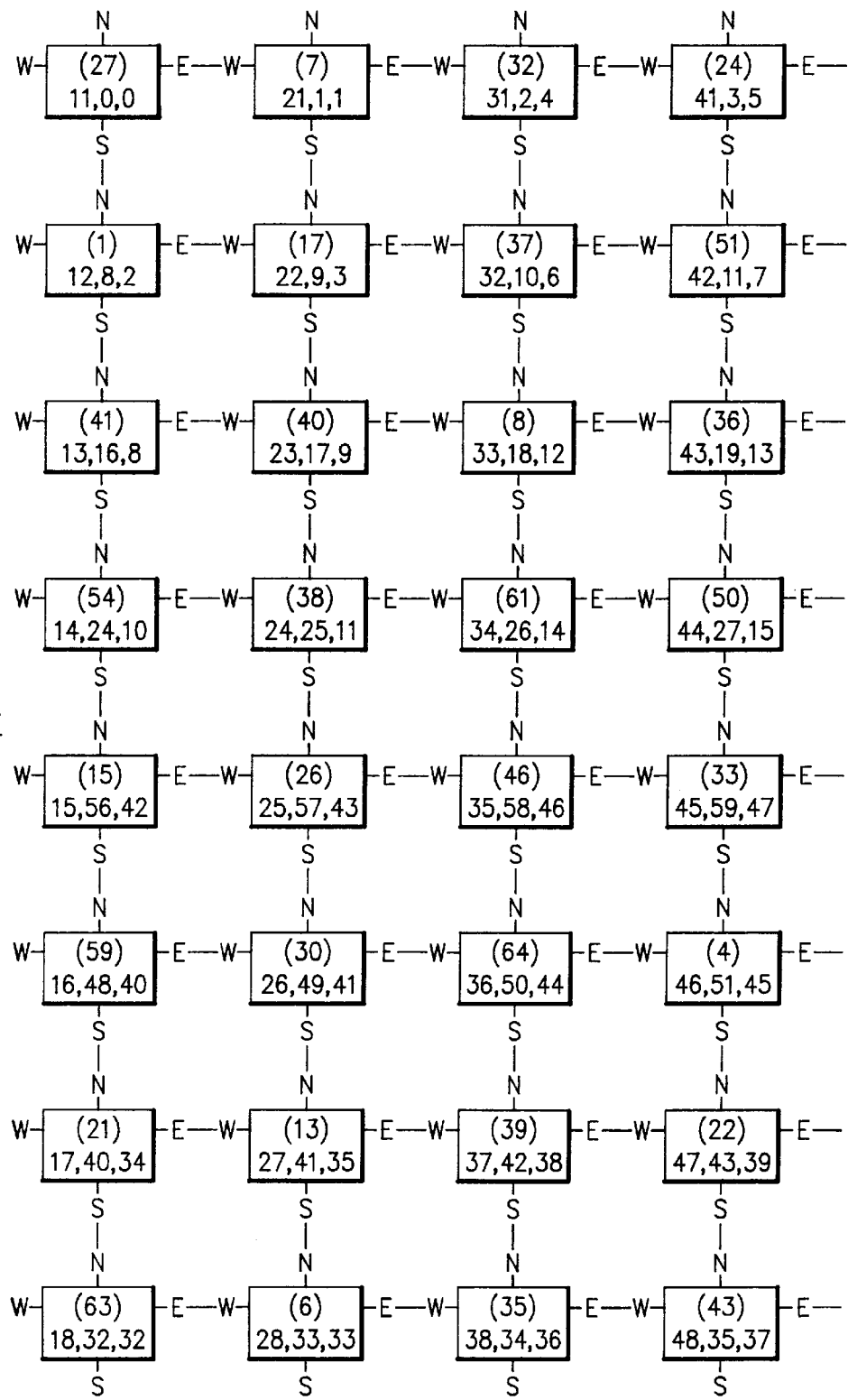
FIG. 23 shows a 8×8 mesh initial data load for bitonic sort.
Figure 23B:
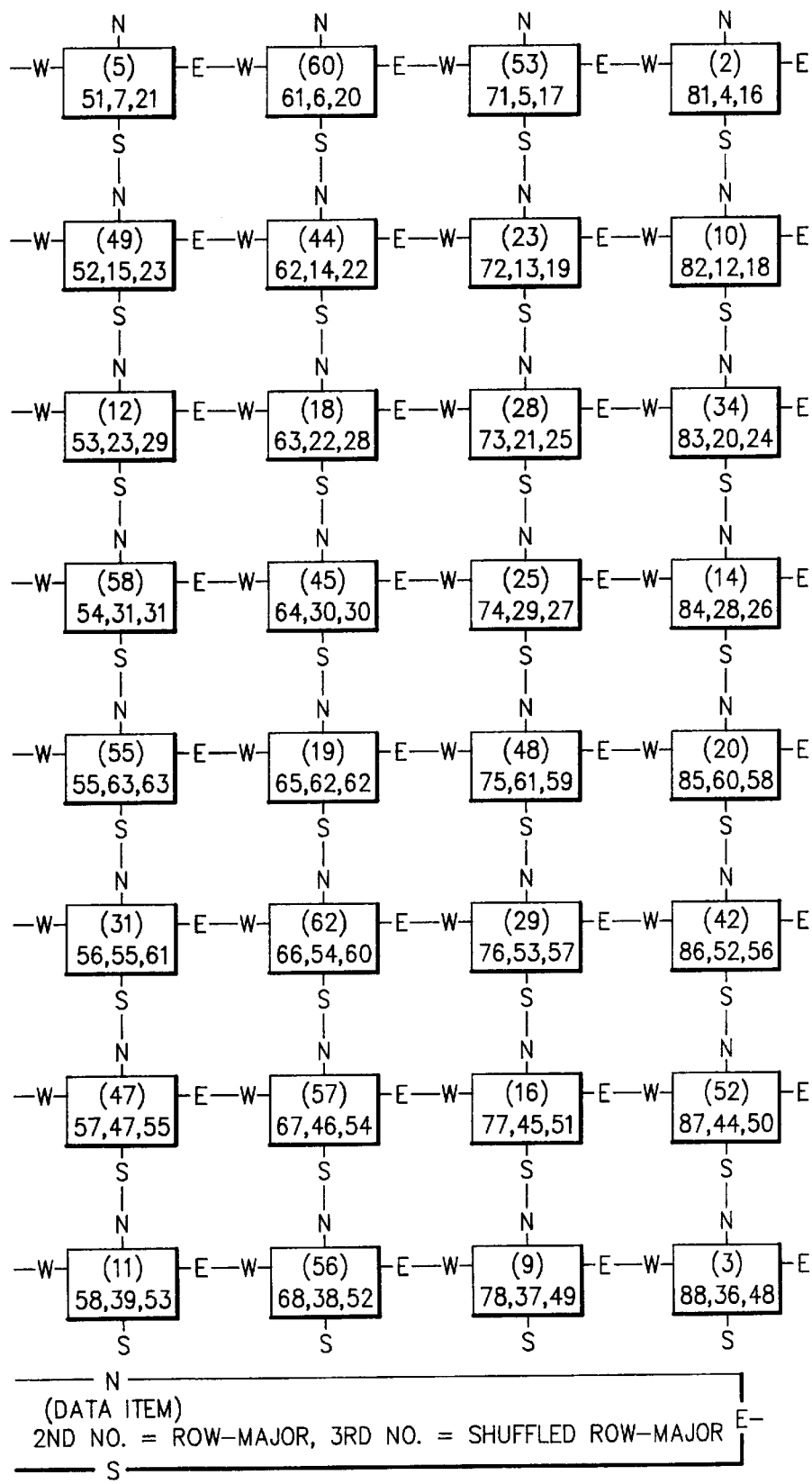
Figure 24B:
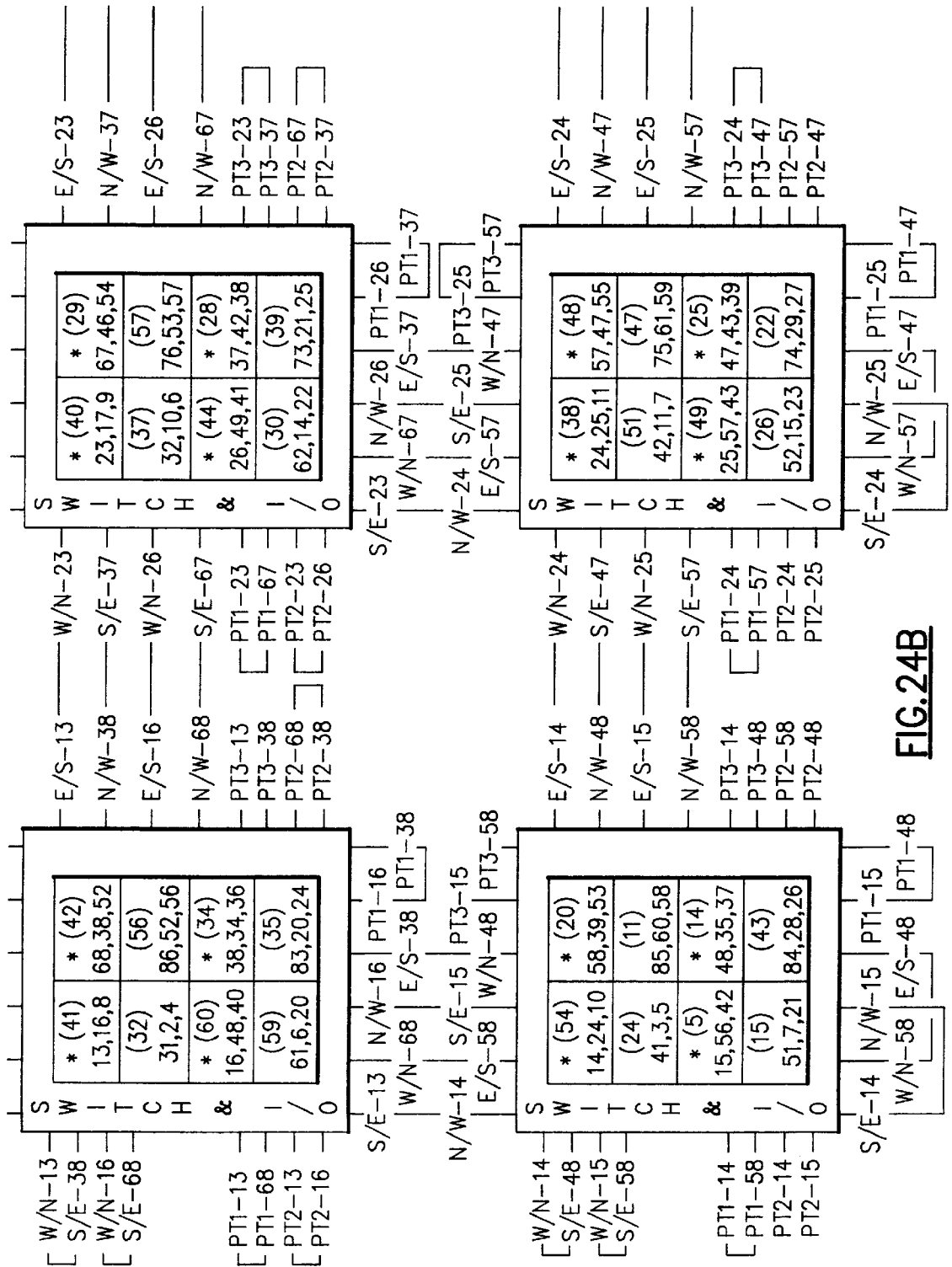
FIG. 24 shows a third fold clustered processor mesh array with enhanced connectivity initial data load for bitonic sort.
Figure 25B:
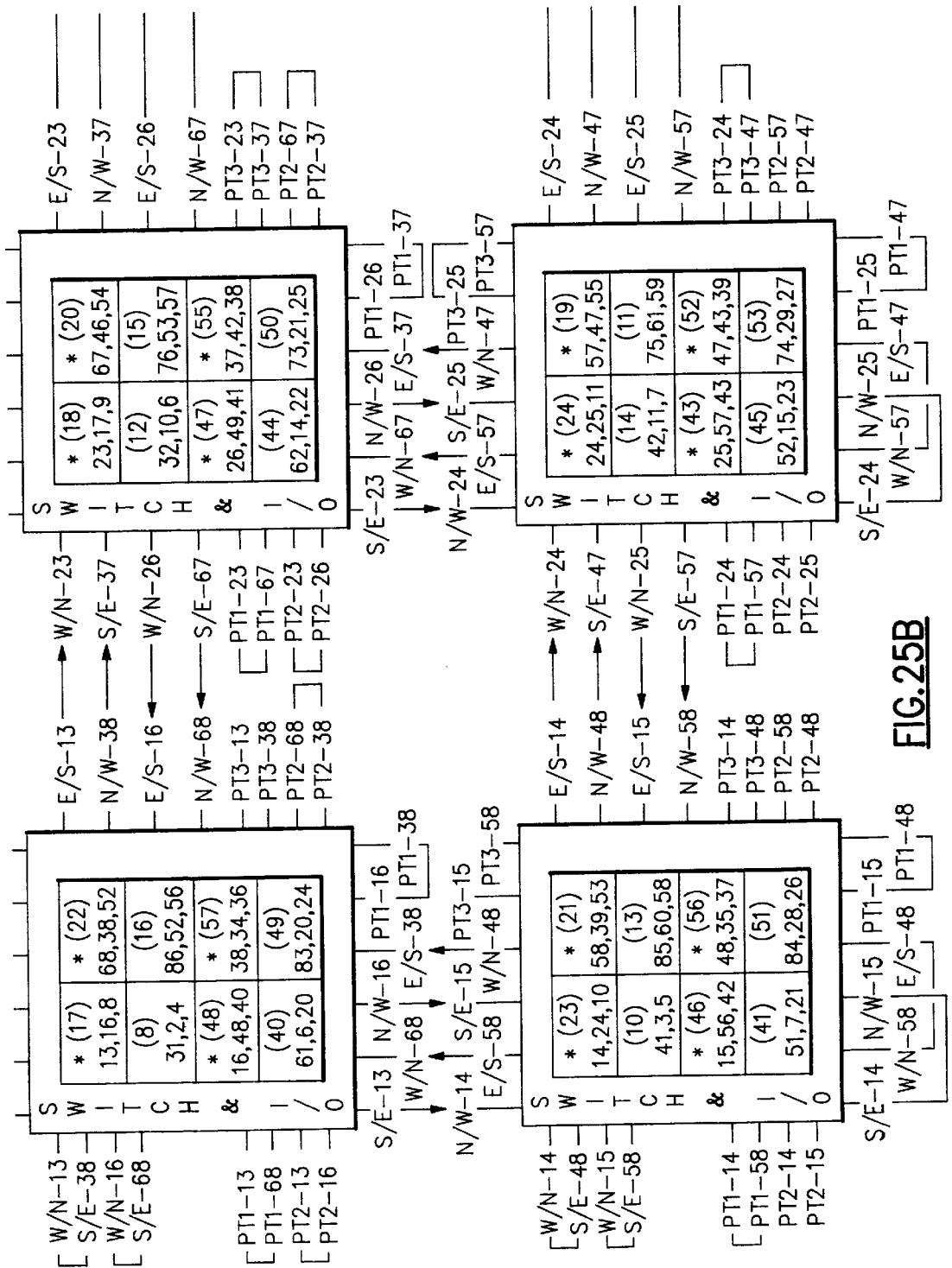
FIG. 25 shows a third fold clustered processor mesh array with enhanced connectivity bitonic sort stage 5 part 5.
Figure 25C:
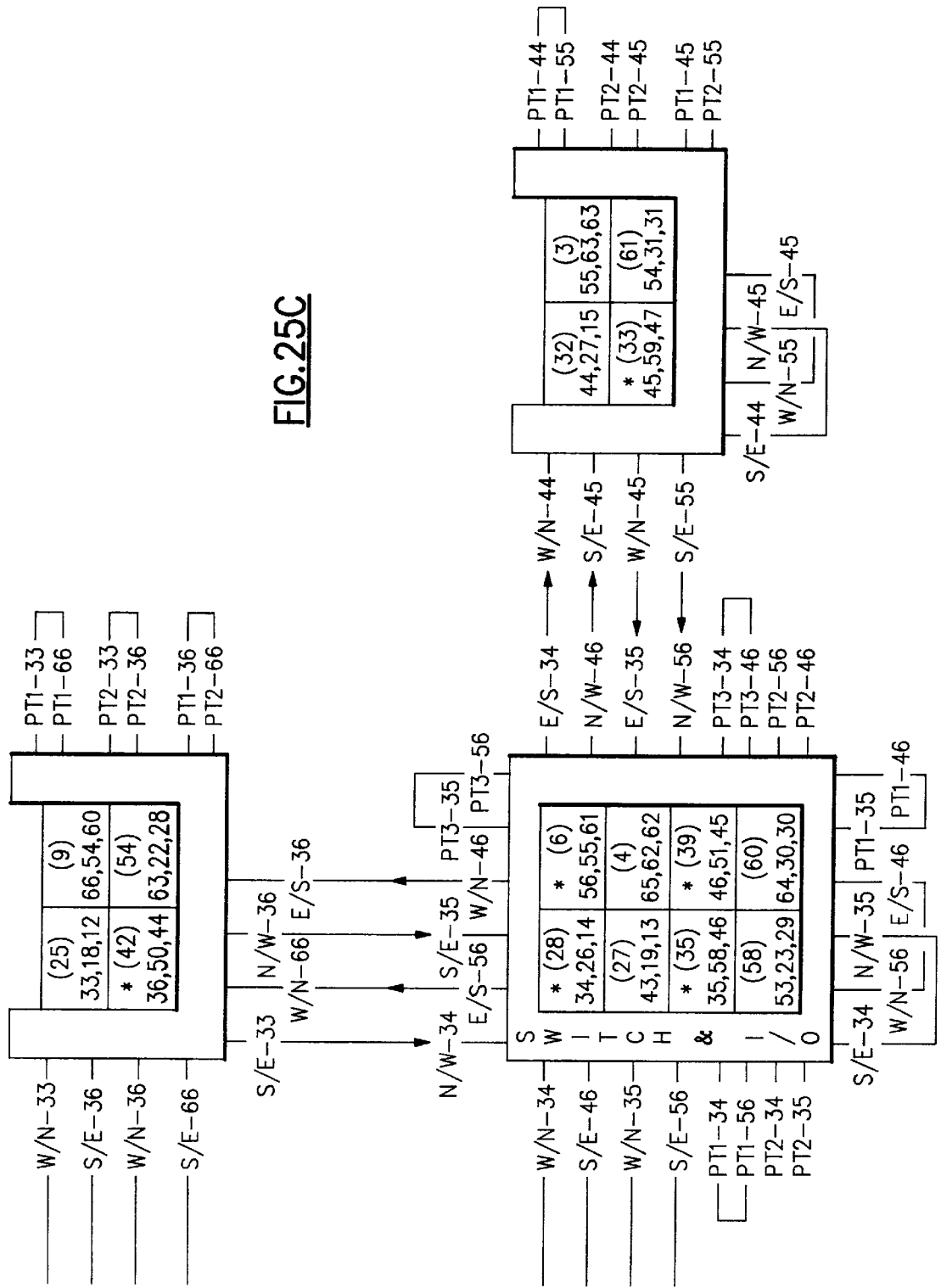
Figure 26B:
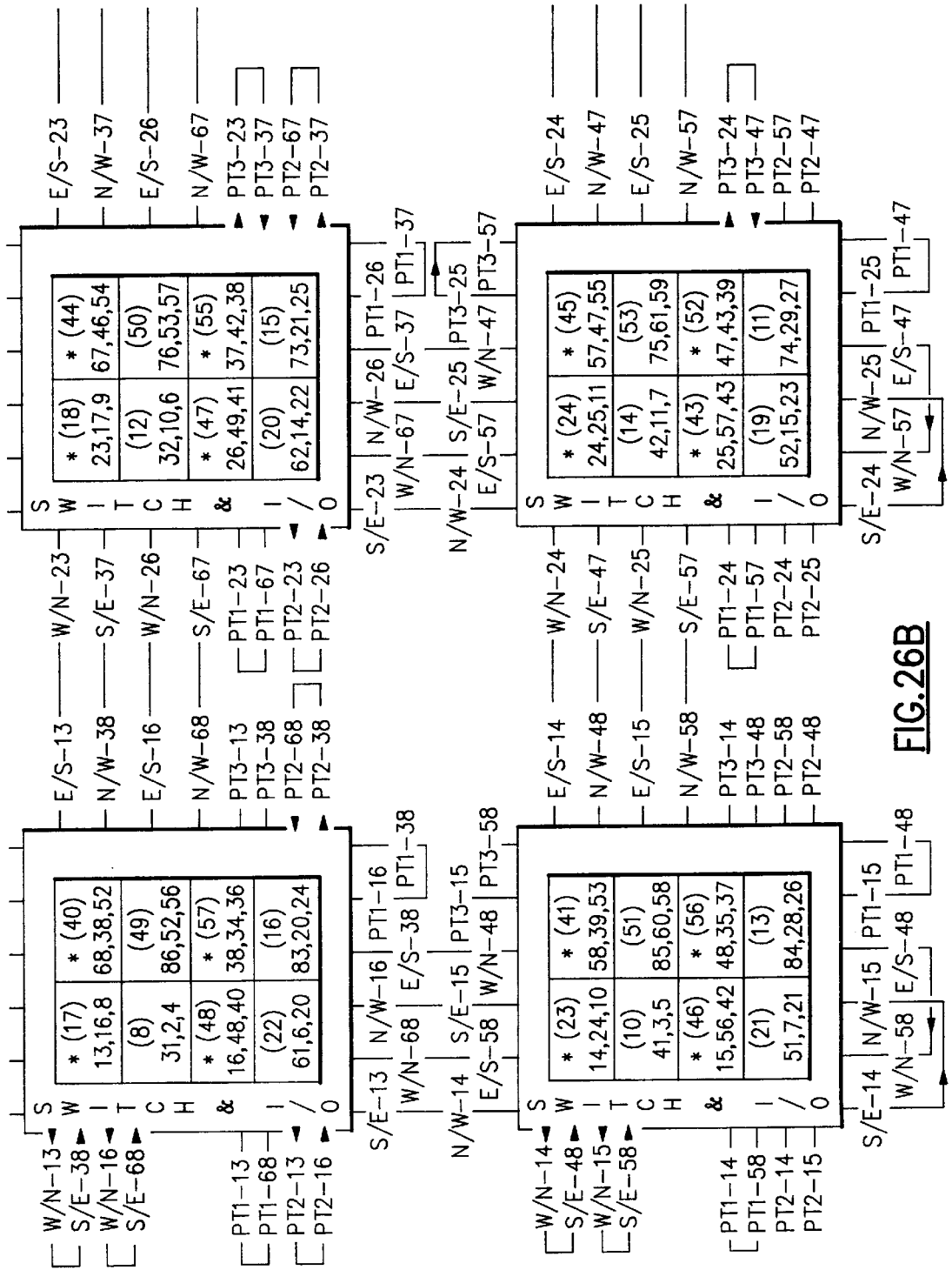
FIG. 26 shows a third fold clustered processor mesh array with enhanced connectivity bitonic sort stage 6 part 1.
Figure 26C:
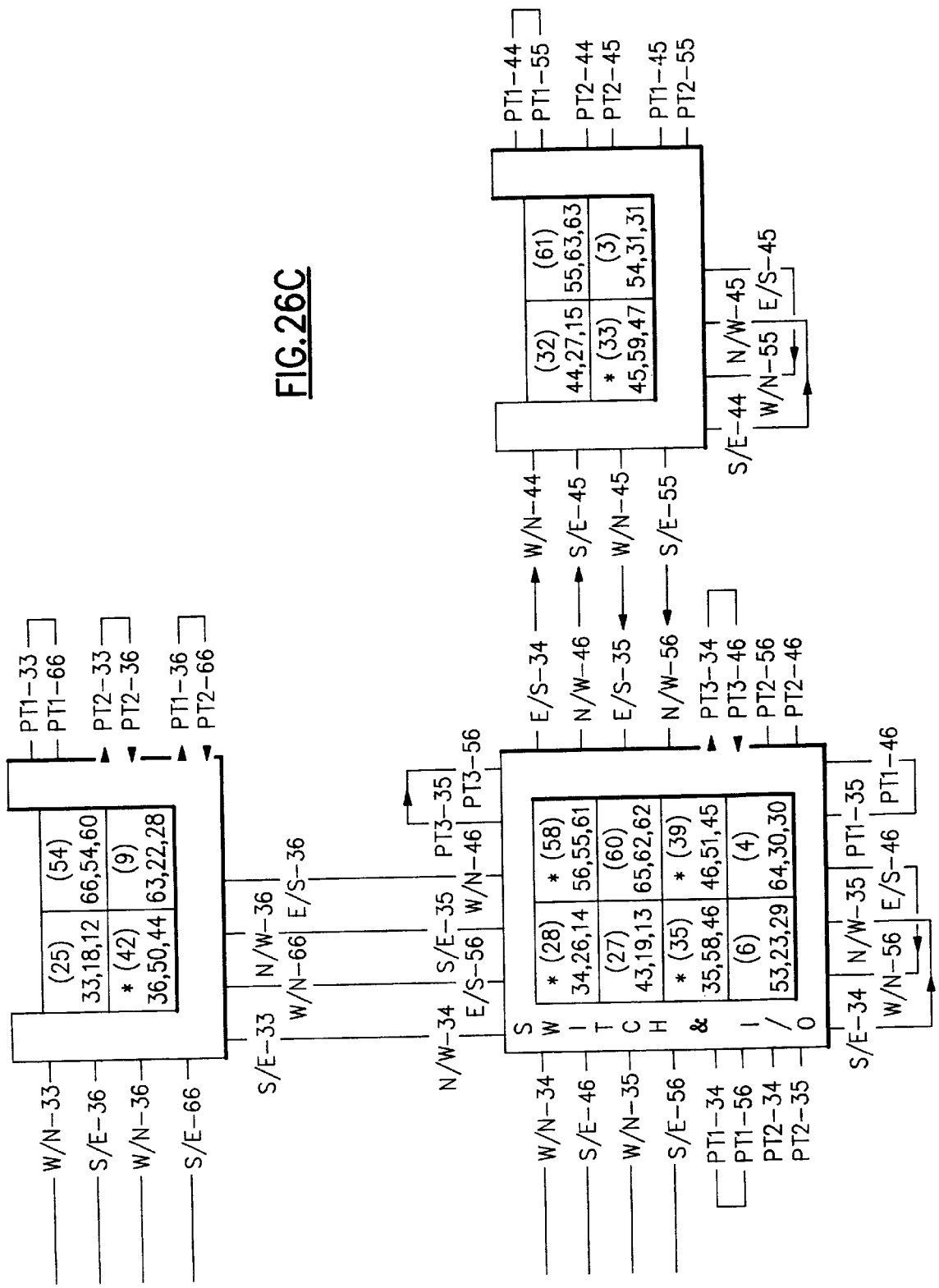

An example using the multiple-folded clustered processor mesh array for bitonic sorting (reference Knuth 1973) is discussed next. FIG. 22 depicts a six stage bitonic sorter using notation from Knuth 1973 with line segments indicating a transfer, compare, return operation between processing elements. A dot indicates the starting PE and the arrow indicates the destination PE where the compare operation is to occur. The smaller of the two values compared is returned to the starting PE. FIG. 23 depicts an 8×8 mesh with an initial unsorted integer number data set loaded into the PEs. FIG. 24 depicts the same initial data set loaded onto the multiple-folded clustered processor mesh array. FIG. 25 depicts stage 5 part 5 of the bitonic sort and FIG. 26 depicts stage 6 part 1 of the bitonic sort with reference to FIG. 22. In stage 6 part 1 a number must transfer across three PEs in the standard mesh to reach the destination and the data return takes up to an additional three PE crossings for a total of six transfer operations for each compare. In the multiple-folded clustered processor mesh array the same stage 6 part 1 transfer sequence can be accomplished with one transfer to the destination and one transfer for the return.

While we have described our preferred embodiments of our inventions, it will be understood that those skilled in the art, both now and in the future, may make make various improvements and enhancements which fall within the scope of the claims which follow. These claims should be construed to maintain the proper protection for the inventions first disclosed.

What is claimed is:

1. A triple-folded array parallel computing system comprising:

a plurality of processing elements (PEs) each coupled to a plurality of others of said PEs such that the plurality of PEs is logically equivalent to at least a square two dimensional array configuration of PEs having an equal number of PE's as said computing system, for executing at least algorithms executable on the two dimensional array configuration;

each of the PEs comprising: a plurality of I/O ports for sending and receiving instructions and data to and from coupled ones of the PEs, means for executing instructions, and means for storing instructions and data;

a portion of the PEs paired by a first diagonal fold in said square array into a plurality of symmetric PEs forming a first fold mesh, the symmetric PEs each comprising a pair of a first PE and a second PE sharing each of said I/O ports as shared ports for sending and receiving instructions and data such that each of the pair of PEs communicates with PEs originally coupled to the first PE and with PEs originally coupled to the second PE of said pair of PEs, said pair of PEs including $PE_{ij}$ and $PE_{ji}$, where i and j are column and row designators of a PE in said logically equivalent square two dimensional array configuration, and where i and j are positive non-equal integers;

a remaining portion of the PEs configured into a plurality of diagonal PEs, the diagonal PEs each coupled to two symmetric PEs each via one of said shared ports; and said plurality of symmetric PEs and diagonal PEs grouped by consecutive second and third folds in said first fold mesh, into a plurality of clusters each comprising a plurality of PEs, a portion of the clusters each comprising four symmetric PEs and a remaining portion of the clusters each comprising two diagonal PEs, the plurality of clusters each comprising an additional coupling between a pair of previously uncoupled PEs.

2. The computing system of claim 1 executing a convolution algorithm for image processing in said means for executing instructions.

3. The computing system of claim 1 wherein said I/O ports each comprise a bit serial interface.

4. The computing system of claim 1 wherein said I/O ports comprise an interface for broadcasting initialization parameters to each of said plurality of PEs.

5. The computing system of claim 1, wherein the PEs are interconnected using half as many coupling paths as the square two dimensional array.

6. The computing system of claim 1 executing a bitonic sorting algorithm comprising less than half the number of data transfers required by the two dimensional array configuration executing the bitonic sorting algorithm in said means for executing instructions.

7. A triple-folded array parallel computing system comprising:

a plurality of processing elements (PEs) each coupled to a plurality of others of said PEs such that the plurality of PEs is logically equivalent to at least a hexagonal array configuration of PEs having an equal number of PEs as said computing system, for executing at least algorithms executable on the hexagonal array configuration;

each of the PEs comprising: a plurality of I/O ports for sending and receiving instructions and data to and from coupled ones of the PEs, means for executing instructions, and means for storing instructions and data;

a portion of the PEs paired by a first fold in said hexagonal array into a plurality of dual PEs, forming a first fold mesh, the dual PEs each comprising a pair of a first PE and a second PE sharing said ports as shared ports for sending and receiving instructions and data such that each of the pair of PEs communicates with PEs originally coupled to the first PE and with PEs originally coupled to the second PE of said pair of PEs;

another portion of the PEs remaining as individual PEs and coupled to a dual PE each via one of said shared ports; and said plurality of dual PEs and individual PEs grouped by consecutive second and third folds in said first fold mesh, into a plurality of clusters comprising a plurality of PEs, a portion of the clusters each comprising three dual PEs and another portion of the clusters each comprising three individual PEs, said portion of clusters and said another portion of clusters each comprising an additional coupling between a pair of previously uncoupled PEs.

* * * * *